United States Patent
Schulze et al.

(10) Patent No.: US 12,462,340 B2
(45) Date of Patent: Nov. 4, 2025

(54) DEVICE AND METHOD FOR CORRESPONDENCE ANALYSIS IN IMAGES

(71) Applicant: recognitionfocus GmbH, Dresden (DE)

(72) Inventors: Marc Schulze, Dresden (DE); Joachim Ihlefeld, Dresden (DE); Torvald Riegel, Dresden (DE)

(73) Assignee: recognitionfocus GmbH, Dresden (DE)

( * ) Notice: Subject to any disclaimer, the term of this patent is extended or adjusted under 35 U.S.C. 154(b) by 322 days.

(21) Appl. No.: 18/275,273

(22) PCT Filed: Jan. 31, 2022

(86) PCT No.: PCT/EP2022/052201
§ 371 (c)(1),
(2) Date: Aug. 1, 2023

(87) PCT Pub. No.: WO2022/162216
PCT Pub. Date: Aug. 4, 2022

(65) Prior Publication Data
US 2024/0303772 A1    Sep. 12, 2024

(30) Foreign Application Priority Data
Feb. 1, 2021  (DE) .......................... 102021102233.9

(51) Int. Cl.
*G06K 9/00* (2022.01)
*G06T 5/20* (2006.01)
(Continued)

(52) U.S. Cl.
CPC ................. *G06T 5/20* (2013.01); *G06T 7/11* (2017.01); *G06T 7/593* (2017.01); *G06V 10/56* (2022.01); *G06V 10/764* (2022.01)

(58) Field of Classification Search
CPC .......... G06N 3/045; G06N 3/08; G06N 3/084; G06N 3/04; G06N 20/00; G06N 3/0464;
(Continued)

(56) References Cited

U.S. PATENT DOCUMENTS

| 5,774,573 A | * | 6/1998 | Caspi | ...................... G06T 3/403 |
|---|---|---|---|---|
| | | | | 382/141 |
| 2001/0004380 A1 | * | 6/2001 | Mannermaa | ............ G01S 19/09 |
| | | | | 375/150 |

(Continued)

FOREIGN PATENT DOCUMENTS

| DE | K19521MAZ | 5/1956 |
|---|---|---|
| EP | 2636993 A1 | 9/2013 |

OTHER PUBLICATIONS

Allan D. Jepson et al., "The Fast Computation of Disparity from Phase Differences", IEEE Computer Society Conference on Computer Vision and Pattern Recognition, dated 1989, 6 pp.

(Continued)

*Primary Examiner* — Alex Kok S Liew
(74) *Attorney, Agent, or Firm* — Kaplan Breyer Schwarz, LLP

(57) ABSTRACT

A device and a method that can be used to perform a correspondence analysis in image data in a particularly low-noise and efficient manner. The device and method include selecting image patches from individual images and generating a plurality of one-dimensional signals using even and odd convolution kernels in the spatial window in each case, and processing differences between the convolution results in a non-linear manner and accumulating these differences to form a correspondence function and evaluating this function.

26 Claims, 12 Drawing Sheets

(51) Int. Cl.
  *G06T 7/11* (2017.01)
  *G06T 7/593* (2017.01)
  *G06V 10/56* (2022.01)
  *G06V 10/764* (2022.01)
(58) Field of Classification Search
  CPC .......... G06N 3/063; G06N 20/10; G06N 3/02; G06N 3/047; G06N 5/01; G06N 7/01; G06N 20/20; G06N 3/0455; G06N 3/048; G06N 3/082; G06N 3/086; G06N 3/09; G06T 2207/20084; G06T 7/571; G06T 2207/10024; G06T 5/70; G06T 2207/10028; G06T 7/11; G06T 2207/10148; G06T 2207/10016; G06T 2207/20081; G06T 7/0012; G06T 7/50; G06T 11/206; G06T 2207/20021; G06T 5/20; G06T 5/60; G06T 2207/10012; G06T 2207/20056; G06T 3/4046; G06T 3/4053; G06T 7/593; G06T 2207/10004
  See application file for complete search history.

(56) References Cited

U.S. PATENT DOCUMENTS

| | | | |
|---|---|---|---|
| 2013/0266210 A1 | 10/2013 | Morgan-Mar et al. | |
| 2015/0146915 A1 | 5/2015 | Peng et al. | |
| 2018/0324359 A1* | 11/2018 | Pan | H04N 23/80 |
| 2018/0334642 A1* | 11/2018 | Hodgdon | A61Q 5/12 |

OTHER PUBLICATIONS

Authorized Officer: Eckert, Lars, International Search Report issued in PCT Application No. PCT/EP2022/052201, Jun. 3, 2022, 2 pp.
Authorized Officer: Nora Lindner, English Translation of the International Preliminary Report on Patentability issued in PCT Application No. PCT/EP2022/052201, Jul. 31, 2023, 11 pp.
Bela Julesz, "Binocular Depth Perception of Computer-Generated Patterns", Bell System Technical Journal, Sep. 1, 1960, 388 pp., vol. 39 No. 5.
D. Marr et al., "A computational theory of human stereo vision", Proceedings of the Royal Society of London B: Biological Sciences, dated 1979, pp. 301-328, 204(1156).
H.K. Nishihara, "Practical Real-Time Imaging Stereo Matcher", Massachusetts Institute of Technology, Optical Engineering, Sep. 1, 1984, ISSN 0091-3286, pp. 536-545, 23 (5).
Heiko Hirschmüller, "Accurate and Efficient Stereo Processing by Semi-Global Matching and Mutual Information", Proceedings of the 2005 IEEE Computer Society Conference on Computer Vision and Pattern Recognition, dated 2005, 8 pp.
J. L. Marroquin et al., "Robust quadrature filters", Journal of the Optical Society of America, Apr. 1, 1997, pp. 779-791, vol. 14, No. 4.
J.E.W. Mayhew et al., "Rivalrous texture stereograms", Nature, Nov. 4, 1976, pp. 53-56, 264(5581).
John (Juyang) Weng, "Image Matching Using the Windowed Fourier Phase", International Journal of Computer Vision, Apr. 8, 1993, Kluwer Academic Publishers, pp. 211-236, 11(3).
John E.W. Mayhew et al., "Psychophysical and Computational Studies Towards a Theory of Human Stereopsis", Artificial Intelligence, dated 1981, North Holland Publishing Company, pp. 349-385, 17(1).
Marsha J. Hannah, "Computer Matching of Areas in Stereo Images", PhD Thesis, Stanford University, May 18, 1974, 24 pp.
Norbert Wiener, "Extrapolation, Interpolation, and Smoothing of Stationary Time Series: With Engineering Applications", The Technology Press of MIT, dated 1949, 170 pp.
S. Marcelja, "Mathematical description of the responses of simple cortical cells", J. Opt. Soc. Am., Nov. 1, 1980, pp. 1297-1300, 70(11).
Tarek Mouats et al., "Multimodal stereo correspondence based on phase congruency and edge histogram descriptor," International Conference on Information Fusion, dated 2013, 7 pp.

* cited by examiner (a)

(b)

(b)

(a)

(a)

(b)

DEVICE AND METHOD FOR CORRESPONDENCE ANALYSIS IN IMAGES

FIELD OF THE INVENTION

The invention relates generally to the analysis of image data. More particularly, the invention relates to a device that can be used for identifying and locating corresponding image elements in a plurality of images. This in particular also constitutes a basis for stereophotogrammetry in which the position of imaged elements in space is determined on the basis of the localization of matching image elements.

BACKGROUND OF THE INVENTION

First attempts for stereo photography were made as early as 1838 when Sir Charles Wheatstone used a mirror to produce two slightly different images instead of a single photograph. A spatial impression of the captured scene was created by separately looking at the left image with the left eye and at the right image with the right eye. During World War I, large image clusters from air reconnaissance were used and evaluated stereoscopically for the first time.

$$Z = \frac{B \cdot f}{\delta} \quad (1)$$
$$X = \frac{Z \cdot x'}{f}$$
$$Y = \frac{Z \cdot y'}{f}$$

The relationships in equation (1) are referred to as stereo normal formula. They describe the relationship between disparity $\delta$ and depth coordinate Z as a function of base B (i.e. the distance between the left and right cameras) and of focal length f. The lateral coordinates X and Y corresponding to Z in space are derived from Z and from the coordinates in the image (x',y') using the Theorem of rays. X, Y and Z then represent the location and shape of imaged objects. The set of these data will hereinafter be referred to as "3D data" and constitutes one possible use of an application of the invention.

The base and the focal length are sufficiently known from preceding calibration of the stereo camera. For example, one way to obtain a map of the depth coordinates of the captured object space (and thus for 3D data) consists in finding many homogeneously distributed point correspondences in the input images and calculating the disparity for these correspondences. Here, the spatial resolution of the 3D data is determined by the grid pitch of the corresponding points. Manual evaluation is extremely time-consuming and does not meet the accuracy requirements.

The objective of machine spatial vision is automatic correspondence analysis, i.e. the automatic unambiguous identification of point correspondences with minimum measurement error for the exact determination of the disparity. The disparity in turn allows to calculate 3D data therefrom. Current applications require high resolution and accuracy of the calculated 3D data and efficient calculation in real time with low power consumption. Techniques and devices currently used for correspondence analysis are not able, or only partially, to meet these requirements. For example, a problem with many techniques is the memory- and calculation-intensive processing of large image patches for reliably identifying correspondences, i.e. matches, which hampers the implementation using fast specialized hardware and slows down the creation of the 3D data.

Many technical applications are based on experience gained through studies of human vision. Human spatial vision is based on two uncalibrated individual lenses with parameters that are variable at runtime. Although humans are able to slightly vary the focal length of both eyes, it is possible to see spatially under various conditions, such as backlighting, fog, and precipitation. However, it is unknown through which method the spatial vision of humans works. Biological and medical studies at least suggest that human stereo vision is based on spatial frequency processing of the light signals received by the human eye on a plurality of spatial frequency scales:

Mayhew, J. E. and Frisby, J. P., 1976, "Rivalrous texture stereograms", Nature, 264(5581):53-56.

Marr, D. and Poggio, T., 1979, "A computational theory of human stereo vision", Proceedings of the Royal Society of London B: Biological Sciences, 204(1156):301-328.

Both sources describe the independent calculation of phase information in a plurality of spatial frequency ranges and in a window. With regard to precise signal processing, a drawback of this approach is that the fundamental contradiction between high spatial resolution and high spatial frequency resolution is not optimally resolved. The disparity signal combined from the phase signals of the individual spatial frequency ranges is noisy. The noise is reduced by prior low-pass filtering in the input image, however, this also removes signal information.

Another reference (Marcelja, S., 1980, "Mathematical description of the responses of simple cortical cells", J. Opt. Soc. Am., 70(11):1297-1300) describes details of the sensitivity characteristics of neurons in the visual cortex in the form of Gabor functions and thus describes the window characteristic of sensitivity for the correspondence analysis.

Besides stereophotogrammetry, there are other techniques for extracting depth information from a plurality of images. US 2013/0266210 A1 describes a method for determining depth information of a scene, which involves capturing at least two images of the scene with different camera parameters, and selecting image patches in each scene. A first approach calculates a plurality of complex responses for each image patch using a plurality of different quadrature filters, each complex response having a magnitude and a phase, and assigns, for each quadrature filter, a weighting to the complex responses in the corresponding image patches. A weighting is determined by a relationship of the phases of the complex responses, and the depth measurement of the scene is determined from a combination of the weighted complex responses. According to one embodiment, confidence measures are assigned to the depth estimates of the different image patches, as estimates of the reliability of the depth scores. For example, the number of pixels in the image patch that are assigned a weighting of 1 by adaptive spectral masking can be used as a measure of confidence.

In general, the wide variety of image evaluation techniques may also use filter operations in which images or image patches are convolved using convolution kernels in order to further process the data obtained in this way. For example, US 2015/0146915 A1 describes a method for object detection in which, first, a convolution is performed of the image data and a convolution kernel, and the convolved images are then processed using a threshold filter. Thereby, the threshold filter masks pixels that presumably contain no information relevant for the object detection, in order to speed up further processing.

Computer Vision

Automated correspondence analysis usually works with two or more digital images, for example as captured by left and right digital cameras (referred to as stereo camera below). For the ideal case, this stereo image pair is assumed to be identical except for a horizontal offset, when neglecting imaging, digitizing, and quantization errors (and if the two cameras are imaging the same object and the same parts of the object are visible from both cameras). If the relative orientation, i.e. the position of the two cameras relative to each other (e.g. base B) is known from prior calibration, epipolar geometry and epipolar lines can be exploited to reduce the correspondence analysis to a one-dimensional search along the imaging of the epipolar lines in the digital images. In the general non-calibrated case, however, the epipolar lines run transversely and convergently through the image space. In order to avoid this, a stereo image pair without y-parallax has to be generated through rectification. As a result, a real stereo camera will behave like the stereo normal case and all epipolar lines will run parallel. Since, for reasons of efficiency, the search should not be performed in the subpixel domain perpendicular to the scanning direction, high rectification quality with a tolerance of less than 0.5 px is required.

In the literature, correspondence analysis is divided into three different groups, namely area-based, feature-based or phase-based techniques.

Area-based techniques represent by far the largest group. Here, a window of size m×n with the intensity values of the left digital image of the stereo camera is compared with the values of a window of the same size in the right digital image of the stereo camera, and is evaluated using a cost function (e.g. sum of absolute differences (SAD), sum of squared differences (SSD) or mutual information (MI)). The correspondence analysis is then performed on the basis of these evaluations of area differences. Prior art algorithms in this field include cross-correlation (e.g. Marsha J. Hannah, "Computer Matching of Areas in Stereo Images", PhD Thesis, Stanford University, 1974; and Nishihara, H. K., 1984, "PRISM: A Practical Real-Time Imaging Stereo Matcher", Massachusetts Institute of Technology) and Semi-Global Matching (Hirschmuller, H., 2005, "Accurate and efficient stereo processing by semi-global matching and mutual information", Proceedings of the 2005 IEEE Computer Society Conference on Computer Vision and Pattern Recognition). A drawback of cross-correlation is that although the disparity information to be detected is aligned along the epipolar lines, the points within the spatial window are equally weighted and analyzed regardless of the orientation of the epipolar lines. This means that the optimal signal-to-noise ratio (S/N) is not achieved.

Feature-based techniques currently do not play any role in generating dense 3D data, since the distinctive points required for this purpose are often unevenly distributed and only occur sporadically (e.g. only at corners and edges of the objects imaged by the stereo camera). They combine one or more properties (e.g. gradient, orientation) of a window m×n in the digital image in a descriptor and compare these features, usually globally in the entire image, with other feature points. Although these neighborhood features are usually very computationally intensive, they are often invariant in terms of intensity, scaling, and rotation, so that they are globally almost unique. Due to this global uniqueness and high computing time, feature-based approaches are primarily used for image registration/orientation, for example to establish the relative orientation (homography) of stereo image pairs.

Phase-based techniques exist but are less well known, although it can be assumed that human vision is based on such a method. These techniques use the phase information of the signals in the left and right image to calculate the disparity as precisely as possible from the phase difference. Studies with random dot stereograms show that human vision cannot be based on the comparison of intensities (Julesz, B., 1960, "Binocular depth perception of computer-generated patterns", Bell System Technical Journal). Further works develop a theory for correspondence analysis based on human psychophysics (Marr, D. and Poggio, T., 1979, "A computational theory of human stereo vision", Proceedings of the Royal Society of London B: Biological Sciences, 204(1156):301-328). This approach is based on the LoG ("Laplacian of Gaussian") zero crossing for different local resolutions and tries to reduce outliers with a coarse-to-fine strategy. Experiments by Mayhew and Frisby (Mayhew, J. E. and Frisby, J. P., 1981, "Psychophysical and computational studies towards a theory of human stereopsis", Artificial Intelligence, 17(1):349-385) show that the zero crossing alone cannot explain the perception of human vision. The authors assume that signal peaks after convolution with a filter are also necessary for stereo vision. Weng notes (Weng, J. J., 1993, "Image matching using the windowed Fourier phase", International Journal of Computer Vision, 11(3):211-236, referred to as "Weng (1993)" below) that the zero-crossing results are too unstable due to few channels, and recommends Windowed Fourier Phase (WFP) as a "matching primitive". Here, WFP is a combination of a plurality of modified windowed Fourier transformations (WFT), in which the phases determined by the individual WFTs are averaged. However, the individual spatial frequencies and phases cannot be captured in spectrally pure way in this case, so that the signal-to-noise ratio is not optimal. A further approach based on the LoG zero crossing (T. Mouats and N. Aouf, "Multimodal stereo correspondence based on phase congruency and edge histogram descriptor," International Conference on Information Fusion, 2013) also uses low-pass filtering prior to the disparity analysis and, for this reason, does not achieve an optimal signal-to-noise ratio either, as will be explained in more detail further below.

Summary of the Phase-based Correspondence Analysis Technique

The image signals of the right and left (color) cameras can each be represented by a Y signal ($Y_{image}$), also known as gray value or luminance signal, and a color signal U and V. Image resolution and contrast are important criteria for the correspondence analysis and measurement accuracy thereof. For this reason, the Y signal ($Y_{image}$), which has a higher resolution than U and V, is primarily used. Thus, two high-resolution $Y_{image}$ channels are compared line by line. The considerations for $Y_{image}$ similarly also apply to the U and V channels.

Both cameras image the same object. When assuming an idealized mapping of the object space into the image space by the camera, corresponding sub-images of the two cameras are identical ($YR_{image} - YL_{image} = 0$). Under real conditions, however, tolerances and differences do occur:

Different angle of view of the cameras towards the object. This results in a different perspective (projective distortion), occlusion (vignetting) and different reflection behavior (Lambertian radiator).

Camera noise (e.g. noise in the sensors of the digital cameras), as well as PRNU (pixel response non-uniformity), and DSNU (dark signal non-uniformity).

Digitization errors and quantization errors.

Different OTFs (Optical Transfer Functions) due to different lenses, as well as loss of contrast caused by the rectification in the corners of the image (in particular barrel distortion with wide-angle lenses).

The Fourier series decomposition of a signal for a frequency ω provides a real part and an imaginary part. The real part ("even") with the cosine signal describes the even part of the Fourier series, and the imaginary part ("odd") with the sine signal describes the odd part. The phase shift or disparity δ in a bandpass filtered one-dimensional signal pair $YL_{signal}$ and $YR_{signal}$ is calculated according to the prior art as shown in equation (2) (Jepson, A. D. and Jenkin, M. R. M., 1989, "The fast computation of disparity from phase differences", IEEE Computer Society Conference on Computer Vision and Pattern Recognition).

$$\Delta_{odd} = YL_{cos} \cdot YR_{sin} - YL_{sin} \cdot YR_{cos} = YL_0 \cdot YR_0 \cdot \sin(\omega\delta) \qquad (2)$$

$$\Delta_{even} = YL_{cos} \cdot YR_{cos} + YL_{sin} \cdot YR_{sin} = YL_0 \cdot YR_0 \cdot \cos(\omega\delta)$$

$YL_{cos}$, $YL_{sin}$, $YR_{cos}$, and $YR_{sin}$ are the results of the convolution of $YL_{signal}$ and $YR_{signal}$ with a cosine and sine function, respectively. The disparity δ will then result from equation (3), where the amplitude product $YL_0 \cdot YR_0$ cancels out.

$$\delta = \frac{\arctan\left(\frac{\Delta_{odd}}{\Delta_{even}}\right)}{\omega} \qquad (3)$$

However, the calculation according to equation (3) comes with some drawbacks:

Two convolution integrals (sine, cosine) for $YL_{signal}$ and $YR_{signal}$ for one signal pair in each case. Four convolution operations are required for each disparity value δ for a defined spatial frequency ω. Two multiplications and one addition with a large word length are required both in the numerator and in the denominator of equation (3). The disparity is very small compared to the products, high dynamics are required: rounding errors generate noise. This results in high processing complexity for real-time capable implementations.

The fundamental contradiction between high spatial resolution (small spatial window) and high spatial frequency resolution (only one spatial frequency) leads to poor signal quality. The averaging over a plurality of measurements at different spatial frequencies as used according to the prior art brings about an improvement, but is not optimal.

What is required is a reduction in the processing complexity and a significant improvement in signal quality, in particular S/N. This leads to the following objectives:

Defining an optimal correspondence function that combines the disparity information within the limits of a sufficiently small measurement window in the spatial domain and also within a sufficiently small measurement window in the spatial frequency domain so as to obtain a unified signal such that the phase signal errors as calculated according to the prior art individually for each spatial frequency using the windowed Fourier transformation (WFT) are avoided. This solution of the optimal correspondence function (SSD(δ)) with respect to δ is referred to as group disparity function (SSD'(δ)/SSD"(δ)).

Separately acquiring the optimal correspondence function with information about the disparity in the direction of the camera's base B vector and a separately calculated confidence function with additional information that does not depend on the disparity in the direction of the camera's base B vector. The confidence function is used to select the correct disparity in the case of a plurality of candidates without thereby increasing the noise of the disparity measurement by affecting the group disparity function.

Performing a model calculation to determine profiles of optimal convolution kernels with the aim of calculating the group disparity function with a minimum number of convolution operations and low noise.

Implementing an adaptive behavior of the group disparity function with the aim of controlling the actually effective transfer function in the spatial frequency range on the basis of the current image content within the window such that the effective noise bandwidth depends on the respective strongest amplitude within a Fourier series of the image signal. This results approximately in the behavior of an optimal filter according to Wiener, N., 1949, "Extrapolation, Interpolation, and Smoothing of Stationary Time Series: With Engineering Applications", The MIT Press (referred to as "Wiener (1949)" below).

Implementing the correspondence analysis with high-resolution camera data and unbiased disparity information without prior low-pass filtering. Improving noise through low-pass filtering of the 3D data or of the set of disparity measurement results on which these 3D data are based following the correspondence analysis.

Controlling the optimal transfer function of the group disparity function through profiles for adjustment to the power spectrum of the images.

Minimizing noise from disturbances in the epipolar geometry (y-parallax) by adjusting the coplanarity condition of the optical axes and by monitoring and correcting the relative shift of the stereo image pair (optokinetic nystagmus) during runtime.

The invention is therefore based on the object of providing a device and a method that can be used to perform a correspondence analysis in image data in a particularly low-noise and efficient manner while improving the issues mentioned above. This object is achieved by the subject-matter of the independent claims. Advantageous embodiments are specified in the respective dependent claims.

SUMMARY OF THE INVENTION

For achieving the aforementioned object, a correspondence analyzer is provided for determining the disparity of corresponding image elements in two digital individual images, also referred to as frames in the art. This correspondence analyzer for determining the disparity δ, i.e. a shift between corresponding image elements in two digital individual images, comprises a computing device which is configured to select image patches from the two individual images in each case, the image patch of one of the individual images being chosen as a reference image patch, and a sequence of search image patches being selected in the other individual image. The reference image patch and the search image patches preferably lie approximately on an epipolar line, and the disparity for a search image patch is therefore the distance of this search image patch to the reference image patch on the epipolar line. The set of search image patches and their disparities represents the disparity range where the correspondence analyzer should find correspondences, i.e. matches.

In contrast to other techniques, information from the image patches that is relevant for determining the disparity is combined into a unified correspondence function which evaluates information from a preferably rectangular spatial window, i.e. from the image patches, and from a preferably rectangular spatial frequency window that comprises a plurality of spatial frequencies. An advantage thereof is that it avoids to first extract individual spatial frequencies thereby introducing noise and measuring the disparity for each of these spatial frequencies, and then to interpolate these measured values thereby again introducing noise, as is the case with other techniques. The relationships between size of the spatial window, size of the spatial frequency window, and the optical transfer functions of the cameras which are provided by the individual images will be explained in more detail further below.

The correspondence function $SSD(\delta_p)$ is obtained from data from image patches, which are further processed into signals which in turn are convolved with specially defined convolution kernels. Both will be explained in more detail further below. In each case, the pairing of the reference image patch with a search image patch having a disparity $\delta_p$ is used to determine the value of $SSD(\delta_p)$ at the point $\delta_p$. The computing device is therefore furthermore configured to generate a plurality of signals $YL_{signal,v}$ from the reference image patch and a plurality of signals $YR_{signal,v}$ from each of the search image patches; and to perform a convolution of the plurality of signals $YL_{signal,v}$ of the reference image patch with substantially even and substantially odd convolution kernels stored in a memory, in the spatial window, with the even convolution kernels comprising a weighted sum of a plurality of even harmonic functions of different spatial frequencies and the odd convolution kernels comprising a weighted sum of a plurality of odd harmonic functions of different spatial frequencies; and for each of the search image patches, to perform a convolution of the signals $YR_{signal,v}$ with the or these convolution kernels stored in the memory in the spatial window; and to calculate the differences of the respective convolution results for each signal pair $YL_{signal,v}$ and $YR_{signal,v}$.

The correspondence function is formed and the convolution kernels are selected in such a way that a local extremum of the correspondence function at a point $\delta_p$ indicates a possible correspondence at this point. Alternatively, it is also possible to directly determine the first derivative of the correspondence function, with zero crossings thereof indicating possible correspondences. The computing device is therefore furthermore configured to process the differences of the convolution results in a non-linear manner for each of the search image patches and to accumulate them to obtain a function value of a correspondence function $SSD(\delta_p)$ at the point $\delta_p$, or to calculate, from the differences in the convolution results, the first derivative $SSD'(\delta_p)$ of the correspondence function $SSD(\delta_p)$ with respect to $\delta_p$ at the point $\delta_p$, and thus to obtain a function value of a correspondence function $SSD(\delta_p)$ or its derivative at the point $\delta_p$, wherein $\delta_p$ denotes the distance of the reference image from the search image; and to determine local extrema of the correspondence function $SSD(\delta_p)$ or zero crossings of the derivative $SSD'(\delta_p)$ of the correspondence function $SSD(\delta_p)$; and to output the point $\delta_p$ of one of the local extrema or of one of the zero crossings as the disparity $\delta$.

Preferably, the disparity should also be determined and output with a finer resolution than the finite set of search image patches, i.e. at a point $\delta_p$, which is referred to as a subpixel-precise disparity value and for which information from adjacent search image patches can be used. A preferred option to this end is to calculate a group disparity $SSD'(\delta_p)/SSD''(\delta_p)$ in the neighborhood of $\delta_p$ in order to determine the subpixel-precise portion of the disparity value.

The output can be performed in the form of an entry in a disparity map, for example, where the determined disparity is assigned to the position of the corresponding reference image patch. Output generally refers to the provisioning of the value for further processing or display. Further processing may include, for example, determining the distance of the object. Further processing may also include various filtering operations on the data, which will be explained further below.

A correspondence analysis for digital individual images, or frames, usually is an execution that is subject to noise and tolerances, for example due to discretization and quantization effects in the representation of frames as a finite number of pixels with limited resolution (e.g. 8 bits per pixel and color channel). The situation is similar for convolution in the spatial window with discrete convolution kernels, in this case with the additional question of how to choose the coefficients of these convolution kernels such that the convolution results are low-noise and useful for correspondence analysis.

It is for these reasons, among others, that the present invention discloses how convolution kernels can be selected within the framework of a continuous signal model with continuous functions and a correspondence function can be obtained that can be directly transferred to discrete processing with discrete convolution kernels, while at the same time allowing for low-noise determination of the disparity. The correspondence function and the convolution kernels are in particular selected in such a way that existing disparity signals, i.e. information from the image patches that is relevant for determining the disparity, is reliably used for the correspondence analysis, and so that existing noise, i.e. other information that is not relevant, is largely ignored. This is important because otherwise the noise can lead to an inaccurate determination of the disparity. Furthermore, it is disclosed how convolution kernels can be selected for specific profiles of input images or image patches, so that optimal filters are created together with the correspondence function.

Conversely, this means that the invention, based on the signal model, discloses a plurality of sets of discrete convolution kernels, and that for each one thereof there are additional similar discrete convolution kernels that differ only in that they contain a little additional noise or contain a similar amount of simply a different kind of noise, and thus are practically disclosed as well. It is unlikely that such sets of convolution kernels can be found by chance or through a simple search that is not guided by a model, simply because of the large number of possible convolution kernels (in the exemplary embodiment with 4 convolution kernels as explained below, for example, a total of 32 coefficients have to be determined, which, for example for a 8 bit resolution, corresponds to $256^{32}$ combinations per coefficient).

An important component of the invention is the use of both convolution kernels consisting of a weighted sum of a plurality of even harmonic functions of different spatial frequencies and convolution kernels consisting of a sum of a plurality of odd harmonic functions of different spatial frequencies. As a result, the number of convolution operations required can be less than or equal to the number of considered spatial frequencies in the spatial frequency window, so that the required computational effort is less than with other techniques, while at the same time having a better signal-to-noise ratio. Discrete convolution kernels include these sums of functions in particular when the convolution kernels constitute an exact discretization of the respective sums at the individual positions of the convolution kernels. If there is a deviation between the discrete coefficients of the convolution kernels and the sums of ideal even or odd functions, it is, however, in particular preferred to have a high correlation between the discrete values and the underlying functions. According to a particularly preferred embodiment, it is contemplated that the coefficients of the filter kernels correspond to the function values of weighted sums of harmonic even or odd functions, or have a correlation coefficient to the function values that has an absolute value of at least 0.8, preferably an absolute value of at least 0.9. According to a further embodiment, the coefficients have a high coefficient of determination $R^2$ to the function values. The coefficient of determination is preferably at least 80%, in particular at least 90%, most preferably at least 95%. If the aforementioned values of the correlation coefficient and/or of the coefficient of determination are reached, the coefficients of the even and odd convolution kernels will still represent a weighted sum of a plurality of even harmonic functions of different spatial frequencies, or a weighted sum of a plurality of odd harmonic functions of different spatial frequencies, respectively, with sufficient accuracy.

It is advantageous, but not compulsory, that the positions to be measured in the individual images lie in the center of the respective image patches or convolution kernels. The convolution kernels may also be discretized such that the functions for a position adjacent to the center of the image patches or convolution kernels are even or odd, respectively. Furthermore, the sums do not have to represent even or odd functions in a strict sense. The entries in the convolution kernels may reflect a slightly asymmetrical function profile and/or may be even or odd, respectively, with respect to a position adjacent to the center of the reference image patch and search image patches. For example, the extension of a convolution kernel by an additional coefficient at the edge, which has a small value compared to the other coefficients of the convolution kernel, results in only a small additional noise contribution in practice. Furthermore, the convolution kernels may be present in combination with convolutions from previous processing steps, which however still comprises a convolution operation within the meaning of the present invention. Thus, the variants described above still comprise sums of a plurality of even or odd harmonic functions.

It is particularly preferred to form the correspondence function $SSD(\delta_p)$ by non-linear processing, such as by squaring the feature differences or the convolution results, respectively. Both the non-linear processing with the $2^{nd}$ power and its derivative are operations that are particularly easy to calculate and are therefore easy to implement in appropriately adapted hardware. Besides this calculation, non-linear processing with characteristic curves which contain portions of the fourth or greater even powers of the differences or limit the differences beyond a threshold, is also possible.

The selection of the convolution kernels such that they comprise weighted sums of even and odd harmonic functions, respectively, and the non-linear processing of the differences of the convolution results, in particular the squaring thereof, enables a further aspect of the invention, through which the influence of the object phases in the signal model on the results of the disparity measurement is greatly reduced. The object phases in the signal model can change, for example, if a texture on an object to be analyzed would be moved without moving the object in space. Put simply, this means that the unified correspondence function provides low-noise measurement results that are largely independent of what texture or pattern an object has, if a signal that can be used for disparity measurement exists in the selected spatial frequency range. For this purpose, it is intended for the convolution kernels to be selected in such a way that in the signal model for each signal v in the spatial frequency range, the convolution operations of the $k_{max}$ even and $l_{max}$ odd functions each transfer sums with weighted signal components of a group of spatial frequencies with amplitudes $A_m$, such that in the correspondence function $SSD(\delta)$ two partial sums are obtained for each signal v and each spatial frequency with index m, the first one with terms characterized by squared amplitudes $A_m^2$ from the results of the convolution operations using the even functions, the second one with terms characterized by squared amplitudes $A_m^2$ from the results of the convolution operations using the odd functions. The first partial sum and the second partial sum can be combined according to the trigonometric Pythagoras, in particular exactly or in an approximation, such that the sum $SSD_{inv}(\delta)$ of the two partial sums is independent of the object phase $\Delta m$. Specifically, the convolution kernels in the spatial range can be selected in such a way that in the signal model for each signal v in the spatial frequency range, the convolution operations of the $k_{max}$ even and $l_{max}$ odd functions each transfer sums with weighted signal components of a group of spatial frequencies with amplitudes $A_m$, such that two terms are obtained in the correspondence function $SSD(\delta)$ for each signal v and each spatial frequency with index m, wherein the first term is a product of a squared amplitude $A_m^2$, a first constant, and a squared sine function, and the second term is a product of a squared amplitude $A_m^2$, a second constant, and a squared cosine function, and with the values of the first and second constants being equal or being equal within a tolerance of +/−20%.

Put simply, this means that when a signal is provided, the largest components of the value of the correspondence function will be independent of the object phases and are therefore available for determining the disparity with low noise.

A deviation of the disparity from the actual value caused by the various noise processes can be characterized by a standard deviation $\sigma\delta$ of the deviations. Systems known from the prior art typically achieve standard deviations of 0.25 pixels and more. Usually, the standard deviation of a well-adjusted system is between 0.25 and 0.5. By contrast, the correspondence analyzer presently disclosed allows to achieve lower standard deviations. Generally, the convolution kernels can be chosen such that for the determination of the disparity, a local standard deviation of the measurements of the disparity of less than 0.2 pixels can be achieved, even 0.1 pixels in the case of the shift of a planar object which has an intensity modulation along the direction of the epipolar line, in particular including a spatial frequency in the spatial frequency range, or which has a corresponding texture, and with the shift of the object occurring at a constant distance Z from the camera and along the epipolar line. In this case, the standard deviation is in particular little influenced by systematic errors that arise in methods known from the prior art. Such a test can be used to determine the interference of the object phases explained above. The test can be performed with captured camera images, but optionally also with synthetic or calculated, e.g. rendered, images.

The signals $YL_{signal,v}$ and $YR_{signal,v}$ are calculated from the intensities of the pixels of the respective image patch. The signals may in particular be obtained by performing a convolution of the image intensities with suitable convolution functions, which functions may, for example, include or comprise an averaging. Particularly suitable harmonic functions are the cosine function as an even function and the sine function as an odd function. A convolution approximately perpendicular to the epipolar line is preferred, since the signals are convolved approximately along the epipolar line. The order of the convolutions perpendicularly and along the epipolar line is arbitrary, the convolutions may in particular also be performed simultaneously with suitable convolution kernels. The selection of the convolution kernels for determining the signals, in conjunction with the special correspondence function, again follows the goal of preserving information that is useful for the disparity calculation while reducing the impact of noise. To this end, it is in particular contemplated according to a further embodiment that the computing device is configured to generate a plurality $v_{max}$ of signals $YL_{signal,v}$ from the reference image patch by convolution operations of the data of the reference image patch perpendicular or approximately perpendicular to the epipolar line, and to generate a plurality $v_{max}$ of signals $YR_{signal,v}$ from each of the search image patches by convolution operations of the data of the respective search image patch perpendicular or approximately perpendicular to the epipolar line, wherein the convolution operations that generate the signals and the convolution operations of the $k_{max}$ even and $l_{max}$ odd functions in the signal model are selected in such a way, that the latter convolution operations each transfer sums with weighted signal components of a plurality of spatial frequencies, which are denoted by different values of the index m below; and such that for each signal, a first partial sum is obtained in the correspondence function $SSD(\delta)$, whose terms are independent of the object phases $\Delta_m$, and a second partial sum is obtained, whose terms are dependent on the object phases $\Delta_m$; wherein when accumulating the first partial sums of each of the $v_{max}$ signals, a constructive accumulation is obtained, in which the individual terms do not compensate each other; and when accumulating the second partial sums of each of the $v_{max}$ signals, a statistical accumulation is obtained, in which these noisy components at least partially compensate each other statistically. The accumulation of the first and second partial sums occurs when the values of the correspondence function are calculated. The term "statistical accumulation" as used in the present disclosure means that the result thereof is obtained by summing up random, i.e. statistically distributed, noise components of the image signals. This statistical accumulation has the advantageous property that errors caused by noise can at least partially compensate each other.

The components of the invention explained so far are designed to allow for a particularly precise determination of disparities, in particular with sub-pixel accuracy.

However, this is not the same goal as determining whether actual correspondence is likely in the range of a particular disparity, i.e. determining the confidence of a possible correspondence. While for the correspondence function as much information as possible that is not useful for determining the disparity value is ignored, the same information may be relevant for determining the confidence. A simple example is a search image patch whose pixels all have intensities that are greater by 30% than the corresponding pixels in the reference image patch. This consistent difference in brightness does not provide any useful information for an accurate disparity determination and is masked out by the preferably mean-free convolution kernels for the convolutions of the signals in the correspondence function, since it would otherwise only generate noise which would, for example, mask a rather low-contrast texture that is useful for the accurate determination of the disparity. At the same time, a second search image patch exists in this example, in which the consistent difference in brightness is only 5% and this small deviation is caused by different control of the cameras. The correspondence function will thus determine very precise but potentially ambiguous results with more than one search image patch as candidates for a possible correspondence. A separate determination of the confidence will then show that the probability of a correspondence is higher in the area of the second search image patch with a difference of only 5%.

For this reason, the correspondence function is supplemented by a preferably independent confidence function. In contrast to other methods which do not distinguish between these two objectives and, for example, determine the disparity and the confidence using only one function, the approach disclosed here has the advantage of allowing both low-noise and therefore accurate disparity determination and good confidence determination, instead of just allowing for a tradeoff between the two. Therefore, according to a further aspect, independently of the determination of a correspondence as described herein, in particular also independently of the specific convolution of image signals as described herein, a correspondence analyzer is provided which comprises a computing device that is configured to select respective image patches from each of the two individual images, wherein at least one image patch of one of the individual images is selected as a reference image patch, and search image patches are selected in the other individual image, and to calculate a plurality of candidates for a disparity value from the image patches, and the computing device is furthermore configured to select information from the reference image patch and the search image patches, and on the basis of this information to select confidence vectors for possible disparity values, which are suitable for estimating whether the respective result indicates an actual correspondence of the respective search image patch with the reference image patch. This is in particular helpful when the confidence vectors provide information that is not already provided by the correspondence function, or not provided in the same quality. The computing device is therefore also configured to select values of at least one element of the confidence vector using functions which, at least for some classes of reference and search image patches, are able to classify candidates as valid or invalid with a higher probability than is possible using the correspondence function alone. The consistent difference in brightness mentioned above is one example of this.

Despite the low-noise determination of disparities, residual noise will remain, which may be relevant for both the correspondence function and the confidence values. The remaining noise can be further reduced by applying a low-pass filter to the disparity values or confidence vectors calculated for a plurality of reference image patches. In contrast to the prior art, in particular to other methods that apply a low-pass filter to the signals before they are used to determine the disparity, much more effective noise reduction is achieved with comparable contrast and comparable resolution of the disparity measurements in the individual image by processing the full signal bandwidth and applying the low-pass filter downstream of the correspondence analysis. Furthermore, measurement results with lower confidence may be included less strongly by a low-pass filter. Accordingly, in one embodiment it is contemplated for the computing device to be configured to filter at least one of the following variables with a low-pass filter: the calculated disparity values, the confidence values, or the disparity values weighted by confidence values.

The search image patches are selected so as to lie at least approximately along or on the epipolar line. Accordingly, the signals of the search image patches form one-dimensional functions approximately along the epipolar line. The disparity is furthermore given by the curve length between the corresponding image elements along the epipolar line. The expressions "approximately along the epipolar line" or "approximately perpendicular to the epipolar line" are used to express that the actual epipolar line does not have to extend exactly along the image directions of the rectified images, due to adjustment inaccuracies or optical distortions, for example. Therefore, within the scope of the given inaccuracies, the term "approximately along the epipolar line" should be equated with "along the epipolar line", and "approximately perpendicular to the epipolar line" should be equated with "perpendicular to the epipolar line".

Generally, it is useful to select the sequence of the search image patches in such a way that the epipolar line runs through the search image patches, or so that the search image patches include the epipolar line. As long as the epipolar line runs through a search image patch, the search image patch lies approximately on the epipolar line.

The disparity range to be expected is a predetermined maximum range in the x-direction, or the direction along the epipolar line, within which a search image patch corresponding to the reference image patch can be located. The disparity range to be expected may be, for example, ±50 pixels in the x-direction around the pixel of the digital image for which the disparity is to be determined.

The invention also relates to the method for determining the disparity as performed in particular using the correspondence analyzer described herein. Accordingly, a method is provided for determining the disparity of corresponding image elements in two digital individual images which preferably have been rectified to the stereo normal case, wherein, for determining the disparity $\delta$, a computing device is used to select respective image patches from the two individual images, the image patch of one of the individual images being chosen as a reference image patch, and a sequence of search image patches being selected in the other individual image, and to generate a plurality $v_{max}$ of signals $YL_{signal,v}$ from the reference image patch and a plurality $v_{max}$ of signals $YR_{signal,v}$ from each of the search image patches, and to perform a convolution of the plurality of signals $YL_{signal,v}$ of the reference image patch with even and odd convolution kernels stored in a memory in a spatial window, with the even convolution kernels comprising a weighted sum of a plurality of even harmonic functions of different spatial frequencies and the odd convolution kernels comprising a weighted sum of a plurality of odd harmonic functions of different spatial frequencies, and to perform a convolution of the signals $YR_{signal,v}$ for each of the search image patches with these or the aforementioned convolution kernels stored in the memory in the spatial window, and to calculate the differences of the respective convolution results for each signal pair $YL_{signal,v}$ and $YR_{signal,v}$, and to process the differences of the convolution results for each of the search image patches in a non-linear manner and to accumulate them to obtain a function value of a correspondence function $SSD(\delta_p)$ at the point $\delta_p$, or to calculate, from the differences of the convolution results, the first derivative $SSD'(\delta_p)$ of the correspondence function $SSD(\delta_p)$ with respect to $\delta_p$ at the point $\delta_p$, and thus to obtain a function value of a correspondence function $SSD(\delta_p)$ or of its derivative at the point $\delta_p$, wherein $\delta_p$ denotes the distance of the reference image from the search image; and to determine local extrema of the correspondence function $SSD(\delta_p)$ or zero crossings of the derivative $SSD'(\delta_p)$ of the correspondence function $SSD(\delta_p)$, and to output the point $\delta_p$ of one of the local extrema or of one of the zero crossings as the disparity $\delta$, or to calculate and output a subpixel-precise value of the disparity at the point $\delta_p$.

The invention also relates to a stereo camera comprising two cameras, each of which comprises a camera sensor and a lens, in which the optical centers of the lenses are spaced apart from each other by a base width, and the stereo camera comprises a correspondence analyzer as described above, or is configured to perform the method as described above. However, an arrangement comprising two cameras is not compulsory. In principle, 3D data can also be obtained from digital images captured sequentially at different locations.

A major application of the correspondence analyzer is the determination of the disparity in stereo images. Accordingly, the invention also relates to a stereo camera comprising a correspondence analyzer and a capturing device for capturing pairs of digital images from equally spaced viewing directions with overlapping capturing areas. The computing device of the correspondence analyzer calculates the distance coordinates of the image elements from the disparities of corresponding image elements. The distance between the viewing directions (optical centers) is the base B. The distance coordinate Z can then be calculated by the computing device according to the aforementioned equation (1) as $Z=B \cdot f/\delta$ (with $\delta$ in [mm]).

The invention, its background and advantages will be explained in more detail below, also with reference to the accompanying figures.

DETAILED DESCRIPTION

Rectification

The objective of rectification is to establish the epipolar geometry based on the model of the stereo normal case. A non-linear geometric transformation corrects for distortion, projective distortion, and relative orientation of the two images (left and right image) in such a way that object points are imaged on the same line of the left and right camera images with subpixel accuracy, regardless of their distance. Correspondence analysis is thus reduced to a one-dimensional problem.

For a rectification the most precise possible, three sub-steps can be performed:
Correction of the Internal Orientation of the Camera This refers to a correction for the non-linear geometric distortions of the lens, the focal length f, and sensor unevenness of the camera.
Adjustment of the Coplanarity Condition The skewed optical axes of the stereo system are a major source of error outside the calibration distance. A restrictive coplanarity condition for both axes reduces this error to a minimum. In practice, this condition can be realized by an eccentric sleeve in which the camera lens is held, which is in the form of a micro lens, for example. The relative position of the optical axes can be determined, for example, by measuring a test image at 2 or more distances, and the position of one of the optical axes can then be adjusted by rotating an eccentric so that both axes become coplanar.

Figure 1:
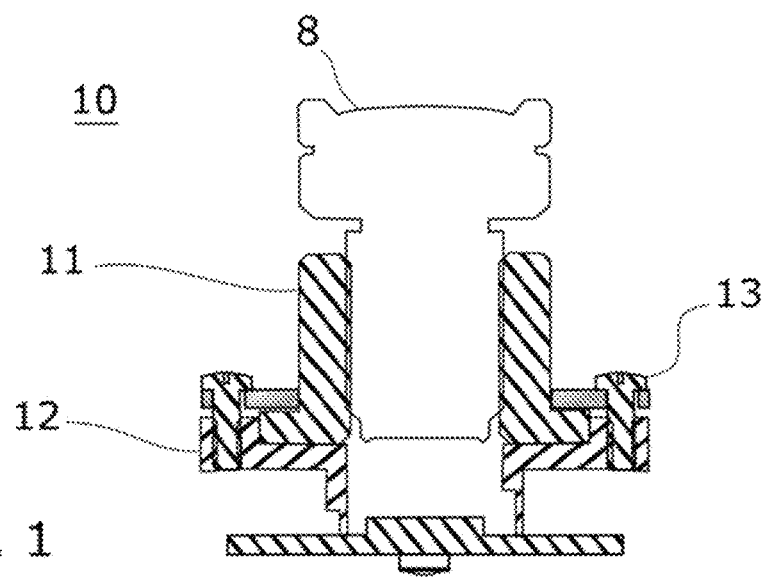
FIG. 1 shows a camera lens with an adjustment device for adjusting the position of the optical axis.

FIG. 1 shows an exemplary embodiment of a lens mount 10 with a lens 8. The lens mount 10 comprises two eccentric elements 11, 12 which can be rotated relative to one another. Lens 8 is screwed into the eccentric element 11. Rotating the eccentric elements 11, 12 relative to one another allows to change the position of the optical axis of the lens 8 without changing the distance between the lens and the image sensor and thus maintaining the position of the image plane. After the adjustment, the eccentric elements 11, 12 can be clamped onto one another by screws 13 and thus fixed to one another. According to one embodiment it is contemplated for one of the lenses to be held in the adjustable eccentric which comprises the two eccentric elements 11, 12, so that coplanarity of the optical axes of the lenses can be adjusted by rotating the lens in the eccentric in front of a test image. This embodiment of a stereo camera may in particular also be employed independently of the correspondence analyzer according to the present disclosure and the special processing of image data described here. It will be obvious to a person skilled in the art that a stereo camera comprising an eccentric for adjusting coplanar axes will also be possible and useful in conjunction with other image processing techniques. Therefore, more generally and without being limited to the correspondence analyzer described herein, a stereo camera 2 with two cameras 21, 22 is provided, each comprising a camera sensor 5 and a lens 8, 9, with the optical centers of the lenses 8, 9 including the camera sensors 5 arranged so as to be spaced apart from one another by a base width B, and with at least one adjustable eccentric provided, which can be adjusted to change the orientation and position of the optical axis of one of the lenses 8, 9, so that a coplanarity error of the optical axes of the lenses can be corrected. The eccentric may be configured as described above, but modifications thereof are conceivable as well. For example, it would be conceivable to provide the lenses fixedly mounted to one another and to use the eccentric to adjust one of the cameras relative to the associated lens.
Correction of the External Orientation of the Camera Once the correction of the inner orientation of the camera has been accomplished, outer orientation remains to be achieved. This is an affine transformation with rotation and translation.

Rectification is based on the principle of a virtual camera (VIRCAM). The camera stores rectification data in the form of a table which contains the position information of the real (x,y) coordinates in image I for each target coordinate (i,j) in the epipolar grid. Since the coordinates (x,y) are rational numbers, interpolation in a 2×2 px area around the pixel is advantageous for noise minimization. The VIRCAM scans in a virtual grid. For each virtual grid point, an interpolation is made in the 2×2 px area around the image I to the target grid (i,j). This geometry correction is non-linear.

Figure 2:
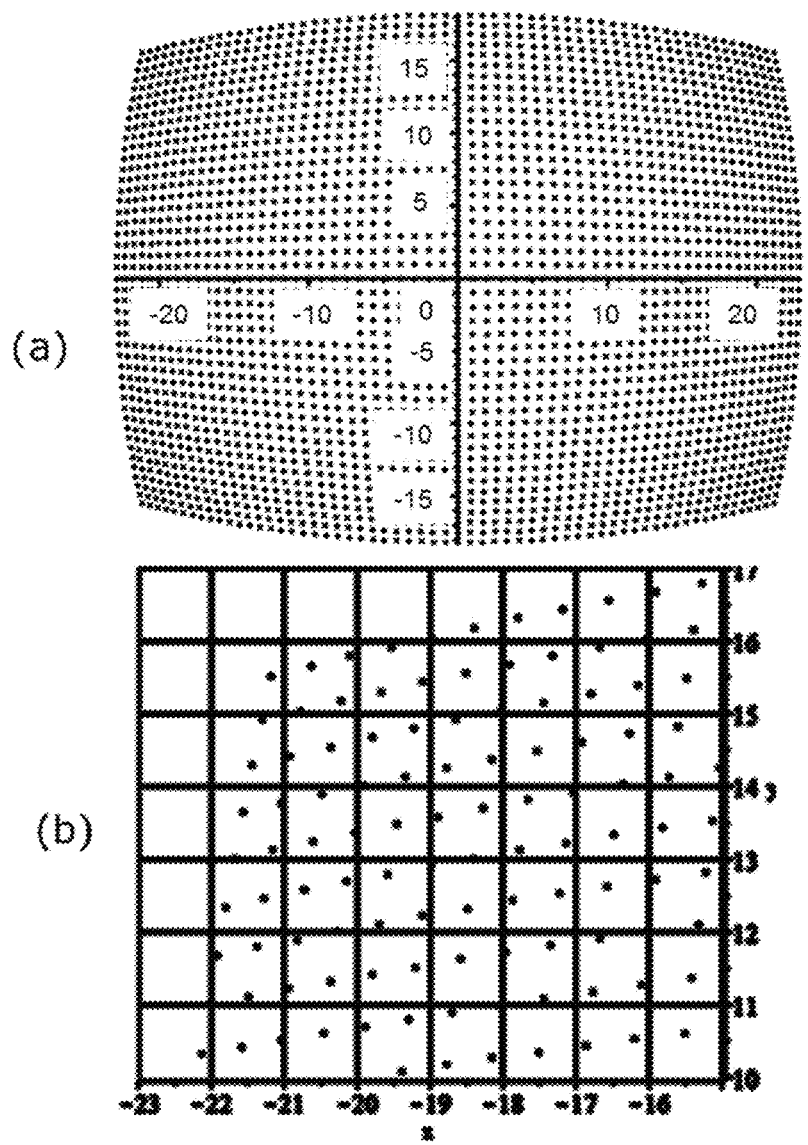
FIG. 2 shows a grid distorted by the imaging of a camera, and a rectified grid.

For illustration purposes, panel (a) of FIG. 2 shows an example of the distortion of a regular grid in the camera image. Due to the lens distortion, a regular grid of the object space is distorted, for example in a barrel-shaped way as shown. This distortion and any projective distortions are corrected by the rectification in the VIRCAM. This involves a virtual transformation of the image coordinates (x,y) into the coordinate system (i,j) of the VIRCAM. Due to this rectification, the pair of stereo images of the VIRCAM behaves like the stereo normal case. Panel (b) shows a section of the target grid shown as a grid superimposed on the real (x,y) coordinates shown as points.

Figure 3:
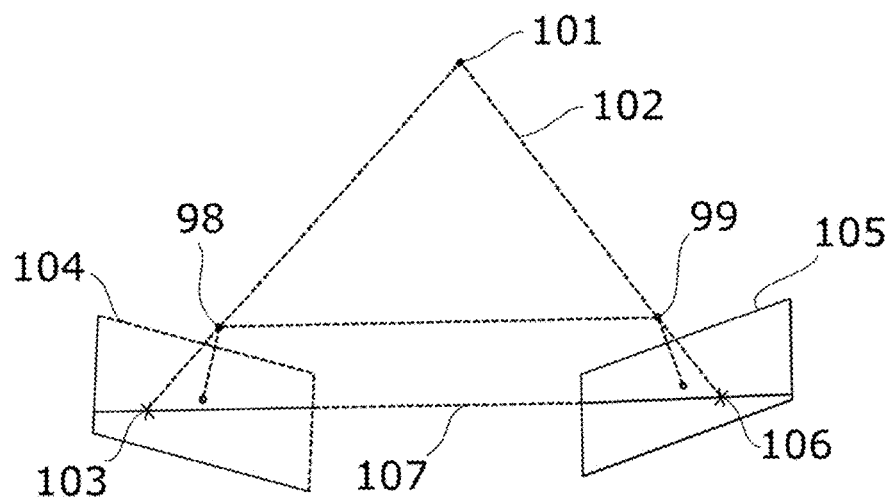
FIG. 3 shows epipolar geometries for the general case and for the stereo normal case.
Figure 3:
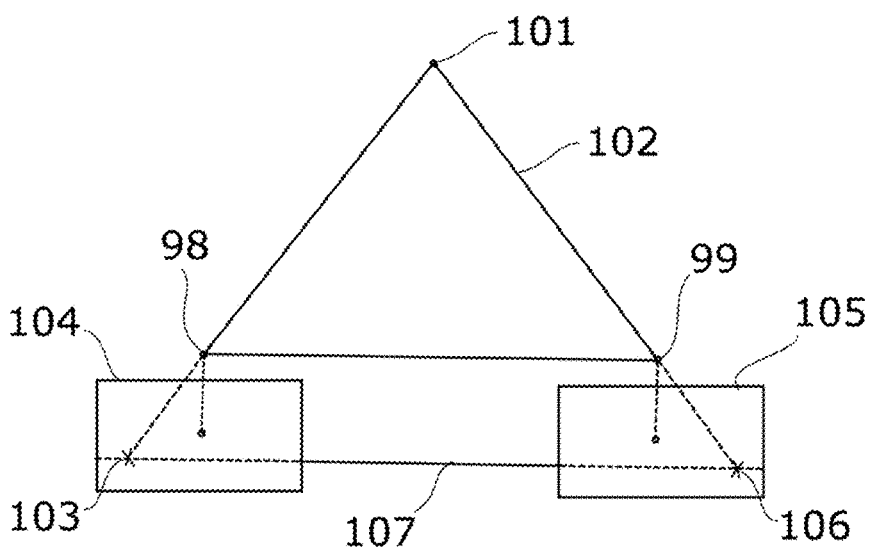

FIG. 3 shows the epipolar geometry of a pair of stereo images comprising images 104, 105, the epipoles 98, 99, and the epipolar plane 102. Panel (a) shows the general stereo case. Panel (b) represents the stereo normal case. The epipolar geometry describes the linear relationship between the orientation of the cameras, a pixel 103 of image 104 and its point correspondence in pixel 106 of the other image 105. The corresponding pixels 103, 106 lie on epipolar line 107. Once a point correspondence has been found, the associated 3D point 101 results from the parameters of the stereo camera (focal length and base) and the pixel correspondence, i.e. pixels 103, 106 corresponding to the 3D point.

Mathematical Derivation

From each of the rectified images of a stereo camera in the stereo normal case ($YL_{image}$ or $YR_{image}$), $v_{max}$ row signals $YL_{signal,v}$ or $YR_{signal,v}$ (for $v=1 \ldots v_{max}$) are selected. These row signals can be taken directly from the rectified images (e.g. the intensity values on the respective row in $YL_{image}$ and $YR_{image}$) or after a preceding convolution with $k_y$ even and $l_y$ odd convolution kernels perpendicular to the row direction of the rectified images. Furthermore, the convolution in y-direction can also be performed after the convolution in x-direction, i.e. to obtain the row signals. That is, the order of convolution operations is interchangeable. In particular, the computing device may be configured to perform a convolution of the image patches using a set of $v_{max}=k_y+l_y$ convolution kernels in the y-direction, so as to produce a number of $v_{max}$ signal pairs $YL_{signal,v}$ and $YR_{signal,v}$, which are defined in a spatial window of $-T/4 \ldots +T/4$. The y-direction is the image direction approximately perpendicular to the epipolar line. For an optimal calculation of the disparity, it is advantageous to limit the band to the spectrum of the signals that is actually present. Recommendable sizes for the spatial window and for T can be found similarly to the considerations described further below for the sizes of the convolution windows in the x-direction. Any convolutions in the y-direction can be separated from the convolutions in the x-direction that will be described further below. It is not mandatory, but advantageous, to perform the convolution in the y-direction first.

Figure 5:
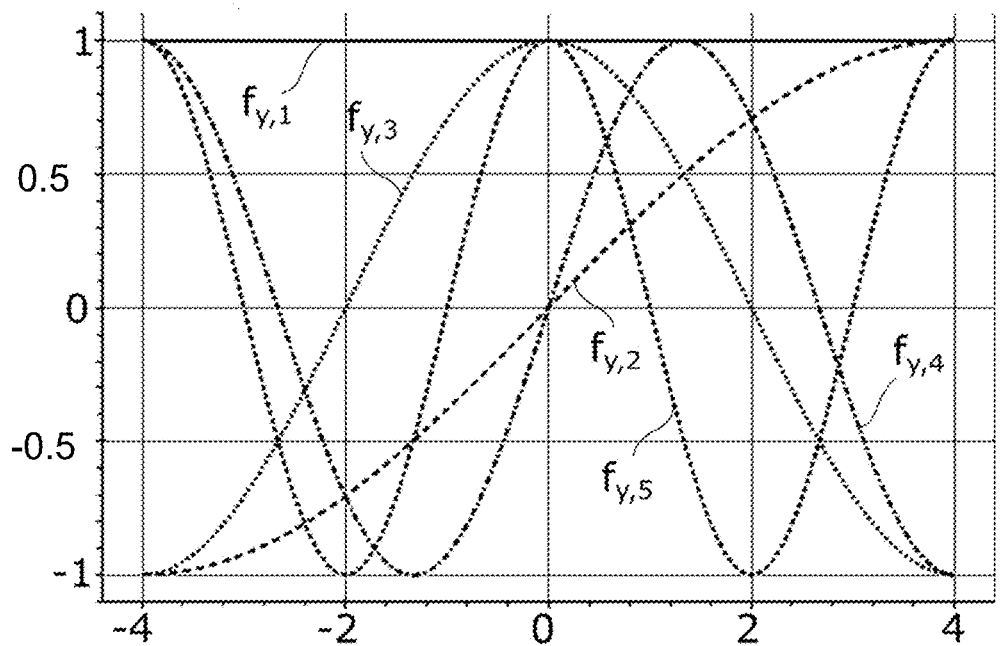
FIG. 5 shows function values of exemplary convolution kernels for convolution of the image data in the y-direction, perpendicular to the epipolar line.

Exemplary convolution kernels $f_{y,v}$ for $v_{max}=5$ and $T=16$ px are shown in Table 1 (columns represent the respective positions in a convolution kernel). FIG. 5 shows the function values of the convolution kernels in the y-direction from Table 1. For exactly rectified stereo images, a large number of similar convolution kernels with the same effect exist, and $v_{max}$ can also take values other than 5. In real applications, the rectification will be subject to tolerances, the resulting noise will be considered further below. As will also be discussed further below, noise can be further reduced by using a different form of convolution kernels.

TABLE 1

| y | −3.5 | −2.5 | −1.5 | −0.5 | 0.5 | 1.5 | 2.5 | 3.5 |
|---|---|---|---|---|---|---|---|---|
| $f_{y,1}$ | 1 | 1 | 1 | 1 | 1 | 1 | 1 | 1 |
| $f_{y,2}$ | −0.97 | −0.83 | −0.55 | −0.19 | 0.19 | 0.55 | 0.83 | 0.97 |
| $f_{y,3}$ | −0.9 | −0.37 | 0.37 | 0.9 | 0.9 | 0.37 | −0.37 | −0.9 |
| $f_{y,4}$ | 0.78 | −0.18 | −0.93 | −0.52 | 0.52 | 0.93 | 0.18 | −0.78 |
| $f_{y,5}$ | 0.64 | −0.64 | −0.64 | 0.64 | 0.64 | −0.64 | −0.64 | 0.64 |

According to a further embodiment, it is also possible to use only some of the convolution kernels listed above. For example, one of the five convolution kernels listed in the table can be omitted, i.e. a set of four convolution kernels can be selected.

According to one embodiment, the convolution kernels $f_{y,2}$, $f_{y,3}$, $f_{y,4}$, and $f_{y,5}$ are used, i.e. convolution kernel $f_{y,1}$ is omitted. This embodiment will still give good results with slightly increased noise, but reduced computational effort.

Thus, for each row y (along the epipolar lines), discrete one-dimensional functions are obtained, referred to as $YL_{signal,v}(x)$ and $YR_{signal,v}(x)$, for each of the left and right cameras. Generally, these convolution kernels may also be composed of function values that comprise a weighted sum of a plurality of even harmonic functions (referred to as "even convolution kernels"), or a weighted sum of a plurality of odd harmonic functions (referred to as "odd convolution kernels"). The harmonic functions each sample different spatial frequencies.

Figure 4:
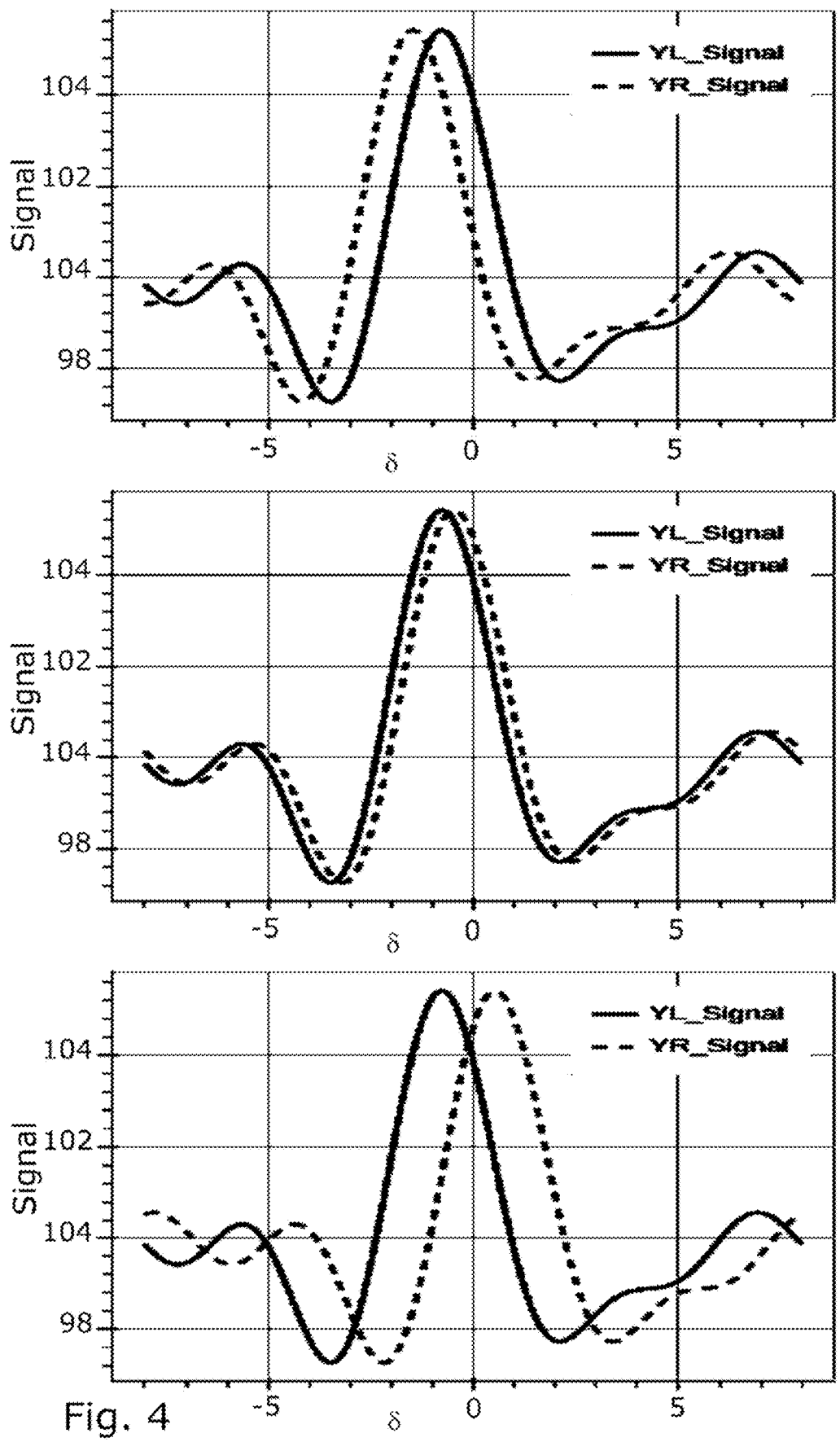
FIG. 4 shows graphs of image signals $YL_{signal,v}$ and $YR_{signal,v}$ that are shifted relative to each other.

Subsequently, subsignals are extracted therefrom for specific rows y, specifically within windows at positions x in $YL_{signal,v}$ and $(x+\delta)$ in $YR_{signal,v}$. Here, the left camera is the reference camera. The right camera may also be chosen as the reference camera (i.e., x in $YR_{signal,v}$ and $(x+\delta)$ in $YL_{signal,v}$). Then, the similarity of the two windows is calculated as a function of the shift $\delta$ within a disparity range for the position x, and thus a correspondence function $SSD(\delta)$ is obtained. Finally, extrema of the correspondence function $SSD(\delta)$ are found, optionally filtered using further criteria, and the correspondence function $SSD(\delta)$ is solved for $\delta$, so that the disparities $\delta$ determined in this way in the image plane can be assigned to a position (x,y) in the image of the reference camera. Lastly, the disparities $\delta$ are projected back into the object coordinate system and 3D data are calculated. To illustrate this, FIG. 4 shows exemplary signals YL and YR at positions differently shifted relative to one another in a pixel-wise manner. In the middle graph, the relative shift corresponds to the disparity $\delta$, in the upper graph the shift is $\delta-1$, in the lower graph the shift is $\delta+1$. The match between the signals YL, YR is greatest in the middle graph, which is why the disparity $\delta$ presumably comes close to the actual disparity of the locally imaged object. However, the actual disparity is not exactly matched, due to the pixel-wise shift.

For producing the 3D data with high data quality, low-noise interpolation of the disparity $\delta$ is required between the grid positions of the discrete signal functions $YL_{signal,v}(x)$ and $YR_{signal,v}(x)$. This process is referred to as sub-pixel interpolation and is performed by the computing device of the correspondence analyzer, as will be explained in more detail further below. For successful sub-pixel interpolation, two prerequisites are advantageous:

accumulation of very small noisy signal components distributed in the spatial frequency spectrum in the most complete and precise manner possible; and generation of a previously known function profile of the correspondence function $SSD(\delta)$ in the vicinity of the extremum, which profile is largely independent of the concrete signal form of the windowed signals.

Due to an analogy to Kupfmuller's uncertainty relation (1924, in further analogy to Heisenberg) as formulated in communications engineering in the time domain, there is a contradiction between a high spatial resolution and at the same time high spatial frequency resolution. It is therefore impossible to perform a convolution of the signals $YL_{signal,v}$ and $YR_{signal,v}$ with a small window that is desirable for a high spatial resolution, e.g. with a width of 8 px, in such a way that a sufficiently small bandwidth is obtained in the spatial frequency domain. After convolution, the signal at the spatial frequency used for further interpolation is superimposed by components at other spatial frequencies. The result of the convolution of the real signal can therefore not be considered to be free of error like the result of the convolution of a harmonic signal. The determination of the phase at only one spatial frequency according to the prior art is therefore subject to noise.

The objective of the invention is to perform a plurality of convolutions which are optimized in terms of their overall effect within the windows of $YL_{signal,v}$ and $YR_{signal,v}$, and to combine the convolution results into a correspondence function $SSD(\delta)$ in such a way that the theoretically unavoidable errors largely compensate each other (inter alia due to a special selection of the signal forms of small convolution kernels). In contrast to prior art techniques, the basic measurement errors of the windowed Fourier transformation (WFT) do not have to be reduced by prior low-pass filtering of the image signals. Any residual errors remaining after the compensation will be eliminated by low-pass filtering only after the processing into 3D data or into the set of disparity measurement results on which these 3D data are based (hereinafter referred to as output low-pass filter). In detail, the goal is to generally detect the accumulated common disparity signal implied in the correspondence function $SSD(\delta)$, consisting of signal components with a plurality of spatial frequencies. The solving of the correspondence function $SSD(\delta)$ for a will be referred to as group disparity below.

For the sake of simplified illustration, assuming first an ideal stereo camera and a continuous signal model, before extending the consideration to the real case further below. In simplified terms, an ideal stereo camera provides two ideal row-type signals $YL_{ideal}$ and $YR_{ideal}$ (instead of $YL_{signal,v}$ and $YR_{signal,v}$), which can be modeled as Fourier series having $m_{max}$ elements in the interval T, as shown in Equation (4).

$$YL_{ideal} = \sum_{m=1}^{m_{max}} A_m \cdot \cos(m \cdot \omega \cdot (x + \Delta_m)) \quad (4)$$

$$YR_{ideal} = \sum_{m=1}^{m_{max}} A_m \cdot \cos(m \cdot \omega \cdot (x + \Delta_m + \delta))$$

Since for an ideal stereo camera the transfer functions of both cameras are identical and certain signal errors (e.g. reflections) are absent, it can be assumed that the amplitudes $A_m$ and phases $\Delta_m$ are the same for both cameras. $YL_{ideal}$ and $YR_{ideal}$ therefore only differ in the shift by the disparity $\delta$. The index or factor m determines the respective spatial frequency in the ideal signal. $\omega$ is defined as $2*\pi/T$.

As a next step, even convolution kernels $f_{even,k}$ and odd convolution kernels $f_{odd,l}$ are defined, which are to be used for processing $YL_{ideal}$ and $YR_{ideal}$. These convolution kernels can in turn be modeled as Fourier series in phase form, as shown in equation (5). The coefficient vectors $c_{k,n}$ and $s_{l,n}$ in the convolution kernels of equation (5) determine the weighting of the respective harmonic function at spatial frequency n of the convolution kernel. $n_{max}$ equals $m_{max}$ from equation (4). $k_{max}$ and $l_{max}$ are the number of the even and odd convolution kernels, respectively.

$$f_{even,k} = \sum_{n=1}^{n_{max}} c_{k,n} \cdot \cos(n \cdot \omega \cdot x) \quad (5)$$

$$f_{odd,l} = \sum_{n=1}^{n_{max}} s_{l,n} \cdot \sin(n \cdot \omega \cdot x)$$

The ideal signals $YL_{ideal}$ and $YR_{ideal}$ and the convolution kernels $f_{even,k}$ and $f_{odd,l}$ are continuous functions. Digitization is considered separately. The spatial window is preferably half the size of the interval T, in particular $-T/4$ to $+T/4$. As a result, some of the convolution kernels will contain incomplete periods, i.e. fragments. The inclusion of fragments has the advantage that more spatial frequencies can be packed into a small convolution kernel. According to one embodiment it is intended to generally choose the window to be smaller than the interval T. However, window sizes other than $-T/4$ to $+T/4$ can also be used.

Figure 8:
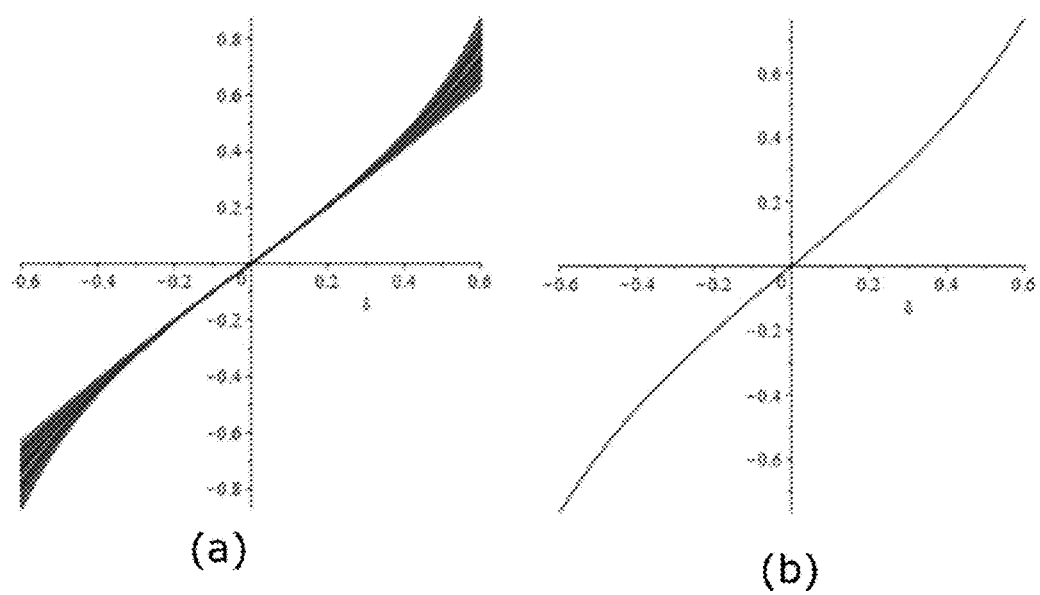
FIG. 8 shows the quasi-linear relationship (characteristic) between real shift $\delta_{sim}$ and calculated subpixel interpolation $\delta$ with random amplitudes A, phases $\Delta$, and disparities $\delta_{sim}$ of the image input signals (graph (a)) and the mean subpixel interpolation result of all signals (graph (b)) in the domain of definition <−0.5 px . . . +0.5 px>.

The illustrated exemplary embodiment uses the interval T=16 px with window size T/2=8 px. Preferably, 4 spatial frequencies can be placed in such a window in the spatial frequency range (i.e. $m_{max}=4$ in equation (4)). The size of the window and thus the number of spatial frequencies depends on the desired application, however, 4 spatial frequencies are usually sufficient. The influence of individual spatial frequencies on the correspondence function can be strengthened or weakened by the profiles explained below and by an appropriate selection of the convolution kernels. The optimal window size can be determined by a tradeoff between 3D resolution and signal-to-noise ratio. This tradeoff depends on the image content and the desired application. A sensible upper limit for the spatial frequency corresponds to a period of 4 pixels in the image. Higher spatial frequencies would produce an undesirable non-linear behavior of the phase characteristic (FIG. 8). In modern CMOS camera sensors with a pixel pitch of 2 to 4 µm, this signal component is low, because there is a limitation to approx. 100 line pairs per mm due to the OTF of the lenses and the low-pass effect of the filter used in color cameras for converting the BAYER format into YUV.

Fourier analysis in the interval T shall now be used to determine optimal convolution kernels for the group disparity. For simplified illustration of the mathematical relationships, it is first assumed that the convolution kernels are spectrally pure (i.e., $c_{k,n}$ and $s_{l,n}$ are 1 if n equals k or n equals 1, otherwise 0).

This allows the convolution integrals to be analytically calculated separately for each combination of components of the $YL_{ideal}$ and $YR_{ideal}$ signals and of the components of the even and odd convolution kernels. What is obtained are $n_{max}*m_{max}$ components of the convolution results $C_{YL}$, $C_{YR}$ (equation (6), for even and odd convolution kernels in each case).

$$C_{YL,even}(x, \Delta_m, A_m, n, m) = \qquad (6)$$

$$\int_{-T/4}^{T/4} A_m \cdot \cos(m \cdot \omega \cdot (-x + \Delta_m)) \cdot c_{k,n} \cdot \cos(n \cdot \omega \cdot x) dx$$

$$C_{YL,odd}(x, \Delta_m, A_m, n, m) =$$

$$\int_{-T/4}^{T/4} A_m \cdot \cos(m \cdot \omega \cdot (-x + \Delta_m)) \cdot s_{l,n} \cdot \sin(n \cdot \omega \cdot x) dx$$

$$C_{YR,even}(x, \Delta_m, A_m, n, m, \delta) =$$

$$\int_{-T/4}^{T/4} A_m \cdot \cos(m \cdot \omega \cdot (-x + \Delta_m + \delta)) \cdot c_{k,n} \cdot \cos(n \cdot \omega \cdot x) dx$$

$$C_{YR,odd}(x, \Delta_m, A_m, n, m, \delta) =$$

$$\int_{-T/4}^{T/4} A_m \cdot \cos(m \cdot \omega \cdot (-x + \Delta_m + \delta)) \cdot s_{l,n} \cdot \sin(n \cdot \omega \cdot x) dx$$

$$\text{mit: } \omega = \frac{2\pi}{T}$$

From these components of the convolution results, the difference of the convolution results $(\Delta RL_{even)n,m} = (C_{YR,even)n,m} - (C_{YL,even)n,m}$ and $(\Delta RL_{odd)n,m} = (C_{YR,odd)n,m} - (C_{YL,odd)n,m}$ is calculated for each n and m.

After substituting the differences of the trigonometric functions by products, the convolution results can be summarized in the form of a matrix.

For the exemplary embodiment with $m_{max}=4$ and $n_{max}=4$, equation (7) shows the coefficient matrices AEV and AOD, equation (8) shows the matrix notation of the even signal differences $\Delta RL_{even}$ based on the coefficient matrix AEV and the signal vector $S_{even}$, and equation (9) shows the odd signal differences $\Delta RL_{odd}$ based on the coefficient matrix AOD and the signal vector $S_{odd}$. If the spatial frequency range is selected differently than in the exemplary embodiment, the coefficient matrices AEV and AOD will change accordingly. For the sake of simplicity, the coefficient matrices AEV and AOD are normalized so that they become independent of T. The constants $K_{even}$ and $K_{odd}$ with the additional condition $K_{even}^2 = K_{odd}^2$ compensate for this in equations (8) and (9). Since $K_{even}^2$ and $K_{odd}^2$ will later cancel out in equation (11), no further consideration is required.

$$AEV = \begin{bmatrix} \frac{1}{4} & \frac{1}{3\pi} & 0 & -\frac{1}{15\pi} \\ \frac{1}{3\pi} & \frac{1}{4} & \frac{3}{5\pi} & 0 \\ 0 & \frac{3}{5\pi} & \frac{1}{4} & \frac{3}{7\pi} \\ -\frac{1}{15\pi} & 0 & \frac{3}{7\pi} & \frac{1}{4} \end{bmatrix} \; n \quad AOD = \tag{7}$$

$$\begin{bmatrix} \frac{1}{4} & \frac{2}{3\pi} & 0 & -\frac{4}{15\pi} \\ \frac{2}{3\pi} & \frac{1}{4} & \frac{2}{5\pi} & 0 \\ 0 & \frac{2}{5\pi} & \frac{1}{4} & \frac{4}{7\pi} \\ -\frac{4}{15\pi} & 0 & \frac{4}{7\pi} & \frac{1}{4} \end{bmatrix} \; n$$

$$[\Delta RL_{even}] = K_{even} * \tag{8}$$

$$\begin{bmatrix} \frac{1}{4} & \frac{1}{3\pi} & 0 & -\frac{1}{15\pi} \\ \frac{1}{3\pi} & \frac{1}{4} & \frac{3}{5\pi} & 0 \\ 0 & \frac{3}{5\pi} & \frac{1}{4} & \frac{3}{7\pi} \\ -\frac{1}{15\pi} & 0 & \frac{3}{7\pi} & \frac{1}{4} \end{bmatrix} \begin{bmatrix} A_1 \cdot \sin\left(\omega \cdot \left(\Delta_1 + \frac{\delta}{2}\right)\right) \cdot \sin\left(\frac{\omega\delta}{2}\right) \\ A_2 \cdot \sin\left(2\omega \cdot \left(\Delta_2 + \frac{\delta}{2}\right)\right) \cdot \sin(\omega\delta) \\ A_3 \cdot \sin\left(3\omega \cdot \left(\Delta_3 + \frac{\delta}{2}\right)\right) \cdot \sin\left(\frac{3\omega\delta}{2}\right) \\ A_4 \cdot \sin\left(4\omega \cdot \left(\Delta_4 + \frac{\delta}{2}\right)\right) \cdot \sin(2\omega\delta) \end{bmatrix} =$$

$$K_{even} * AEV * S_{even}$$

$$[\Delta RL_{odd}] = K_{odd} * \tag{9}$$

$$\begin{bmatrix} \frac{1}{4} & \frac{2}{3\pi} & 0 & -\frac{4}{15\pi} \\ \frac{2}{3\pi} & \frac{1}{4} & \frac{2}{5\pi} & 0 \\ 0 & \frac{2}{5\pi} & \frac{1}{4} & \frac{4}{7\pi} \\ -\frac{4}{15\pi} & 0 & \frac{4}{7\pi} & \frac{1}{4} \end{bmatrix} \begin{bmatrix} A_1 \cdot \cos\left(\omega \cdot \left(\Delta_1 + \frac{\delta}{2}\right)\right) \cdot \sin\left(\frac{\omega\delta}{2}\right) \\ A_2 \cdot \cos\left(2\omega \cdot \left(\Delta_2 + \frac{\delta}{2}\right)\right) \cdot \sin(\omega\delta) \\ A_3 \cdot \cos\left(3\omega \cdot \left(\Delta_3 + \frac{\delta}{2}\right)\right) \cdot \sin\left(\frac{3\omega\delta}{2}\right) \\ A_4 \cdot \cos\left(4\omega \cdot \left(\Delta_4 + \frac{\delta}{2}\right)\right) \cdot \sin(2\omega\delta) \end{bmatrix} =$$

$$K_{odd} * AOD * S_{odd}$$

In order to return from the case of spectrally pure convolution kernels used so far for illustration purposes to the case of general convolution kernels, the signal differences $\Delta RL_{even}$ and $\Delta RL_{odd}$ are scalar multiplied by the coefficient vectors $c_k$ and $s_l$, respectively, in the next step. The sum of the components of the vectors $\Delta RL_{even}$ and $\Delta RL_{odd}$ weighted with $c_k$ and $s_l$, respectively, represents the feature difference.

The feature difference for a given general even or odd convolution kernel according to equation (5) is therefore the difference of the respective convolution results of the signals $YR_{ideal}$ and $YL_{ideal}$ with general amplitudes $A_m$ according to equation (4) and with the weights $c_{k,n}$ and $s_{l,n}$, respectively, of this convolution kernel.

The correspondence function $SSD(\delta)$ is now defined as the sum of the non-linearly processed, in particular exponentiated, feature differences, or differences of the convolution results; preferably, the feature differences of all the convolution kernels are squared. The structure of $SSD(\delta)$ will now be analyzed. For this purpose, it is expedient to first only consider the case of one signal pair $YL_{ideal}$ and $YR_{ideal}$ and with $k_{max}$ even convolution kernels and $l_{max}$ odd convolution kernels, as represented in equation (10) as $SSD_{one}(\delta)$.

$$SSD_{one}(\delta) = \left(\sum_{m=1}^{m_{max}} \sum_{k=1}^{k_{max}} \left(\sum_{n=1}^{n_{max}} c_{k,n} \cdot (\Delta RL_{even})_{n,m}\right)^2\right) + \tag{10}$$

$$\left(\sum_{m=1}^{m_{max}} \sum_{l=1}^{l_{max}} \left(\sum_{n=1}^{n_{max}} s_{l,n} \cdot (\Delta RL_{odd})_{n,m}\right)^2\right)$$

After inserting the elements $\Delta RL_{even}$ and $\Delta RL_{odd}$ in the product form according to Equation (8) and Equation (9) and after expanding the sums of squares, terms are obtained which can be divided into a partial sum $SSD_{inv}$ containing squared amplitudes (e.g. $A_l^2$) and a partial sum consisting of mixed elements $SSD_{var}$. $SSD_{inv}$ is independent of the sign of the amplitudes $A_m$ and can be further optimized by a suitable choice of the form of the convolution kernels, i.e. the weights $c_{k,n}$ and $s_{l,n}$, respectively, so that according to the trigonometric Pythagoras the terms with the corresponding cosine and sine components will add up such that the dependency on $\Delta_m$ disappears completely.

In this case, $SSD_{inv}$ will be independent of the phases $\Delta_m$ and thus invariant to a lateral shift of the measurement object (i.e. parallel to the base of the stereo camera). $SSD_{inv}$ is a function of the group disparity, from which the sought group disparity, i.e. the sought signal S, can be calculated under certain conditions.

In particular, it is intended according to further embodiment that the convolution kernels are selected in such a way that the convolution operations of the $k_{max}$ even and $l_{max}$ odd convolution kernels each transfer respective sums with weighted signal components of a group of spatial frequencies, as will be denoted by different values for the index m below, with the amplitudes $A_m$ and object phases $\Delta_m$, so that in the calculation of the correspondence function $SSD(\delta)$ two partial sums are obtained for each signal v and each spatial frequency with index m, namely the first one with terms characterized by squared amplitudes $A_m^2$ from the results of the convolution operations with the even functions, the second one with terms characterized by squared amplitudes $A_m^2$ from the results of the convolution operations with the odd functions, and so that the first partial sum and the second partial sum can be combined according to the trigonometric Pythagoras such that the sum $SSD_{inv}(\delta)$ of both partial sums is independent of the object phase $\Delta_m$.

The condition for this property of $SSD_{inv}$ is that in the terms of $SSD_{inv}$ the coefficients preceding the $\sin^2$ and $\cos^2$ parts of the same spatial frequency are equal. Generalized to any desired number of convolution kernels and spatial frequencies, this condition for an optimal ideal disparity signal can be represented as a non-linear system of equations for each m as shown in equation (11). Equation (11) captures a partial sum of the $SSD_{inv}$ with $k_{max}+l_{max}$ summands and thus represents the complete signal obtained from the signal pair $YL_{ideal}$ and $YR_{ideal}$. $g_m$ is a weighting vector and will be explained in more detail further below.

$$g_m = \sum_{k=1}^{k_{max}} \left( \sum_{n=1}^{n_{max}} c_{k,n} \cdot AEV_{n,m} \right)^2 = \sum_{l=1}^{l_{max}} \left( \sum_{n=1}^{n_{max}} s_{l,n} \cdot AOD_{n,m} \right)^2 \quad (11)$$

For determination of the disparity with sufficiently low noise, the coefficients of the matrices AEV and AOD do not have to correspond exactly to the values given in equation (7) and can deviate by a factor of 0.8 to 1.2 in each case. Similarly, an approximate solution of the equation systems in equation (11) is sufficient (e.g., the sum in equation (11) for the odd convolution kernels may differ from the sum for the even convolution kernels by a factor of 0.8 to 1.2).

With convolution kernels optimized according to the rule in equation (11) one obtains the definition of the correspondence function $SSD(\delta)$ shown in equation (12) and the definition of $SSD_{inv}(\delta)$ shown in equation (13).

$$SSD(\delta) = SSD_{inv}(\delta) + SSD_{var}(\delta, \Delta) \quad (12)$$

$$SSD_{inv}(\delta) = \sum_{m=1}^{m_{max}} g_m \cdot A_m^2 \cdot \sin\left(\frac{m \cdot \omega \cdot \delta}{2}\right)^2 \quad (13)$$

According to a particularly preferred embodiment, the convolution kernels are accordingly selected in such a way that the correspondence function can be represented in the signal model according to equation (12) as the sum of a phase-independent function $SSD_{inv}(\delta)$ and a function $SSD_{var}(\delta,\Delta)$ that is dependent on object phases $\Delta$. Initially, only $SSD_{inv}$ will now be considered. $SSD_{var}$ represents a source of noise whose influence can be minimized as will be described further below.

The ratio of the first derivative $SSD'_{inv}(\delta)$ (equation (14)) to the second derivative $SSD''_{inv}(\delta)$ (equation (15)), each with respect to $\delta$, under the assumptions in equation (16), forms the group disparity function (Equation (17)) which contains the sought position information in a compact form.

$$SSD'_{inv}(\delta) = \sum_{m=1}^{m_{max}} \frac{g_m \cdot A_m^2 \cdot m \cdot \omega \cdot \sin(m \cdot \omega \cdot \delta)}{2} \quad (14)$$

$$SSD''_{inv}(\delta) = \sum_{m=1}^{m_{max}} \frac{g_m \cdot A_m^2 \cdot m^2 \cdot \omega^2 \cdot \cos(m \cdot \omega \cdot \delta)}{2} \quad (15)$$

$$|\delta| < 0.5 \quad (16)$$

$$\sin(m \cdot \omega \cdot \delta) \sim m \cdot \omega \cdot \delta$$

$$\cos(m \cdot \omega \cdot \delta) \sim 1$$

$$\frac{SSD'_{inv}(\delta)}{SSD''_{inv}(\delta)} = \delta + O(\delta^3) \quad (17)$$

The simple Taylor expansion according to equation (17) of the group disparity function gives a linear function of $\delta$, but it is valid only in the immediate vicinity of a zero crossing of the first derivative $SSD'_{inv}(\delta)$ (or in the immediate vicinity of a local minimum of $SSD'_{inv}(\delta)$) in the subpixel domain for small 6, i.e. when $\sin(m*\omega*\delta)$ can be linearly interpolated with sufficient quality. The subpixel-precise function value of the group disparity $\delta_{sub}$ required for the further calculation is obtained as the sum of the integer disparity of the location of a zero crossing of the first derivative $SSD'_{inv}(\delta)$ and the fractional rational subpixel value of the group disparity function, as will also be shown in equation (32) below.

For the group disparity function of a real high-resolution stereo camera, a typical characteristic curve is obtained (FIG. 8). Specifically, in the graphs of FIG. 8, equation (17) is used to plot a determined disparity as a function of the actual disparity. In the ideal case, the values of the group disparity determined according to equation (17) and the actual disparity would be the same (linear relationship). From panel FIG. 8(b) it can be seen that at larger sub-pixel positions, i.e. with a position of disparity between two pixels, small deviations from an ideally linear course are resulting in the definition range [−0.5 px, 0.5 px]. The deviation also depends on the image content, as shown in the graph of FIG. 8(a), where the curves for different random values for $A_m$ and $\Delta_m$ are plotted. Panel FIG. 8(b) shows the average plot of the curves shown in panel FIG. 8(a). These linearity errors of the characteristic curve generate multiplicative noise.

If the previous model is extended from one signal pair $YL_{ideal}$ and $YR_{ideal}$ to $v_{max}$ signal pairs $YL_{ideal,v}$ and $YR_{ideal,v}$ (with v=1 . . . $v_{max}$), then Equation (14) and Equation (15) expand to Equation (18) and Equation (19), respectively.

$$SSD'_{inv}(\delta) = \sum_{m=1}^{m_{max}} \left( \frac{g_m \cdot m \cdot \omega \cdot \sin(m \cdot \omega \cdot \delta)}{2} \cdot \sum_{v=1}^{v_{max}} A_{m,v}^2 \right) \quad (18)$$

$$SSD''_{inv}(\delta) = \sum_{m=1}^{m_{max}} \left( \frac{g_m \cdot m^2 \cdot \omega^2 \cdot \cos(m \cdot \omega \cdot \delta)}{2} \cdot \sum_{v=1}^{v_{max}} A_{m,v}^2 \right) \quad (19)$$

It can be seen that Equation (17) is still valid even after an expansion to a plurality of signal pairs, since the sum of all signals is used, by way of simplification. Equation (11) is not affected by this expansion.

Having explained the signal used for the group disparity function, the noise shall now be considered. The goal is to minimize the noise N compared to the signal S. The noise mainly consists of sensor noise, noise caused by the influence of $SSD_{var}$, noise caused by differences between the ideal camera model analyzed here and a real stereo camera, and linearity errors in the characteristic curve of the group disparity function.

The high-frequency white sensor noise includes several additive noise sources, such as quantum noise (also known as root noise), thermal noise, as well as DSNU and PRNU. The sensor noise and the noise caused by $SSD_{var}$ are decorrelated to a good approximation and can therefore be considered separately. Equations (15) to (17) describe the $g_m$-weighted accumulation of the group disparity signal in the spatial frequency domain. Each signal component of the group disparity signal is represented by $m^2\omega^2 A^2_m$ at the spatial frequency $m\omega$, so that the term (or the amplitude) with the greatest magnitude is decisive for the transfer function. With these terms, the group disparity function can be understood as an adaptive (depending on the current signal form) filter according to Wiener (1949). The same terms are obtained when a signal pair $YL_{ideal}$ and $YR_{ideal}$ is processed with an ideal (long) adaptive filter and thus in the spatial frequency range with narrow bandwidth and the results with the measured amplitudes are combined in a weighted manner to obtain a position signal. This corresponds to the signal processing of an optimal filter. Thus, the signal-to-noise ratio of group disparity noise to sensor noise gives an optimum for a particular weighting by $g_m$. This weighting can be adjusted to the spectrum of the signals $YL_{signal,v}$ and $YR_{signal,v}$, as will be explained further below.

The low-pass filter referred to as output low-pass filter is applied to the 3D data or the set of disparity measurement results on which this 3D data are based, i.e. it filters high spatial frequencies in the spatial change of the disparities. Thus, this is done after the group disparity has been calculated, but it reduces certain portion of the noise and thus has an influence on further noise optimization. More generally, without being limited to the example shown, it is therefore contemplated according to a further embodiment that the computing device is configured to filter the calculated disparity values with a low-pass filter.

According to one embodiment, the output low-pass filter is dimensioned such that it reduces noise components with spatial frequencies above $2\omega$, preferably above $3\omega$, that is in a range in which the signal components of the group disparity are also low. The filtering after calculating the group disparity does not affect high-frequency input signals with amplitudes $A_3$ and $A_4$ for forming the group disparity signal. Thus, without being limited to specific exemplary embodiments, the correspondence analyzer according to one embodiment is thus configured to take into account the input information without limiting the (signal) bandwidth for calculating the disparity values. This thus contributes to the improvement of the signal-to-noise ratio. On the other hand, the window size of the analysis window in the exemplary embodiment ($8\times 8$ $px^2$) reduces the transfer function of the disparity starting at a period $T/2$, i.e. $2\omega$. Therefore, the cutoff frequency of the two-dimensional output low-pass filter is set in the $2\omega$ range.

Figure 6:
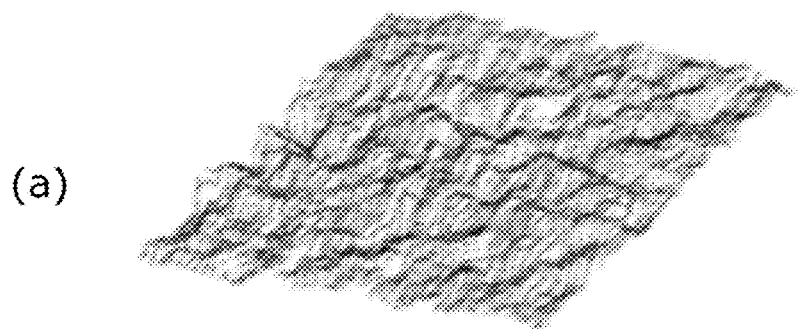
FIG. 6 shows 3D images prior to (panel (a)) and after (panel (b)) low-pass filtering.
Figure 6:
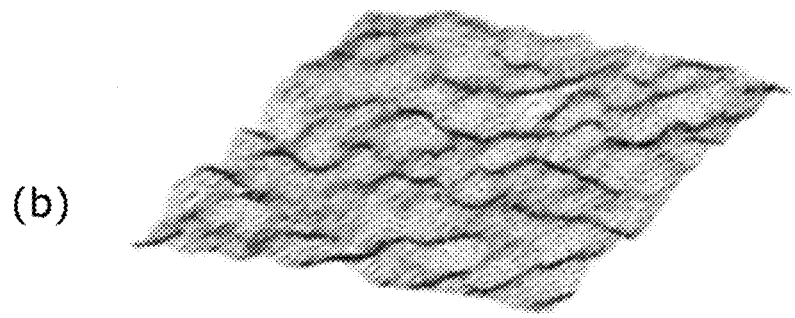

FIG. 6 shows 3D data for an essentially flat white textured wallpaper in a $100\times 100$ $px^2$ sized image section with an object-side resolution of 1 $mm^2$ (x,y) and at a distance of 1850 mm. Panel (a) of FIG. 6 shows 3D data prior to the output low-pass filtering, and panel (b) shows 3D data after output low-pass filtering. For better visualization, the distance resolution was increased to 0.2 mm.

Next, $SSD_{var}$ is optimized without affecting the sensor noise optimization. $SSD_{var}(\delta,\Delta)$ depends on the signs of phases and amplitudes and thus on a lateral shift of the measurement object and represents a pseudo-random inter- ference variable that can be understood as additive low-frequency noise in the spatial frequency range $\omega$ to $4\omega$ (in the exemplary embodiment). The first step for minimizing the noise component of $SSD_{var}$ is achieved statistically by using a plurality $v_{max}$ of signal pairs $YL_{signal,v}$ and $YR_{signal,v}$, which results in an averaging of the signal $SSD_{inv}$ and the signal error $SSD_{var}$. For an optimal solution, the signal pairs have to be largely decorrelated, which is achieved by a favorable convolution in y-direction. Under this condition, the noise is reduced by a factor of $1/(v_{max})^{1/2}$.

In the second step, the consideration limited to $SSD_{inv}$ in equation (17) is expanded to the sum of $SSD_{inv}$ and $SSD_{var}$. The noise signal is thus $SSD'_{var}$, which is developed as a Taylor series, similarly to $SSD'_{inv}$. The output low-pass filter reduces the noise represented by $SSD_{var}$ in the exemplary embodiment starting at the spatial frequency of $3\omega$, which means that only the range from $\omega$ to $2\omega$ requires further consideration. In the exemplary embodiment, after extensive trigonometric calculation, this results in a partial sum $SSD'_{var,1}$ for the lowest spatial frequency of $SSD'_{var}$, as shown in equation (20). The partial sum for $2\omega$ can be calculated similarly.

$$SSD'_{var,1}(\delta,\Delta)=\sum_{v=1}^{v_{max}}\left(const_1\cdot A_{1,v}\cdot A_{2,v}\cdot\cos\left(\frac{\omega\cdot(\delta-2\Delta_{1,v}+4\Delta_{2,v})}{4}\right)+\right. \quad (20)$$
$$const_2\cdot A_{2,v}\cdot A_{3,v}\cdot\cos\left(\frac{\omega\cdot(\delta-4\Delta_{2,v}+6\Delta_{3,v})}{4}\right)+$$
$$\left.const_3\cdot A_{3,v}\cdot A_{4,v}\cdot\cos\left(\frac{\omega\cdot(5\delta-6\Delta_{3,v}+16\Delta_{4,v})}{4}\right)\right)$$

The amplitudes and phases in Equation (20) depend on image statistics and are largely decorrelated, the noise component of $SSD_{var}$ therefore becomes minimal if the constants $const_1$, $const_2$, and $const_3$ in Equation (20), which are not further elaborated here, are minimal. This in turn is the case when the conditions as shown in equation (21) are met.

$$\sum_{k=1}^{k_{max}}\left(\sum_{n=1}^{n_{max}}c_{k,n}\cdot AEV_{n,1}\right)\left(\sum_{n=1}^{n_{max}}c_{k,n}\cdot AEV_{n,2}\right)- \quad (21)$$
$$\sum_{l=1}^{l_{max}}\left(\sum_{n=1}^{n_{max}}s_{l,n}\cdot AOD_{n,1}\right)\left(\sum_{n=1}^{n_{max}}s_{l,n}\cdot AOD_{n,2}\right)=0$$
$$\sum_{k=1}^{k_{max}}\left(\sum_{n=1}^{n_{max}}c_{k,n}\cdot AEV_{n,2}\right)\left(\sum_{n=1}^{n_{max}}c_{k,n}\cdot AEV_{n,3}\right)-$$
$$\sum_{l=1}^{l_{max}}\left(\sum_{n=1}^{n_{max}}s_{l,n}\cdot AOD_{n,2}\right)\left(\sum_{n=1}^{n_{max}}s_{l,n}\cdot AOD_{n,3}\right)=0$$
$$\sum_{k=1}^{k_{max}}\left(\sum_{n=1}^{n_{max}}c_{k,n}\cdot AEV_{n,3}\right)\left(\sum_{n=1}^{n_{max}}c_{k,n}\cdot AEV_{n,4}\right)-$$
$$\sum_{l=1}^{l_{max}}\left(\sum_{n=1}^{n_{max}}s_{l,n}\cdot AOD_{n,3}\right)\left(\sum_{n=1}^{n_{max}}s_{l,n}\cdot AOD_{n,4}\right)=0$$

However, these equations cannot be solved generally. It is sufficient to minimize the sum of squares of the differences in equation (21). Since it can be assumed that in equation (20) the magnitude of $A_{1,v}A_{2,v}$ is greater than the magnitude of $A_{2,v}A_{3,v}$, which in turn is greater than the magnitude of $A_{3,v}A_{4,v}$, it is advantageous to primarily approach the first condition in equation (21), then secondarily the second one, and then the third one. A good approximation is already obtained if the coefficients $c_{1,3}$, $c_{1,4}$, $c_{2,1}$, $c_{2,2}$, $s_{1,3}$, $s_{1,4}$, $s_{2,1}$, and $s_{2,2}$ are set to zero (see also Equation (23) for the exemplary embodiment), and then the system of equations in Equation (11) is solved for the remaining coefficients, and thus performing the optimization of $SSD_{inv}$.

Especially for implementations with only a few signal pairs, i.e. small $v_{max}$, optimization of the coefficients of the convolution kernels improves the noise behavior. For this purpose, the system of equations in Equation (11) is solved using predetermined coefficients $c_{1,3}$, $c_{1,4}$, $c_{2,1}$, $c_{2,2}$, $s_{1,3}$, $s_{1,4}$, $s_{2,1}$, and $s_{2,2}$, and then the constants $const_1$, $const_2$, and $const_3$ are calculated. The solution with the smallest constants $const_1$, $const_2$, and $const_3$ is selected. A statistical determination using a test image is simpler, as will be described further below.

For all of these methods, Equation (11) is always satisfied and only the degrees of freedom remaining according to Equation (11) are used for further noise optimization. Thus, an optimization of the signal-to-noise ratio with regard to sensor noise is always achieved.

Another source of noise in a real stereo camera is that it does not necessarily behave like the ideal system considered so far. There are tolerances in the offset and in the gains of the camera characteristics of the left and right cameras, as well as artefacts caused by reflections, so that the amplitudes of the two cameras for identical object points in the respective image patches are not guaranteed to be the same. In addition, rectification tolerances may occur.

Offset tolerances of the cameras, which can be caused by temperature fluctuations, for example, are fully compensated for by the method. It should be noted that the so-called camera offset is set to a slightly positive value, so that e.g. negative values of sensor noise are not cut off at the value zero, which would falsify the signal.

Offsets may be transferred by the fragmented even convolution kernels and may lead to measurement errors of the disparity. Therefore, averaging of the even convolution kernels is advantageous, so that the spatial frequency zero is not transferred for the disparity measurement.

Smaller tolerances of the camera gain do not lead to noise since they are automatically corrected by the division in Equation (17). It has to be considered here that only equal amplitudes $A_m$ contribute to signal formation. For example, if an $A_m$ of the left camera ($AL_m$) is greater than the corresponding $A_m$ of the right camera ($AR_m$), then the group disparity signal is obtained from $AR_m^2$, the difference $AL_m - AR_m$ generates noise. This does not correct larger contrast differences between the cameras in the image corners, especially if the OTF or distortion correction has different steepnesses. In this case, the additional amplitude components of the higher-contrast camera are not included in the group disparity signal and are added to the interference signal N instead.

Finally, the signal-to-noise ratio can be further improved by an optimization process of the weighting coefficients g. The weighting coefficients can be calculated by a simulation of the signal-to-noise ratio. For a set of random weighting vectors g, the coefficients of each of the convolution kernels are calculated according to Equation (11) and optionally Equation (21), and another random number generator is used to generate a sample of vectors each containing the amplitudes A, the phases $\Delta$, and the target disparity $\delta_{target}$. In this case, the $A_m/A_1$ ratios are limited to the corresponding values of the spatial frequency transfer function which is composed of the OTF of the lens in the depth of field range and resolution losses in the sensor electronics. Then, $SSD(\delta)$ is calculated similarly to Equation (10), and the disparity $\delta$ for one or more minima of $SSD(\delta)$ is determined according to Equation (17). On the basis of a target/actual comparison of $\delta_{target}$ to $\delta$, the mean measurement error over the random sample for a specific weighting vector can be calculated. The one with the smallest mean error is then selected from the set of weighting vectors. In this way, optimal weighting vectors g are obtained for typical transfer functions.

Alternatively, g can also be determined by a test measurement, as in FIG. 6. In this way, the local distance noise of determined 3D data $\sigma_z$ can be determined via the standard deviation of the distance of determined points in the 3D data to the nominal positions of the imaged objects in space (e.g. to the plane that approximately represents the textured wallpaper in FIG. 6). For the specific capturing situation, the minimum of the distance noise $\sigma_z$ can now be determined as a function of the weighting vector g and the coefficients of the convolution kernels derived therefrom. The weighting vector with the lowest distance noise $\sigma_z$ can then be chosen from among a set of randomly selected weighting vectors. The weighting vector g is determined with the precision of a constant. With the division in equation (17) it is cancelled out, leaving m-1 relevant components of g.

This is how the optimal profile vector or weighting vector g is defined, e.g. for the selected object of a textured wallpaper. The spectrum of the textured wallpaper can be used as a good approximation for typical scenes with natural objects in the depth of field range.

Figure 7:
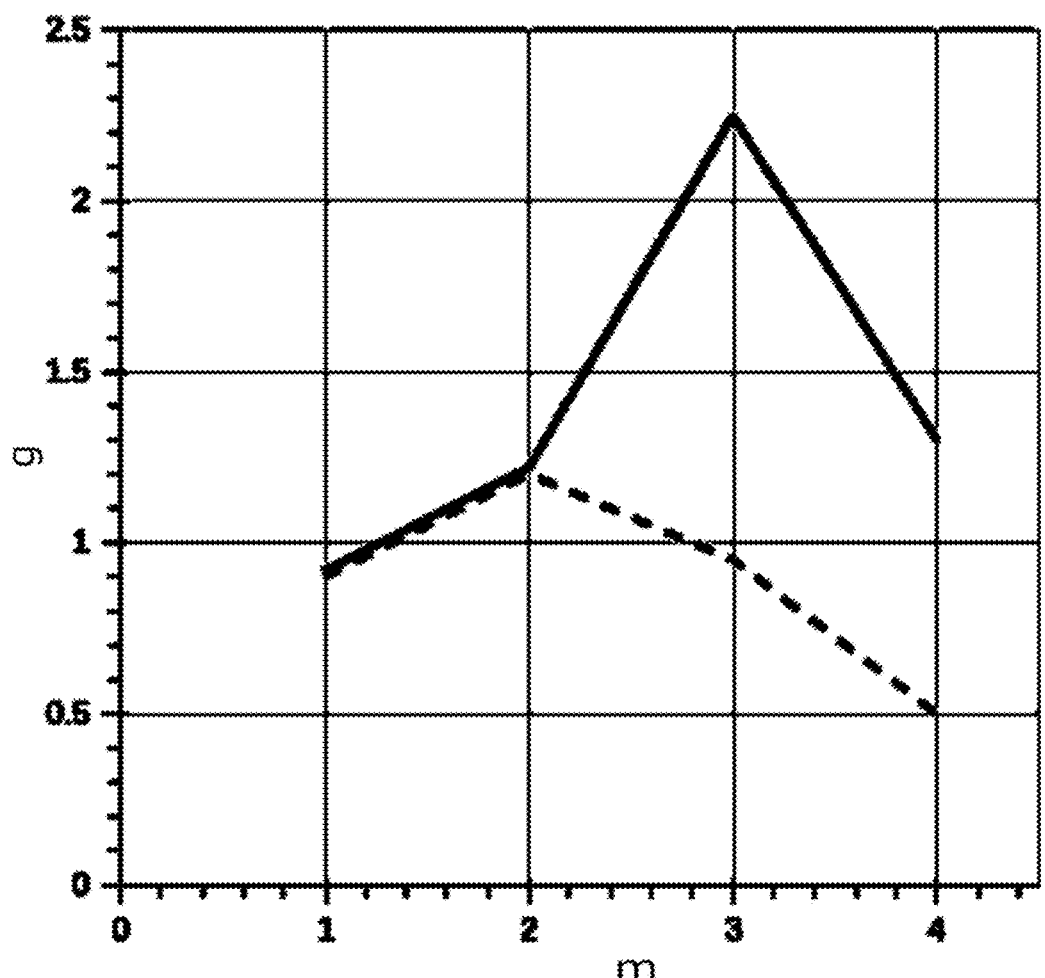
FIG. 7 shows graphs of spatial frequency profiles.

It is useful to store different profiles with weighting factors on the stereo camera and to adjust them to the capturing situation as need may be. To illustrate this, FIG. 7 shows two examples of weighting coefficients g for two different capturing situations and for different spatial frequencies ω. This allows, for example, to make parameter adjustments for optimal conditions for high-contrast images or for images in fog.

Therefore, it is contemplated according to one embodiment that at least one profile vector of weighting coefficients g is provided in the computing device to describe the optimal sensitivity of the correspondence function $SSD(\delta)$ in the spatial frequency domain, and the profile vector determines the weight coefficients $c_{k,n}$ and $s_{l,n}$ of the Fourier series of the convolution kernels, via equation (11). According to one embodiment, the class or a profile vector can be selected on the basis of the power spectrum of the data of the individual images or image patches and preferably taking into account the optical transfer function, and on the basis of this class or profile vector a plurality of correspondence functions and their convolution kernels are selected or obtained or calculated by the computing device.

As in the example in FIG. 7, a plurality of weighting vectors or profile vectors can be provided, which are selected by the computing device depending on the image content or the capturing situation. Thus, more generally, a plurality of profile vectors g can be stored in the correspondence analyzer 1 for identical or differently parameterized correspondence functions, and/or the correspondence analyzer 1 may be configured to calculate one or more profile vectors with weights g at runtime, and the correspondence analyzer 1 is furthermore configured to determine the local or global power spectrum of the image data and to use the weights g in dependence of the local or global power spectrum in the image, i.e. for convolution of the image signals and calculation of the correspondence function. In particular, the correspondence analyzer may also store a plurality of differently parameterized correspondence functions and their convolution kernels and preferably the respective corresponding profile vector $g_m$, or those may be determined at runtime, and the correspondence analyzer is furthermore configured to select a part of this plurality of correspondence functions and their convolution kernels on the basis of the present classes of individual images or image patches or on the basis of the classes of individual images or image patches which are advantageous for further processing. Preferably, the parameters of at least one correspondence function and its convolution kernels are chosen such that the weighting coefficient of the respective corresponding profile vector $g_m$ for the highest spatial frequency is smaller than at least one of the other weighting coefficients of this profile vector.

The weighting coefficient for the highest spatial frequency, in the exemplary embodiment with a 4-pixel period, is subject to a tradeoff because of the widening of the characteristic curve at $|\delta|$~0.5 px or $1/4\pi$. For this reason, when g is determined experimentally by measuring the signal-to-noise ratio, the weight for the highest spatial frequency is reduced. However, the weight is non-zero because smaller values of $\delta$ are measured correctly.

In analogy to the x-direction, the convolution kernels for the convolution in the y-direction can be obtained according to the same principle in analogy to the Fourier series in equation (4) and the rules for obtaining optimal convolution kernels (equation (11)) and can be defined by a second profile vector $gy_m$. The sum of the squared convolution results in the y-direction also forms an invariant partial sum that is independent of the object phase in the y-direction and contains $gy_m$-weighted squared amplitudes of the Fourier series according to equation (4). Furthermore, a partial sum is obtained, which depends on the object phase in the y-direction. An improvement in the signal-to-noise ratio is achieved in particular in the case of rectification errors of real stereo cameras, such as those that can arise, for example, as a result of temperature gradients, mechanical loads, or in the corners of the image. Furthermore, with the predefined weighting of the spatial frequencies, convolution kernels optimized in this way in the y-direction reduce errors that can occur when processing periodic structures. The weight for the highest spatial frequency is not reduced, since no measurement of disparity is to be performed in the y-direction.

Instead of the signal model with continuous functions considered so far, the implementation in a real discrete system will now be described in the exemplary embodiment. First, the analysis interval T and the window size of the convolution kernels are specified. Two cases have to be distinguished here: The stereo information is produced due to texture or fracture edges which are transferred with the OTF prevailing in the window, and is captured by a high-frequency process.

The stereo information is produced due to the angular dependence of diffuse reflection on essentially homogeneous bodies or due to any low-frequency textures that may be given on objects, and is captured by a low-frequency process.

Figure 9:
FIG. 9 shows a camera image and associated 3D data determined by the correspondence analyzer.
Figure 9:
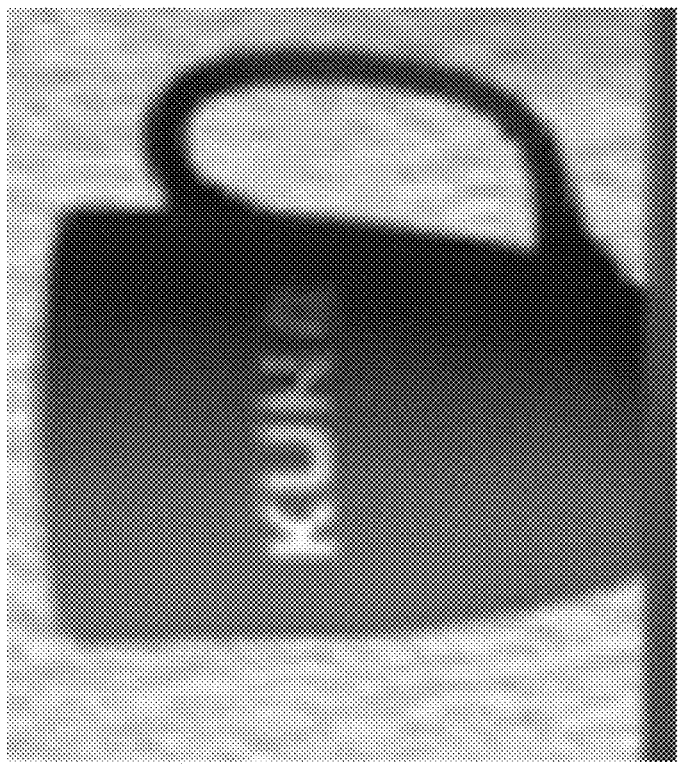

In the first case, the contrast is determined by the lens properties in the upper spatial frequency range, in the second case by the lighting scenario as well as the radii of curvature and angles of inclination of the objects in the lower spatial frequency range. To illustrate this, FIG. 9 shows a camera image (panel (a)) and the corresponding 3D data (panel (b)). Here, panel (a) is the left image of the stereo image pair, from which the 3D data of panel (b) were calculated. In panel (b), the 3D data are shown as gray scales (bright pixels indicate a large distance to the camera, dark gray pixels a smaller distance, black pixels have no distance information). The example of a ceramic mug with a homogeneous glossy surface at a capturing distance of 1850 mm and with a resolution (x,y) of 1 mm$^2$ shows that areas with high-frequency stereo information can be detected with high sub-pixel interpolation quality. Glossy areas without contrast can also be captured, but with lower quality in a low-frequency range. First, the system shall be optimized for the first case in such a way that high sensitivity is achieved for low-contrast high-frequency texture surfaces, so that, for example, the white textured wallpaper in the background can be captured without gaps with high measurement accuracy.

In the first case, the dimensioning of the analysis interval T is optimal if the spectrum of the signal is captured completely, i.e. if on the one hand the signal components with spatial frequencies of edges that are out of focus, i.e. blurred, in the depth of field range are captured with the lower limit of $2\pi/T$ and, on the other hand, signals from optimally focused textures do not significantly exceed an upper limit with a period of 3 to 4 px. For a typical color camera with a BAYER filter, a range from approx. 16 to 70 LP/mm can be used. When using a sensor with a pixel pitch of 3.75 µm, T=16 px and 4 spatial frequencies are required. In the next step, the window width is determined as a tradeoff between 3D resolution and noise. A window width of 8 px is chosen. However, another integer window width is also possible. As the window width increases, the 3D resolution decreases and the signal-to-noise ratio increases. Matrices AEV and AOD have to be adjusted if the ratio between the analysis interval and the window width is not equal to two.

In the next step, the number of convolution kernels k and l can be selected. The best accuracy with acceptable computational effort is achieved with 2 even and 2 odd convolution kernels; as a compromise, 1 even and 2 odd convolution kernels are possible as well, with reduced accuracy but also reduced computational effort. In the case of only one even and one odd convolution kernel, noise will increase significantly. In the exemplary embodiment, k=2 and l=2. A larger number of convolution kernels is also possible.

The convolution kernels are then calculated. Assuming a weighting vector g=[0.917; 1.22; 2.25; 1.3] which compensates for a typical OTF profile and represents a tradeoff with respect to the highest spatial frequency, the system of equations for determining the optimal form of the convolution kernels is established with the coefficients $c_{k,n}$ and $s_{l,n}$ of the convolution kernels (equation (22)). The system of equations is underdetermined, which is why high-frequency elements that are not required are initially set to zero (equation (23)).

$$g_m = \sum_{k=1}^{2}\left(\sum_{n=1}^{4} c_{k,n}(AEV)_{n,m}\right)^2 \quad (22)$$

$$g_m = \sum_{l=1}^{2}\left(\sum_{n=1}^{4} s_{l,n}(AOD)_{n,m}\right)^2$$

$$c_1 = [c_{1,1} \quad c_{1,2} \quad 0 \quad 0] \quad (23)$$

$$c_2 = [0 \quad 0 \quad c_{2,3} \quad c_{2,4}]$$

$$s_1 = [s_{1,1} \quad s_{1,2} \quad 0 \quad 0]$$

-continued $$s_2 = [\,0 \quad 0 \quad s_{2,3} \quad s_{2,4}\,]$$

For each of the non-linear systems of equations, 16 solutions are obtained, from which first the real ones are selected, then solutions that only differ by a sign are deleted. If there are no real solutions, the weighting vector can be adjusted. Two different solutions are obtained for the coefficient vector c as well as for s (equation (24)). From these solutions, the ones with the smallest variance of the coefficients are selected (equation (24), line 1 and line 3) because they transfer the lowest thermal noise including DSNU and PRNU.

$$c_{1,1} = 3.4954; \quad c_{1,2} = 0.7818; \quad c_{2,3} = 4.9652; \quad c_{2,4} = 1.8416 \quad (24)$$

$$c_{1,1} = 6.9245; \quad c_{1,2} = -7.3419; \quad c_{2,3} = 0.47969; \quad c_{2,4} = -4.7844$$

$$s_{1,1} = 4.0476; \quad s_{1,2} = -0.2559; \quad s_{2,3} = 6.0228; \quad s_{2,4} = -0.0332$$

$$s_{1,1} = 11.725; \quad s_{1,2} = -10.809; \quad s_{2,3} = 8.5106; \quad s_{2,4} = -8.4171$$

This first approximation, without further optimization of the noise component of $SSD'_{var}(\delta)$, already noticeably improves the signal-to-noise ratio. Since in the practically relevant exemplary embodiment described, there are not enough coefficients available to fully compensate for the $SSD'_{var}(\delta)$ noise, statistical optimization can be considered. What is provided in the system is the weak output low-pass filter as already described above, which reliably suppresses thermal noise and noise of the correspondence function for higher spatial frequencies. Therefore, the goal is to reduce the amplitudes of low spatial frequencies $\omega$ and $2\omega$ not covered by the filter. For each of the solutions in equation (24) there exist 3 further solutions with different combinations of the sign. From these, the solution with the sign combination that produces the smallest disturbances of $SSD'_{var}(\delta)$ in the lower spatial frequency range is then selected. Additionally, the zeroed coefficients in Equation (23) can be replaced by small non-zero constants. This will change the proportion of $SSD_{var}(\delta)$ without affecting $SSD_{inv}(\delta)$. Equation (22) can then be solved numerically, and the solutions can be tested with respect to the lower spatial frequencies and the best solution can be selected.

Figure 10:
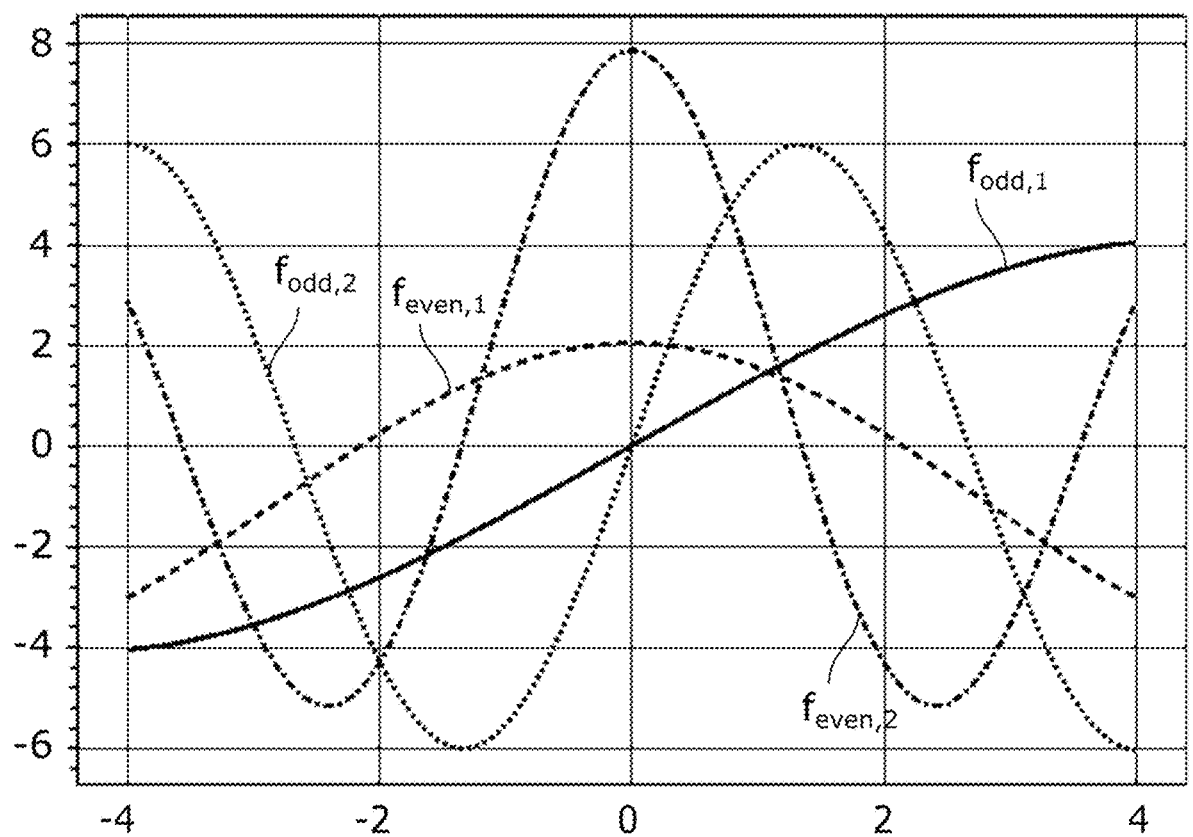
FIG. 10 shows function values of a set of two even and two odd convolution kernels in the signal model for the convolution of image signals in x-direction.

According to the above example, one obtains possible functions of the convolution kernels in the x-direction, $f_{even,k}$ and $f_{odd,l}$ (equation (25)). Their function values are illustrated in FIG. 10 and presented in Table 2 as discrete convolution kernels. According to a preferred embodiment, the resulting convolution functions should be mean-free, therefore $\text{off}_{even,1}$ and $\text{off}_{even,2}$ are chosen such that equation (26) is satisfied. This is beneficial to avoid noise caused by gain tolerances and offset tolerances of real cameras.

$$f_{even,1}(x) = 3.4954 \cos\left(\frac{\pi x}{8}\right) + 0.7818 \cos\left(\frac{\pi x}{4}\right) + \text{off}_{even,1} \quad (25)$$

$$f_{even,2}(x) = 4.9652 \cos\left(\frac{3\pi x}{8}\right) + 1.8416 \cos\left(\frac{\pi x}{2}\right) + \text{off}_{even,2}$$

$$f_{odd,1}(x) = 4.0476 \sin\left(\frac{\pi x}{8}\right) - 0.2559 \sin\left(\frac{\pi x}{4}\right)$$

$$f_{odd,2}(x) = 6.0228 \sin\left(\frac{3\pi x}{8}\right) - 0.0332 \sin\left(\frac{\pi x}{2}\right)$$

-continued $$\int_{-T/4}^{T/4} f_{even,1}(x)dx = 0 \quad (26)$$

$$\int_{-T/4}^{T/4} f_{even,2}(x)dx = 0$$

TABLE 2

| x | −3.5 | −2.5 | −1.5 | −0.5 | 0.5 | 1.5 | 2.5 | 3.5 |
|---|---|---|---|---|---|---|---|---|
| $f_{odd,1}$ | −3.85 | −3.11 | −2.00 | −0.69 | 0.69 | 2.00 | 3.11 | 3.85 |
| $f_{even,1}$ | −2.25 | −0.59 | 0.96 | 1.88 | 1.88 | 0.96 | −0.59 | −2.25 |
| $f_{odd,2}$ | 4.7 | −1.13 | −5.55 | −3.13 | 3.13 | 5.55 | 1.13 | −4.7 |
| $f_{even,2}$ | −0.38 | −4.71 | −1.03 | 6.12 | 6.12 | −1.03 | −4.71 | −0.38 |

As can be seen from Equation (25), the four convolution kernels each contain a weighted sum of a plurality of harmonic functions of different spatial frequencies. Here, the even convolution kernels contain $f_{even,1,2}$ comprise a weighted sum of cosine functions, i.e. even functions with the weighting coefficients 3.4954 and 0.7818 ($f_{even,1}$), and 4.9652 and 1.8416 ($f_{even,2}$), respectively. The odd convolution kernels ($f_{odd,1,2}$) represent a weighted sum of odd sine functions. In the example, these have weight coefficients 4.0476 and −0.2559, and 6.0228 and −0.0332, respectively. Thus, according to one embodiment it is intended for the computing device to be configured to perform convolutions of the signal pairs $YL_{signal,v}$ and $YR_{signal,v}$ for v from 1 to $v_{max}$ with two even and two odd second convolution kernels, which are given by the equations (25) and (26). More generally stated, the signal pairs $YL_{signal,v}$ and $YR_{signal,v}$ for v from 1 to $v_{max}$ are convolved with two even and two odd second convolution kernels comprising the functions as listed in equation (25). The coefficients (3.4954, 0.7818, . . . ) in front of the sin functions and cos functions may also deviate slightly upwards or downwards, i.e. by 10%, from the given values. Accordingly, at least one of the coefficients 3.4954, 0.7818, 4.9652, 1.8416, 4.0476, 0.2559, 6.0228, 0.0332 may also be larger or smaller by up to 10%. Preferably, the convolution kernels are also selected such that they are approximately or completely free of mean values.

It is advantageous, but not necessary, to place the coordinate origins of the even and odd functions encompassed by the convolution kernels close to the centroid of the respective image patch. Here, centroid refers to the geometric center of the respective image patch.

The slight deviations in the coefficients of the filter kernels may also be such that they deviate slightly from discretized values of perfectly even or odd functions. This deviation may, for example, be up to 15%, preferably up to 10%, from values of ideally even or odd functions. For the sake of clarification, possible deviations of the discretized coefficients from coefficients of ideal even or odd functions shall be listed below. If an odd filter kernel with coefficients of a discretized ideal odd function is given by the values −2; −1; 1; 2, a filter kernel that gives only negligibly increased noise might be given by −2; −1; 1.1; 2. Here, the positive coefficient adjacent to the center of the kernel is increased by 10%. Furthermore, the symmetry of an ideally even or odd filter kernel will be disturbed only slightly when additional low-weight coefficients are added. For example, such a slightly different kernel could be: −2; −1; 1; 2; 0.1. Here, the filter kernel contains an additional coefficient 0.1 which disturbs the ideal symmetry with respect to the center of the kernel between the coefficients 1 and −1, but on the other hand, due to its low weight, will change the convolution result only insignificantly.

In one variant, the coefficients in front of the sin functions and cos functions do not have to exactly match the coefficients of equations (24) and (25), rather they may even deviate by a factor in the range from 0.8 to 1,2, preferably in the range from 0.9 to 1.1, with still good noise suppression.

Figure 11:
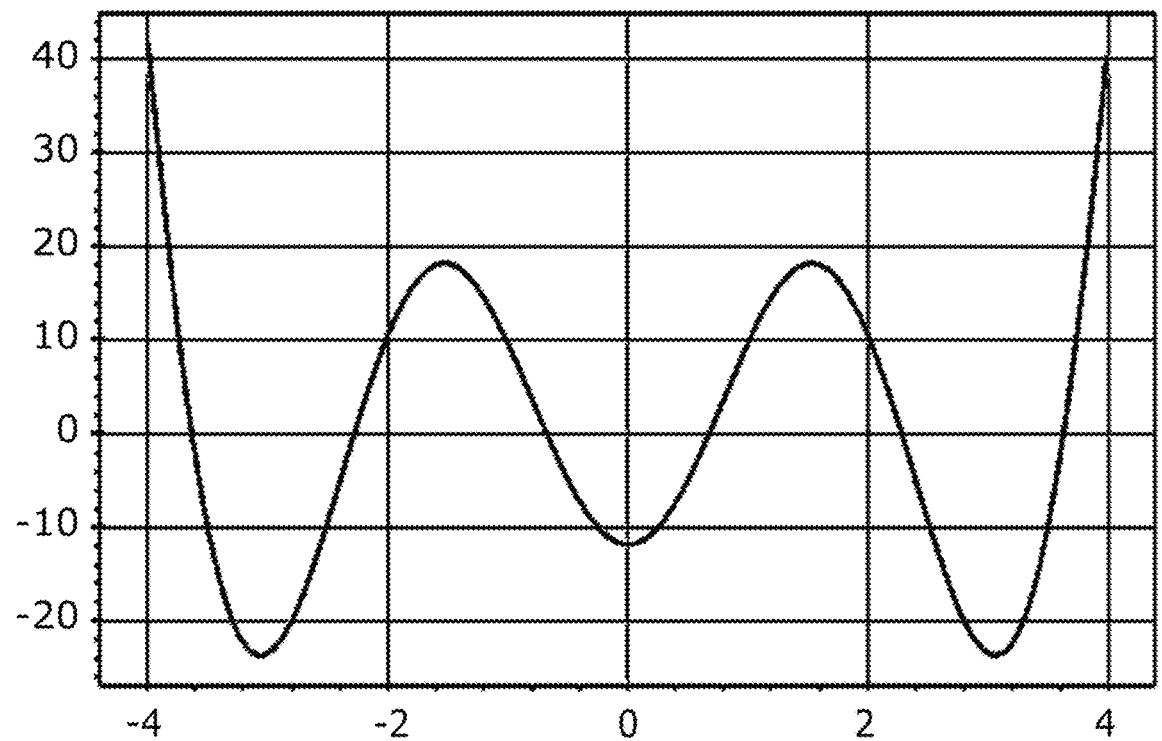
FIG. 11 shows the function values of an even convolution kernel in the signal model in conjunction with the odd convolution kernels from FIG. 10.

Instead of two even convolution kernels, a single even convolution kernel can also be used with slightly increased noise. The function of such an even convolution kernel is shown in FIG. 11 and presented as a discrete convolution kernel in Table 3. In a refinement of this embodiment, which is also implemented in the example of FIG. 11 and Table 3, this convolution kernel contains weighted frequencies of all spatial frequencies $\omega$ to $4\omega$, i.e. it represents a weighted sum of harmonic functions of these spatial frequencies $\omega$ to $4\omega$. This saves 25% in calculation effort. By contrast, solutions for k=1 and l=1 can only be digitized with considerable digitization errors, i.e. with high noise, and are therefore useless. With only one even or only one odd kernel, noise compensation is impossible, so these options are also useless. A calculation for only 2 or 3 spatial frequencies is possible similarly, but will typically result in a lower measurement accuracy.

TABLE 3

| x | −3.5 | −2.5 | −1.5 | −0.5 | 0.5 | 1.5 | 2.5 | 3.5 |
|---|---|---|---|---|---|---|---|---|
| $f_{even,\,1}$ | −3.45 | −8.37 | 15.37 | −3.55 | −3.55 | 15.37 | −8.37 | −3.45 |

The exemplary embodiment uses $v_{max}=5$ signal pairs, which are calculated by performing a convolution of $YL_{image}$ and $YR_{image}$ in the y-direction with convolution kernels $f_{y,v}$ with the spatial frequencies 0 and $\omega$ to $4\omega$. Optimal noise reduction is achieved when the 5 signal pairs are optimally decorrelated and have similar amplitudes. In this case, the signal in $SSD_{inv}(\delta)$ increases, but at the same time the proportion of $SSD_{var}(\delta)$ decreases due to random phases $\Delta$, which increases the signal-to-noise ratio. Decorrelated signals are obtained after convolution with orthogonal functions, e.g. with the WFT. The amplitudes of the signal pairs are adjusted by normalization with the OTF, so that the influence of signal pairs with higher-order spatial frequencies is increased. It is advantageous to use the same convolution kernels, already optimized for low noise, as for the convolution in the x-direction (i.e., for k=2 and l=2, for example, to take the convolution kernels in Equation (25) and Equation (26) for $f_{y,2}$ to $f_{y,5}$ and to set $f_{y,1}$=1). In this case, a particularly low-noise signal will be generated, which can be used to calculate a confidence signal (see below). In addition, it is in fact advantageous to determine the convolution kernels using the same approach as for the convolution kernels in the x-direction, but to not lower the weight for the highest spatial frequency, as already described.

Figure 12:
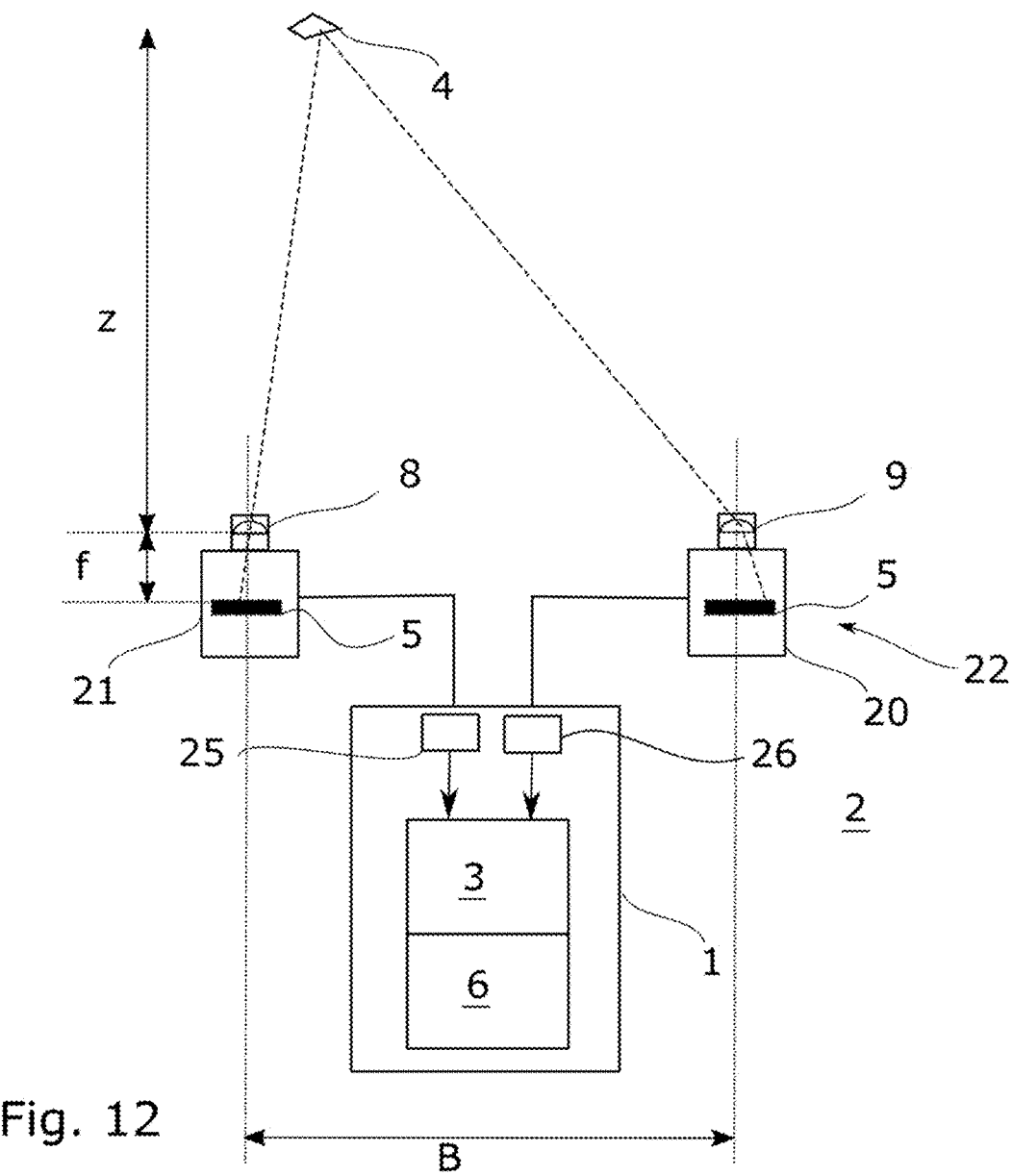
FIG. 12 shows a stereo camera comprising a correspondence analyzer.

In the following, the execution of the method for determining disparities using the correspondence analyzer will be described. For this purpose, FIG. 12 schematically shows the configuration of a stereo camera 2 comprising a correspondence analyzer 1. The stereo camera 2 comprises a capturing device 22 consisting of two cameras 20, 21 including camera sensors 5 and two lenses 8, 9 for imaging an object 4. The optical centers of the lenses 8, 9 are spaced apart from each other by the base width B. For determining the disparity $\delta$, the digital images 25, 26 are transferred to the correspondence analyzer 1 and analyzed by the computing device 3 thereof. The object distance Z can then be determined on the basis of the disparity as determined by the correspondence analyzer 3 and the focal length f according to equation (1). To this end, the profile vectors stored in the memory 6 of the correspondence analyzer (or the convolution kernels corresponding to these profile vectors) are convolved with the rectified image signals. For this purpose, the convolution results of image patches selected from the two digital images 25, 26 with varying relative spacing are subtracted from each other by the computing device 3 and processed in a non-linear manner, preferably squared. The sum of these non-linearly processed differences gives a value of the correspondence function $SSD(\delta)$ for the selected relative distance $\delta$.

The image data of the two cameras 20, 21 are preferably rectified with sub-pixel accuracy, as described above with reference to FIG. 2. If the signal-to-noise ratio requirements are high, it is advantageous to adjust the coplanarity of the optical axes of the cameras. For this purpose, the position of the intersection points of the optical axes of the two cameras is first determined in the object space for at least two distances using a planar test image, and the orientation of the optical axes in space is determined by connecting these intersection points. When correctly aligned, the optical axes are coplanar and lie in the epipolar plane. The straight lines connecting the intersection points for all measured distances are therefore also coplanar. One of the two cameras is equipped with an eccentric adjustment means, FIG. 1. A coplanarity error exists when the connecting lines are skewed relative to each other. The correction is achieved by rotating the lens. The eccentric causes a fine change in the orientation of the optical axis relative to the mechanical axis. The rotation is performed until coplanarity of the optical axes is achieved. Coplanarity adjustment errors may also occur during the service life of the stereo camera, for example due to temperature fluctuations or mechanical shock loads. With some tradeoff, this error can be corrected for a given distance Z by using the method as described further below to calculate the disparity $\delta_y$ approximately perpendicular to the epipolar line, i.e. in the y-direction. Finally, the mean disparity error $\delta_y$ measured with sub-pixel precision is included in the rectification of one of the two cameras, so that the offset corresponding to the disparity error $\delta_y$ is corrected. The method works in a limited disparity range, but is useful for many applications with accuracy requirements depending on the object position, e.g. for positioning tasks in robotics. According to one embodiment, it is specifically intended for the stereo camera to be configured to additionally evaluate the disparity $\delta_y$ of corresponding image patches in a direction approximately perpendicular to the epipolar line during the runtime of the correspondence analyzer for correcting alignment errors of the coplanarity, and to correct the average deviation of this disparity from zero, i.e. a deviation from the ideal epipolar geometry, by an opposite shift of one of the images approximately perpendicular to the epipolar line, in particular by using a correction of the rectification parameters. It is advantageous to improve the signal-to-noise ratio in a range of large object distances Z in this way. For small object distances, the signal-to-noise ratio is often sufficient.

The method described above is used to determine suitable convolution kernels. In particular, it allows to calculate the weights g according to equations (11) and (21). The convolution kernels are stored in a memory of the correspondence analyzer 1. According to one embodiment, the correspondence analyzer is configured to first evaluate image statistics depending on the application, for example by contrast evaluation or evaluation of the power spectrum. Then, the correspondence analyzer 1 selects a profile corresponding to the image statistics, e.g. in the case of autonomous driving the profile for good contrast under normal conditions, or for reduced contrast in fog. The selected profile defines at least one set of convolution kernels. More generally, the correspondence analyzer 1 may store a plurality of profile vectors g for identical or for differently parameterized correspondence functions and convolution functions, and/or the correspondence analyzer 1 may be configured to calculate one or more profile vectors g at runtime, and the correspondence analyzer 1 is furthermore configured to determine the local or global power spectrum of the image data and to employ advantageous profile vectors g on the basis of the local or global power spectrum in the image. It is also possible to perform calculations with a plurality of sets of differently parameterized profile vectors and to compare the results. Thus, the correspondence analysis can be performed with two or more differently parameterized correspondence functions and convolution kernels, and the computing device combines the two or more resulting results or selects partial results from these results, preferably on the basis of the determined confidence vectors. What applies in particular to the set of convolution kernels regardless of the respective profile vector is that the convolution kernels are selected in such a way that, when determining the disparity for an object with a sinusoidally modulated intensity distribution, this disparity is largely independent of a lateral displacement of the object in the image plane of the individual images. This is especially true for a modulation with spatial frequencies within the sampled spatial frequency range as determined by the size of the search image patches.

Figure 16:
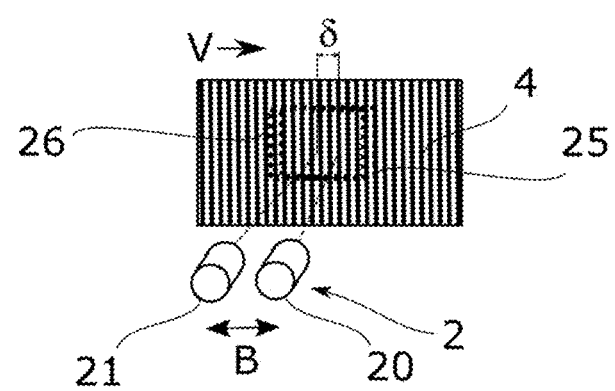
FIG. 16 shows a stereo camera capturing an object with a sinusoidal brightness modulation.

For illustration purposes, FIG. 16 shows such an object 4 captured by the cameras 20, 21 of a stereo camera 2, in the form of a flat object whose surface has a sinusoidal brightness modulation. The modulation extends along the direction of the relative image shift in the digital individual images 25, 26 and thus also in the direction of the disparity δ to be determined. In the view of FIG. 16, the modulation is symbolized by a simple stripe pattern. Thus, the illustrated modulation is simply rectangular instead of sinusoidal, however with the same orientation as the sinusoidal modulation. The disparity depends on the distance of the object 4 from the stereo camera 2. If the object 4 is now displaced in the direction V of the sinusoidal modulation, i.e. also in the direction of the disparity, but with a constant distance from the stereo camera 2, the disparity will remain essentially unaffected, provided that the pattern does not introduce any ambiguities. The invariance with respect to a shift V can also be checked with calculated digital images in order to be able to verify the effect on idealized image data without additional noise.

Now, a test shall be described which can be used to demonstrate the small variation of the disparity calculated by the correspondence analyzer presently described compared to such an intensity modulation on an object. As already discussed above, such variations, expressed as standard deviation (STD), are typically in the range of distances of less than 0.2 pixels, preferably no more than 0.1 pixels, while prior art systems exhibit variation ranges greater than 0.2, typically in the range of 0.2 to 0.5 pixels. More generally, without being limited to the example described herein, the convolution kernels are preferably selected such that, when determining the disparity on a planar object that is displaced along the epipolar line at a constant distance Z from the camera, a local standard deviation of the disparity measurements of less than 0.2 pixel, or even 0.1 pixel is achieved for a shift of a planar object, if the object has an intensity modulation along the direction of the epipolar line, in particular including a spatial frequency in the spatial frequency range, or a corresponding texture.

Now, two measurements are performed with a planar physical measurement object that carries a texture which includes spatial frequencies in the image plane that are within the spatial window (with spatial frequencies ω=2Pi/9 to 2Pi/5 for an 8×8 environment). The texture is perpendicular to the epipolar plane, e.g. cos Ox, the object is correctly focused with approx. 80% amplitude in the image. The measurement object is planar.

A plurality of measurements, for example 100 measurements, are performed on the stationary object at a first point of the measurement object. The sensor generates noise. Based on the measurement, the standard deviation $\sigma_\delta$ and the mean value $\delta_{mean,1}$ can be calculated. The measurement can be repeated at a different point of the same measurement object.

The object is now repeatedly shifted by a small amount parallel to the imaging plane and along the epipolar line, so that the distance to the stereo camera 2 in the measuring field does not change. Subsequently, measurements are performed at this second and the further locations of the measurement object, e.g. 100 measurements, and $\sigma_\delta$ as well as the mean value $\delta_{mean,n}$ n=2 . . . 10 are calculated. This is repeated for further points. Then, the STD σ is calculated for $\delta_{mean,n}$ n=2 . . . 10. If this value of the standard deviation σ is less than 0.2 pixels, or even less than 0.1 pixels under good conditions, then this is a typical characteristic of the correspondence analyzer presently described, or of the stereo camera equipped with this correspondence analyzer.

The correspondence analyzer performs the convolutions by discrete multiplications/additions, as already explained above. The exemplary embodiment describes a convolution in an 8×8 $px^2$ environment with $u_{max}=4$ convolution kernels in the x-direction (Table 4) and $v_{max}=5$ convolution kernels in the y-direction (Table 5). $u_{max}$ is equal to the sum of $k_{max}$ and $l_{max}$, each having the value 2 in the exemplary embodiment. The convolution kernels in Table 4 correspond to the convolution kernels in Table 2. The convolution kernels in Table 5 are composed of the $u_{max}$ convolution kernels from Table 4 and a convolution kernel $f_{y,1}$ for the spatial frequency 0.

TABLE 4

| x | −4 | −3 | −2 | −1 | 0 | 1 | 2 | 3 |
|---|---|---|---|---|---|---|---|---|
| $f_{x,1}$ | −3.85 | −3.11 | −2.00 | −0.69 | 0.69 | 2.00 | 3.11 | 3.85 |
| $f_{x,2}$ | −2.25 | −0.59 | 0.96 | 1.88 | 1.88 | 0.96 | −0.59 | −2.25 |
| $f_{x,3}$ | 4.7 | −1.13 | −5.55 | −3.13 | 3.13 | 5.55 | 1.13 | −4.7 |
| $f_{x,4}$ | −0.38 | −4.71 | −1.03 | 6.12 | 6.12 | −1.03 | −4.71 | −0.38 |

TABLE 5

| y | −4 | −3 | −2 | −1 | 0 | 1 | 2 | 3 |
|---|---|---|---|---|---|---|---|---|
| $f_{y,1}$ | 1 | 1 | 1 | 1 | 1 | 1 | 1 | 1 |
| $f_{y,2}$ | −3.85 | −3.11 | −2.00 | −0.69 | 0.69 | 2.00 | 3.11 | 3.85 |
| $f_{y,3}$ | −2.25 | −0.59 | 0.96 | 1.88 | 1.88 | 0.96 | −0.59 | −2.25 |
| $f_{y,4}$ | 4.7 | −1.13 | −5.55 | −3.13 | 3.13 | 5.55 | 1.13 | −4.7 |
| $f_{y,5}$ | −0.38 | −4.71 | −1.03 | 6.12 | 6.12 | −1.03 | −4.71 | −0.38 |

In the digital camera images, pixels at the position x and y reflect values in the pixel neighborhood of x+0.5 and y+0.5, which is why the indices of the convolution kernels are adjusted accordingly from −3.5 to 3.5 to −4 to 3. In the case of even-numbered sizes of the convolution kernels, as in the exemplary embodiment, the effective measurement point shifts, which is why x' and y' are shifted by half a pixel in the calculation of the 3D data using equation (1) compared to the position of the measurement. A similar correction has to be considered when assigning the color or gray values from $YL_{image}$ to the 3D data.

The computing device uses the convolution kernels to calculate a set of $u_{max}*v_{max}$ features ($FL_{u,v}$ and $FR_{u,v}$, respectively) for each image coordinate x,y in the left and right rectified camera images ($YL_{image}$ and $YR_{image}$, respectively), as shown in Equation (27).

$$YL_{Signal,v}(x, y) = \sum_{o=-4}^{3} f_{y,v}(o) \cdot YL_{Image}(x, y + o) \quad (27)$$

$$YR_{Signal,v}(x, y) = \sum_{o=-4}^{3} f_{y,v}(o) \cdot YR_{Image}(x, y + o)$$

$$FL_{u,v}(x, y) = \sum_{o=-4}^{3} f_{x,u}(o) \cdot YL_{Signal,v}(x + o, y)$$

$$FR_{u,v}(x, y) = \sum_{o=-4}^{3} f_{x,u}(o) \cdot YR_{Signal,v}(x + o, y)$$

This set of features per image coordinate will be referred to as a feature vector below. In the spatial frequency range, the feature vectors contain the signals required for the subpixel-precise disparity measurement. Due to the subsequent differentiation SSD'(a) in the direction of the epipolar line, information is missing, which means that several false positive measured values (candidates) may be generated in addition to the correct measured value. For this reason, the processing is performed in 2 steps:
noise-optimal calculation of the disparity;
noise-optimized selection of the candidates of the correct measured value.

According to one embodiment, the noise-reduced selection of the candidates is achieved using additionally or simultaneously calculated confidence vectors $KL_v$ and $KR_v$, as shown in equation (28).

$$KL_v(x, y) = \sum_{o=-4}^{3} f_{Konf}(o) \cdot YL_{Signal,v}(x + o, y) \quad (28)$$

$$KR_v(x, y) = \sum_{o=-4}^{3} f_{Konf}(o) \cdot YR_{Signal,v}(x + o, y)$$

These confidence vectors do not contain any disparity information but are used to estimate the quality of disparity measurements. For example, the convolution kernel $f_{konf}$ can be obtained on the basis of a Gaussian function, in order to include adjacent signals in the confidence vectors. Instead of or in addition to the calculation of the confidence vectors using the $v_{max}$ signals, as shown in Equation (28) by way of example, it is also possible to use further information from the reference image patch and the search image patches, such as the normalized cross-correlation coefficient between the luminance data of the reference image patch and the respective search image patch.

The selection of disparity candidates on the basis of confidence vectors can also be used independently of the manner in which a correspondence function is determined. Essentially, a plurality of candidates for the disparity are determined from the reference image patch and the search image patches, and these are then evaluated with regard to their validity using the confidence vectors. Therefore, regardless of the specific way in which the disparity is calculated, a correspondence analyzer 1 is provided for determining the disparity of corresponding image elements in two digital individual images 25, 26, which comprises a computing device 3 that is configured to select respective image patches from the two individual images 25, 26, wherein at least one image patch of one of the individual images is selected as a reference image patch, and search image patches are selected in the other individual image, and to calculate a plurality of candidates for a disparity value from the image patches, wherein the computing device 3 is furthermore configured to select information from the reference image patch and the search image patches which in particular is not transferred by the correspondence function or its first derivative, and to use this information to select confidence vectors for results of the correspondence function, or to select possible disparity values that are suitable for estimating whether the respective result indicates an actual correspondence of the respective search image patch with the reference image patch. The selection of a candidate disparity value can then be made based on the values of the confidence values. Accordingly, in a refinement it is therefore intended for the computing device 3 to be configured to generate a list of candidates for the disparity value for a particular reference image patch, preferably to select a confidence vector preferably for each candidate, and, on the basis of the confidence vectors and/or other selection criteria, to select all or part of these candidates as valid, or to select that none of the candidates is considered valid for the particular reference patch. It is also possible to further use or expand confidence vectors that have been determined in other ways.

According to a refinement of this embodiment, the computing device 3 is configured to select the values of at least one element of the confidence vector using functions which, at least for some classes of reference and search image patches, are able to classify candidates as valid or as invalid with a higher probability than is possible when using the correspondence function alone. When using the correspondence function alone, a candidate could be determined to be correct in particular by comparing the values of the minima of the correspondence function and selecting the clearest minimum. The correspondence function is preferably designed to suppress information that is not necessary for the calculation of disparities in order to avoid potential sources of noise. With the confidence function, such suppressed information can then be considered again in the selection of candidates, for example, without interfering with the calculation of disparity. Specifically, the computing device may select values of elements of a confidence vector using one or more of the following features:

relation or difference of the correspondence function $SSD(\delta_p)$ of the candidate at point $\delta_p$ to a threshold value derived from the extrema of the correspondence function of all candidates of the reference image patch;

gray value relations, preferably gray value differences between a part of the reference image patch and a part of the respective search image patch, or a feature derived from these gray value differences;

color relations, preferably color differences between a part of the reference image patch and a part of the respective search image patch, or a feature derived from these color differences;

relation of the signal strength in the reference image patch compared to the signal strength in the respective search image patch;

normalized cross-correlation coefficient between the data of a part of the reference image patch and the data of a part of the respective search image patch, approximately perpendicular to the epipolar line in each case; wherein these features are preferably slightly low-pass filtered approximately along the epipolar line to avoid noise.

The relations can also be non-linear. Accordingly, the respective variables, such as color or gray value, can also be processed in a non-linear manner. For example, instead of a linear difference of the gray values, a difference of the squared gray values could be calculated. Furthermore, the input data may already be processed in a non-linear manner, and/or non-linear processing may be performed when determining the values of the confidence vector.

The computing device 3 may advantageously also be configured to make available, to a user of the correspondence analyzer or of the computing device, the lists of candidates, preferably only the valid candidates, and preferably together with the respective confidence vectors. This can be accomplished, for example, via suitable interfaces, such as a data output or a screen. In this way, the different confidence criteria can be matched and adjusted to the quality of the determination of the 3D coordinates, inter alia. According to one embodiment, the confidence values can furthermore advantageously be filtered according to the SSD values using an output low-pass filter. In particular, the output low-pass filter may be the same filter as is also used for the values of the correspondence function $SSD(\delta_p)$ according to one embodiment. This makes it possible to use the same hardware configuration for both low-pass filtering processes. Furthermore, the output low-pass filter for the values of the correspondence function may include the respective corresponding confidence values as a weight for this filtering process. It is also possible for the disparity values to be weighted with confidence values prior to the low-pass filtering. Therefore, another possibility is to filter confidence value-weighted disparity values using a low-pass filter. Accordingly, it is contemplated for the computing device to be configured to filter the calculated disparity values and/or confidence values using a low-pass filter.

The feature vectors and the confidence vectors are calculated for discrete image positions at integer pixel coordinates. The computing device 3 also accumulates the SSD $(x,y,\delta_p)$ at integer disparity values $\delta_p$, as shown in Equation (29) for the exemplary embodiment, and thus calculates the sum of squares of the differences of the features.

$$SSD(x, y, \delta_p) = \sum_{u=1}^{4}\sum_{v=1}^{5}(FR_{u,v}(x+\delta_p, y) - FL_{u,v}(x, y))^2 \qquad (29)$$

Figure 13:
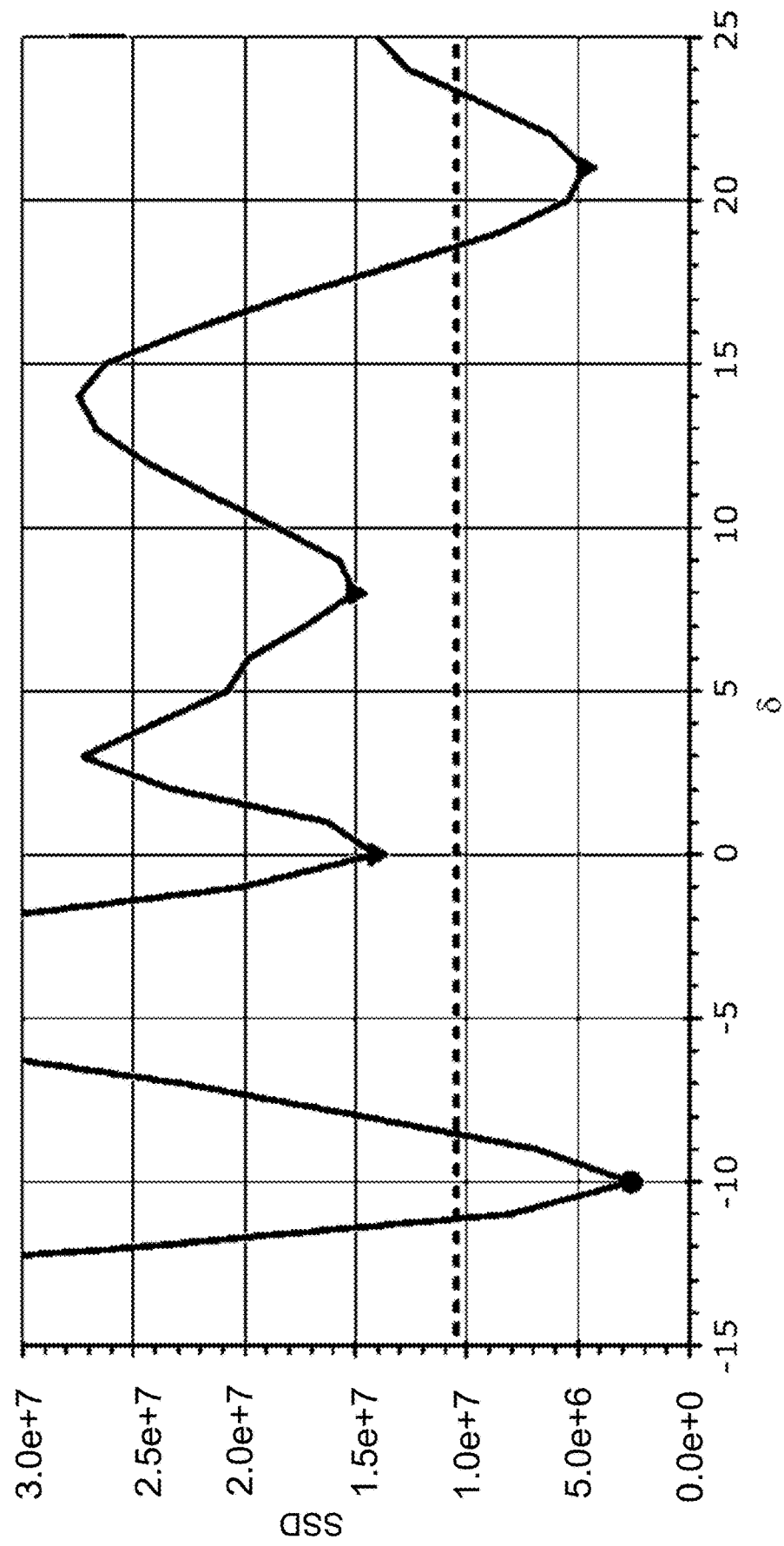
FIG. 13 shows an exemplary profile of the correspondence function $SSD(\delta)$ in a defined disparity range.

This calculation of the correspondence function $SSD(x, y, \delta_p)$ is performed by the computing device for several, in particular for all possible integer values of the disparity $\delta_p$ in the disparity range to be expected, and the local extrema of the correspondence function $SSD(x,y,\delta_p)$ are determined. A typical exemplary profile of $SSD(x,y,\delta_p)$ is illustrated in FIG. 13. The first derivative $SSD'(x,y,\delta_p)$ and the second derivative $SSD''(x,y,\delta_p)$ of the discrete function $SSD(x,y,\delta_p)$ are defined as shown in equation (30). According to one embodiment, a value $\delta_p$ is identified as a local minimum if the condition in equation (31) is met.

$$SSD'(x, y, \delta_p) = SSD(x, y, \delta_p) - SSD(x, y, \delta_p - 1) \qquad (30)$$
$$SSD''(x, y, \delta_p) = SSD'(x, y, \delta_p + 1) - SSD'(x, y, \delta_p)$$
$$SSD'(x, y, \delta_p) = \; <0 \wedge SSD'(x, y, \delta_p + 1) \geq 0 \qquad (31)$$

Furthermore, the correspondence analyzer 1 or the computing device thereof determines the differences $SSD'(x,y,\delta_p)$ and local minima, which are indicated by a sign change of these differences. On the basis of local extremes, in particular minima of the correspondence function $SSD(x,y,\delta_p)$ at a disparity $\delta_p$, the computing device can then calculate a subpixel-precise value of a group disparity $\delta_{sub}$ in a preferred embodiment, as shown in the formulas of equation (32).

$$\begin{aligned}\delta_{sub}(x, y, \delta_p) &= \delta_p - \frac{1}{2} \cdot \frac{SSD'(x, y, \delta_p) + SSD'(x, y, \delta_p + 1)}{SSD''(x, y, \delta_p)} \\ &= \delta_p - \frac{1}{2} \cdot \frac{SSD'(x, y, \delta_p) + SSD'(x, y, \delta_p + 1)}{SSD'(x, y, \delta_p + 1) - SSD'(x, y, \delta_p)} \\ &= \delta_p - \frac{1}{2} \cdot \frac{SSD(x, y, \delta_p + 1) - SSD(x, y, \delta_p - 1)}{SSD(x, y, \delta_p - 1) + SSD(x, y, \delta_p + 1) - 2 \cdot SSD(x, y, \delta_p)}\end{aligned} \qquad (32)$$

The parabolic interpolation used in equation (32) is possible due to the optimization of the group disparity function already described above. It is advantageous to calculate a subpixel-precise value of the correspondence function at the point $\delta_{sub}$, for example similarly to equation (32).

$$SSD'(x, y, \delta_p) = \sum_{u=1}^{4}\sum_{v=1}^{5}((FR_{u,v}(x+\delta_p, y) - FR_{u,v}(x+\delta_p - 1, y)) \cdot \qquad (33)$$
$$(FR_{u,v}(x+\delta_p, y) + FR_{u,v}(x+\delta_p - 1, y) - 2 \cdot FL_{u,v}(x, y)))$$

$\delta_{sub}$ can be determined from values of $SSD'(x,y,\delta_p)$, which in turn can be directly calculated from features, as shown in Equation (33). This can be advantageous, since smaller word lengths or lower accuracies are sufficient for this calculation when using floating-point numbers in comparison to a calculation according to equation (29).

Accordingly, the computing device 3 is configured, according to this embodiment, to calculate the subpixel-precise value $\delta_{sub}$ of a group disparity in the neighborhood of a local extremum using the relationship (33), wherein $\delta_p$ is a pixel-precise local extremum of the correspondence function, and $SSD'(x,y,\delta_p)$ is the derivative of the correspondence function $SSD(x,y,\delta_p)$.

According to one embodiment, the correspondence analyzer stores a list of actual disparity candidates $\delta_{sub}$ that were determined by the computing device for local minima at positions $\delta_p$. These candidates, each one for a minimum at the position 6K, are preferably supplemented with attributes, such as the signal strength of the disparity signal that can be represented by $SSD''(x,y,\delta_K)$, the value of the confidence function $KSSD(x,y,\delta_K)$ as shown in equation (34), and average brightness differences or color differences between the respective neighborhoods in the left and right camera images. $KSSD(x,y,\delta_K)$ only uses the signals v that were determined by convolution with the convolution kernels for the x-direction in Table 4. Here, $f_{Konf}$ is a convolution kernel that is only slightly influenced by a shift in the x-direction, for example a Gaussian filter.

$$KSSD(x, y, \delta_p) = \sum_{v=2}^{v_{max}} (KR_v(x + \delta_p, y) - KL_v(x, y))^2 \quad (34)$$

More generally, it is contemplated according to one embodiment to assign a confidence to the disparity candidates and to compare the confidences, and one or more candidates with high confidence values are regarded as valid and are processed further. Conversely, at least one disparity candidate which has a lower confidence compared to one or more other candidates, is sorted out, i.e. not processed further. For example, the computing device 3 may be configured to determine the confidence for the candidates, which is based on a criterion based on the $SSD(\delta)$ compared to the power spectrum of the respective reference point, the second derivative of $SSD(\delta)$, averaged gray values or color values in a neighborhood of the candidate compared to the neighborhood of the reference point, and optionally other measured values, and then to compare these confidence values with the confidence values of other candidates that represent conflicting measurement results, and to consider valid in these comparisons only candidates with significantly higher confidence values. The calculated confidence values are thus compared with one another and at least one candidate for the disparity is determined as valid on the basis of the comparison. The determination can be accomplished by further processing this disparity value or by sorting out one or more other candidates for the disparity value.

According to one embodiment, the computing device 3 of the correspondence analyzer comprises at least one FPGA and/or at least one GPU, optionally also a plurality of such units. Instead of reconfigurable FPGAs, it is also possible to use one-time reconfigurable computing devices (eASIC) or non-reconfigurable computing devices (ASIC).

Figure 14:
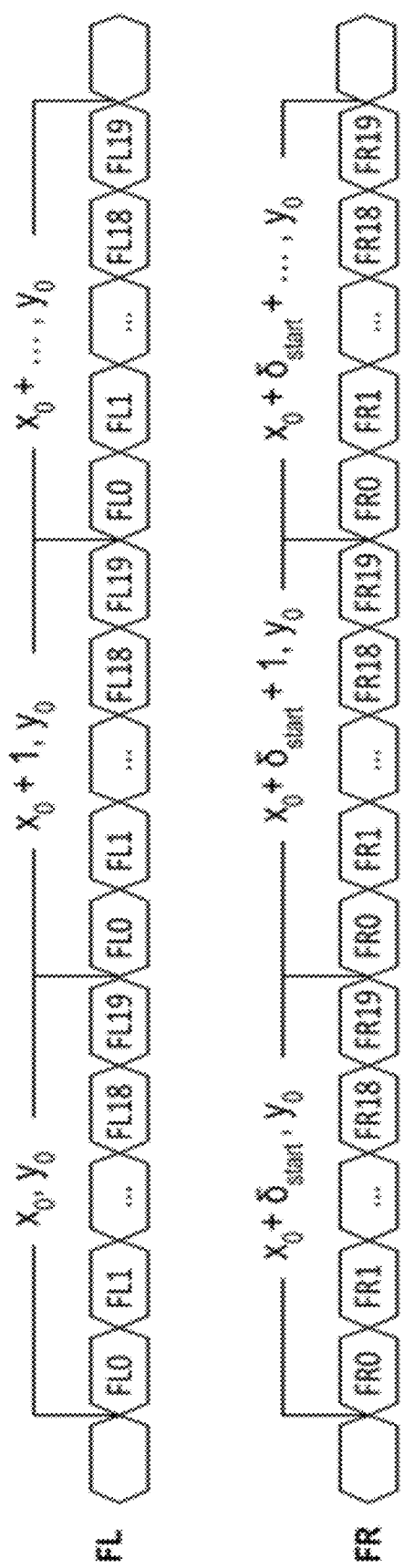
FIG. 14 schematically illustrates the calculation of data streams with the features of the camera images.
Figure 15:
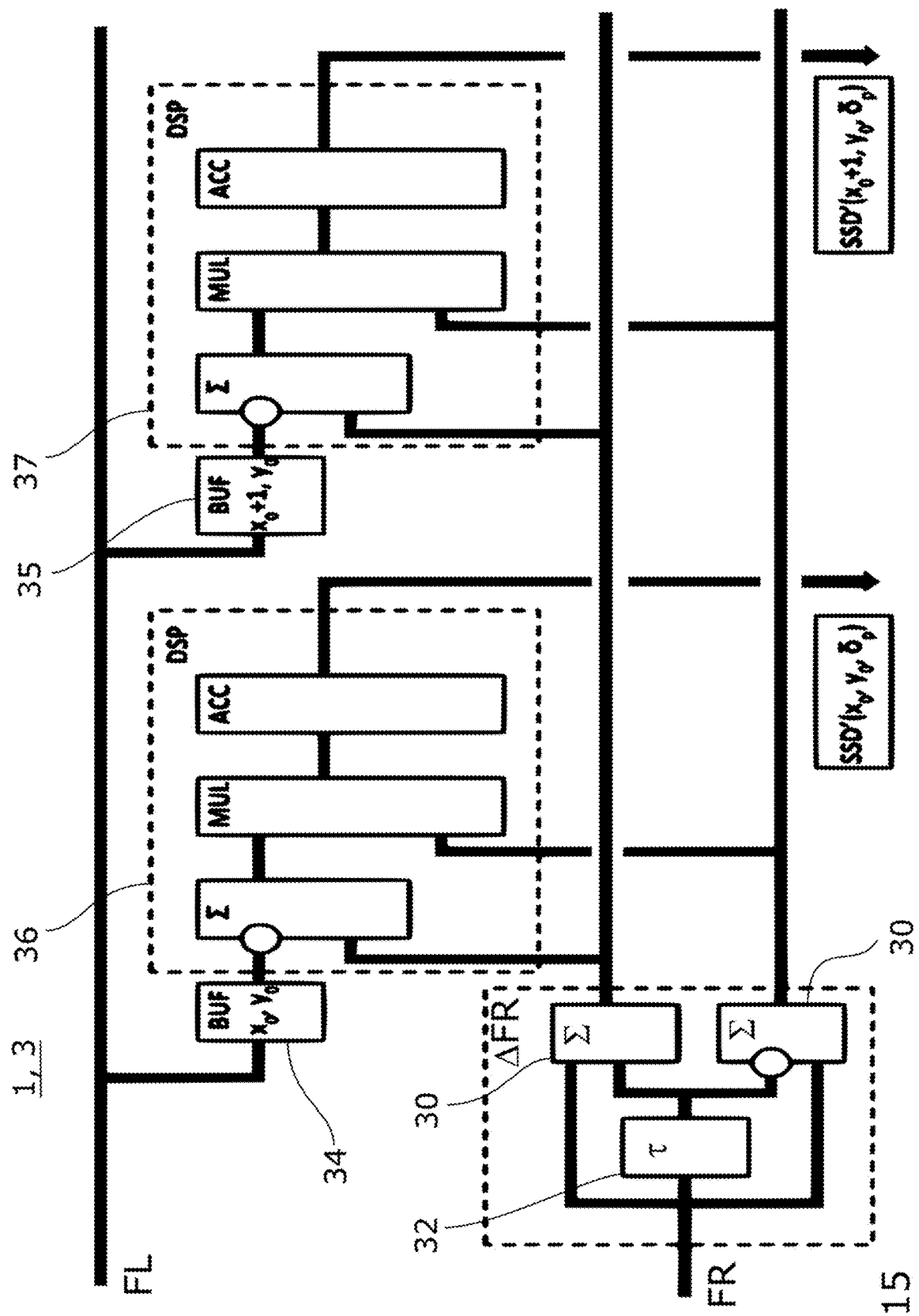
FIG. 15 schematically shows a hardware configuration for processing the data streams.

FIGS. 14 and 15 show the principle of an exemplary implementation of the correspondence analyzer 1 on an FPGA as part of the computing device 3. In the rectified images $YL_{image}$ and $YR_{image}$, a respective window is shifted synchronously in the row direction on the same row $y_0$. This results in two synchronous data streams FL and FR, as shown in FIG. 14. These data streams consist of $u_{max} * v_{max}$ features (equation (27)) for each position x, illustrated as FL0 to FL19 and FR0 to FR19, respectively. $\delta_{start}$ is equal to the lower limit of the disparity range to be expected. The handling of cases where $YR_{image}$ does not cover the entire disparity range for a pixel at position $x_0$ in $YL_{image}$ is trivial and will not be considered further.

In block ΔFR in FIG. 15, the terms $FR_{u,v}(x_0+\delta_p,y_0)+FR_{u,v}(x_0+\delta_p-1,y_0)$ and $FR_{u,v}(x_0+\delta_p,y_0)-FR_{u,v}(x_0+\delta_p-1,y_0)$ are obtained from the data stream FR by 2 adders 30 and a delay unit τ, reference numeral 32. Now, a block of the correspondence analyzer 1 or its computing device 3 shall be explained. A vector with, in the example, 20 features is copied from the data stream FL from the address $x_0$ into the DualPort RAM 34 (BUF) at the start time and is then read out repeatedly. At the start time, the data stream FR delivers features from the address $x_0$. Beginning at the start time, a DSP 36 (e.g. XILINX DSP48E1) calculates function values $SSD'(x_0,y_0,\delta_p)$ analogously to equation (33) for each integer $\delta_p$ in the disparity range to be expected. For the adjacent address $x_0+1$ and for each additional one, a DualPort RAM 35 is used, as well as a further DSP 37 which works similarly to the first DSP 36, but for other coordinates in the row in $YL_{image}$. DSPs that have run through the disparity range can be reused.

The function values $SSD'(x_0,y_0,\delta_p)$ are then evaluated by a first filter processor. If the conjunction in equation (31) (with $x=x_0$ and $y=y_0$) is true, then $SSD(x_0,y_0,\delta_p)$ has a minimum at position $\delta_p$. For such minima, the subpixel-precise group disparity value $\delta_{sub}$ is determined. These minima are candidates for the group disparity value.

Accordingly, in one embodiment it is contemplated for the computing device to be configured to generate a list of candidates of the disparity value. Subsequently, the correspondingly configured computing device can select a disparity value as valid on the basis of at least one selection criterion.

In a refinement of this embodiment, a second possible filter processor uses the signal strength of the disparity signal for this purpose, i.e. the second derivative of the correspondence function, $SSD''(x_0,y_0,\delta_p)$. The signal strength to be expected can also be determined individually as $ACFL(x_0,y_0)$ and $ACFR(x_0,y_0,\delta_p)$ for $YL_{image}$ and $YR_{image}$ (equation (35)), so that the expected value of the signal strength is known to a good approximation prior to the calculation of the correspondence function. The signal strength is accumulated over all $v_{max}$ signal pairs. Then, the relationships of ACFL, ACFR, and $SSD''(x_0,y_0,\delta_p)$ (equation (36)) to threshold values $thr_{L1}$, $thr_{L2}$, $thr_{R1}$, $thr_{R2}$, $thr_{A1}$, and $thr_{A2}$ are tested.

$$ACFL(x, y) = \sum_{u=1}^{u_{max}} \sum_{v=1}^{v_{max}} \left((FL_{u,v}(x+1, y) - FL_{u,v}(x, y))^2 + \right. \quad (35)$$
$$\left. (FL_{u,v}(x-1, y) - FL_{u,v}(x, y))^2\right)$$

$$ACFR(x, y, \delta_p) = \sum_{u=1}^{u_{max}} \sum_{v=1}^{v_{max}} \left((FR_{u,v}(x+\delta_p+1, y) - FR_{u,v}(x+\delta_p, y))^2 + \right.$$
$$\left. (FR_{u,v}(x+\delta_p-1, y) - FR_{u,v}(x+\delta_p, y))^2\right)$$

$$thr_{L1} < \frac{SSD''(x_0, y_0, \delta_p)}{ACFL(x_0, y_0)} < \frac{1}{thr_{L2}} \quad (36)$$

$$thr_{R1} < \frac{SSD''(x_0, y_0, \delta_p)}{ACFR(x_0, y_0, \delta_p)} < \frac{1}{thr_{R2}}$$

$$thr_{A1} < \frac{ACFL(x_0, y_0)}{ACFR(x_0, y_0, \delta_p)} < \frac{1}{thr_{A2}}$$

In simplified terms, these tests can be understood as tests of the accumulated signal strength of the group disparity, or as tests of the accumulated signal strength in both camera images. According to this embodiment, the computing device is accordingly configured to calculate relations between the signal strengths of the disparity signal and the image patches and to compare them against threshold values as a selection criterion.

By considering real tolerances of the cameras, the tests, for example when setting all threshold values to the value 2, will filter a large proportion of false candidates at positions $\delta_p$ without suppressing a large proportion of correct values. A third possible filter processor determines a value $SSD_{norm}(x_0,y_0,\delta_p)$ (equation (37)) that is normalized in comparison to the signal strength, which can then be compared against a threshold value.

$$SSD_{norm}(x, y, \delta_p) = \frac{SSD(x, y, \delta_p)}{\sum_{u=1}^{u_{max}} \sum_{v=1}^{v_{max}} FL_{u,v}(x, y)^2} \quad (37)$$

The threshold value can be considered as a limit for noise. For example, 20 features and an assumed mean deviation of 10% per feature result in a threshold value of 0.2. Candidates at position $\delta_p$ that exceed the threshold will be removed. Instead of $FL_{u,v}(x,y)$ in equation (37), it is also possible to use $FR_{u,v}(x,y,\delta_p)$ in a similar way. Also, a test with a similarly normalized value of $KSSD(x_0,y_0,\delta_p)$ can be used for the filtering. The selection criterion used here is therefore the comparison of the correspondence function normalized to the local signal strength at the location of the image positions corresponding to the candidate for the disparity with a threshold value. More generally, this embodiment is therefore based on the fact that the computing device is configured to calculate the correspondence function normalized to the signal strength of at least one of the individual images at the respective image position, or to normalize the correspondence function with the signal strength and to compare the normalized value of the correspondence function for a candidate disparity with a threshold value. The candidate is sorted out if the threshold value is exceeded.

A fourth possible filter processor uses the confidence function $KSSD(x_0,y_0,\delta_p)$ from equation (34). Due to the aforementioned suitable choice of $f_{konr}$, the latter is only slightly dependent on small changes in $\delta_p$, i.e. in the x-direction. By using the convolution kernels that are noise-optimized for the group disparity in the x-direction for the convolutions in the y-direction in $KSSD(x_0,y_0,\delta_p)$, $KSSD(x_0,y_0,\delta_p)$ will thus measure a noise-optimized disparity in y-direction. Since $YL_{image}$ and $YR_{image}$ are rectified, the disparity in the y-direction must be zero in an ideal system if the disparity in the x-direction is correctly determined. Applied to the real stereo camera and the exemplary embodiment, this means that $KSSD(x_0,y_0,\delta_K)$ for a correct candidate at the position $\delta_K$ must be minimal compared to $KSSD(x_0,y_0,\delta_A)$ for other candidates at position $\delta_A$. This can be used to filter the candidates and select the right candidate. This filter processor is accordingly based on the embodiment where the computing device is configured to generate a list of candidates for the disparity value and to select a disparity value as valid on the basis of at least one selection criterion, involving the calculating of the values of a confidence function for the candidates and selecting a candidate with the lowest value of the confidence function as valid. The selection criterion is therefore the value of a confidence function, which depends on the disparity in the y-direction, i.e. perpendicular to the direction of the epipolar line.

Another possible selection criterion is the color difference or a feature derived from the color difference. More generally, a plurality of selection criteria can be determined cumulatively in order to achieve a high degree of certainty in the determination of the actual disparity.

The processing of the confidence function $KSSD(x_0,y_0,\delta_p)$ separately from the correspondence function $SSD(x_0,y_0,\delta_p)$ is relevant for noise optimization of the group disparity. The confidence function calculated perpendicular to the vector of the camera base does not provide its own signal contribution to the measurement of the group disparity and would provide an additional noise contribution if isotropically processed jointly, similar to cross-correlation.

A fifth possible filter processor takes further ones of the aforementioned attributes of candidates at positions $\delta_K$ and compares them to threshold values. For example, assumed maximum brightness differences or color differences between the image patches in both camera images can be used as filters in this way.

A sixth possible filter processor determines the global minimum of the correspondence function for all search image patches of a reference image patch, i.e. the minimum of $SSD(\delta_K)$ for all candidates at positions $\delta_K$, derives a threshold value therefrom, and sorts out candidates whose $SSD(\delta_K)$ exceeds this threshold. In the example shown in FIG. 13, the threshold value is indicated by a dashed line.

The aforementioned filter processors can be connected in any order or executed in parallel and reduce the number of candidates to a sufficiently small number so that the disparity values, preferably the subpixel-precise values $\delta_{sub}$, can be stored and combined in a memory for an entire row. Filter processors that are independent of the calculation of the correspondence function may also be applied prior to the calculation of the correspondence function and can possibly filter out search image patches before the value of the correspondence function or the first derivative thereof is determined.

The values used by the aforementioned filter processors, such as $SSD_{norm}(x_0,y_0,\delta_p)$, can be combined with $KSSD(x_0,y_0,\delta_p)$ in a weighted manner to obtain a confidence value or confidence vector K per candidate. If a plurality of candidates have contradictory measurement results for the same or different coordinates in the image, such a confidence vector K can be used to find the candidate that is probably correct and to filter out candidates with lower confidence. For example, if K is obtained from $SSD_{norm}(x_0,y_0,\delta_p)$ and $KSSD(x_0,y_0,\delta_p)$, the candidate with the lowest magnitude of K is likely the best candidate, and other conflicting candidates can be removed.

The subpixel-precise value $\delta_{sub}$ of a group disparity in the neighborhood of a local extremum or of the zero crossing of the first derivative of the correspondence function at the position of the search image patch with the disparity $\delta_p$ can be determined by the computing device 3 using one of the following relationships:

$$\begin{aligned}\delta_{sub}(\delta_p) &= \delta_p - \frac{1}{2} \cdot \frac{SSD'(\delta_p) + SSD'(\delta_{p+1})}{SSD''(\delta_p)} \quad (38)\\ &= \delta_p - \frac{1}{2} \cdot \frac{SSD'(\delta_p) + SSD'(\delta_{p+1})}{SSD'(\delta_{p+1}) - SSD'(\delta_p)}\\ &= \delta_p - \frac{1}{2} \cdot \frac{SSD(\delta_{p+1}) - SSD(\delta_{p-1})}{SSD(\delta_{p-1}) + SSD(\delta_{p+1}) - 2 \cdot SSD(\delta_p)}\end{aligned}$$

This subpixel-precise value can then be output by the correspondence analyzer for further processing or display. Here, $\delta_{p-1}$ is the disparity of the predecessor in the sequence of the search image patches to the search image patch of $\delta_p$. $\delta_p+1$ is the disparity of the successor in the sequence of the search image patches to the search image patch of $\delta_p$. In particular, $\delta_{p-1}$ is the predecessor of $\delta_p$, i.e. it denotes the disparity of the search image patch that lies in front of the search image patch with disparity $\delta_p$ on the epipolar line, and $\delta_{p+1}$ is the successor of $\delta_p$, i.e. it denotes the disparity of the search image patch which lies behind the search image patch with disparity $\delta_p$ on the epipolar line.

Instead of or in addition to calculating the correspondence function $SSD(\delta_p)$, the derivative $SSD'(\delta_p)$ thereof can also be calculated, as already mentioned above, and the disparity $\delta$ can be determined from this derivative. Accordingly, in a further aspect of the present disclosure, a correspondence analyzer is provided which is configured to calculate the first derivative of the correspondence function $SSD'(\delta_p)$ according to the relationship $$SSD'(\delta_p) = \sum_{u=1}^{u_{max}} \sum_{v=1}^{v_{max}} ((FR_{u,v}(\delta_p) - FR_{u,v}(\delta_{p-1})) \cdot \quad (39)$$
$$(FR_{u,v}(\delta_p) + FR_{u,v}(\delta_{p-1}) - 2 \cdot FL_{u,v})),$$

where $\delta_{p-1}$ is the disparity of the predecessor in the sequence of the search image patches to the search image patch of $\delta_p$, in particular the disparity of the search image patch that lies in front of the search image patch with disparity $\delta_p$ on the epipolar line, and $FL_{u,v}$ is the result of the convolution of the signal $YL_{signal,v}$ with the convolution kernel with index u from among the set of $u_{max}$ convolution kernels which are used for the convolution of the signals, and $FR_{u,v}(\delta)$ is the result of the convolution of the signal $YR_{signal,v}$ of a search image patch with disparity $\delta$ with the convolution kernel with index u. This significantly reduces the computational effort, especially when using FPGA processors, and also for GPU implementations. The word width is also reduced considerably (especially for MAC with 9 bits).

What shall now be described is the processing using a system consisting of two correspondence analyzers, comprising a high-frequency process for precisely detecting surface details on the basis of textures, and a low-frequency process for approximately capturing the surface on the basis of an evaluation of diffuse reflection in the absence of a texture.

Low Frequency Process

In a first parallel process, according to a further development of the correspondence analyzer 1, the computing device 3 processes a pair of images of reduced resolution after prior low-pass filtering, in the exemplary embodiment with ¼ resolution, the number of pixels being reduced by a factor of 16. This process utilizes one or more weighting vectors $g_{LF}$ that have been optimized to capture essentially low frequency (LF) spatial frequencies of diffuse reflection, and stores at least one set of convolution kernels for convolution in x-direction and in y-direction. Both images are subjected to a convolution as described above to produce the feature vectors or data streams FL and FR of the low-frequency process. The data streams are processed by the correspondence analyzer according to FIG. 15. The valid candidates for the disparity $\delta$ at the coordinates x, y are determined using the aforementioned filter processors and optionally an additional neighborhood filter, and thus an LF disparity map of reduced resolution is obtained, e.g. of ¼ pixel and reduced measurement accuracy. The LF disparity map is then used to predict the disparity range for the subsequent high-resolution analysis.

High Frequency Process

In a second parallel process, according to a further development of the correspondence analyzer, the high-resolution pair of images is directly processed by a second, identically configured part of the computing device 3. The second process is preferably delayed in time relative to the first process, so that the calculation results of the first process in the form of the LF disparity map can be used to predict the disparity range. For this purpose, the computing device may be configured to use disparity values determined or estimated by a correspondence analysis with a first correspondence function for predicting the result or for controlling a correspondence analysis with a second correspondence function, wherein, using suitably selected parameters or convolution functions, the second correspondence function transfers higher-frequency signal components from the image patches than the first correspondence function.

With typical camera tolerances, the high-frequency process is performed using prediction in a disparity range of +/−4 pixels for disparity values of the LF disparity map. If the LF disparity map contains no valid candidates or only candidates with a low confidence for a coordinate, the high-frequency process can analyze the maximum expectable disparity range for this coordinate. The second process uses one or more weighting vectors $g_{HF}$ that were optimized to capture textures by considering the OTF of the cameras, and stores at least one set of convolution kernels for the convolution in x-direction and in y-direction. Convolution is performed on both images as described above, so that the data streams FL and FR of the high-frequency second process are obtained. Further processing is similar to the first process.

Finally, the results of the first and second processes are combined into a combined disparity map, taking into account the confidence obtained in each case. A suitable confidence measure is the aforementioned confidence vector K, in particular it is advantageous to also include the accumulated signal strength (e.g. $ACFR(x_0,y_0,\delta_p)$, equation (35)), so that measurement results for coordinates with low signal strength also have a reduced confidence. If the measurement results for a coordinate have high confidence in both the first low-frequency process and the second high-frequency process, the results from the second process are used because they likely have a higher measurement accuracy. If, for a coordinate, only the first process provides a high confidence, its results are used. If, for a coordinate, the first process only provides a low confidence, the second process is able to analyze the full expectable disparity range, as already mentioned, and the result can be used if it has a high confidence. Additionally, as already mentioned, contradictory measurement results can be filtered on the basis of the confidence.

In the last step, an output low-pass filtering is performed. For this purpose, the combined disparity map, advantageously consisting of results $\delta_{sub}$, is first converted into Cartesian coordinates according to equation (1) and then interpolated with a Gaussian filter. In this way, a grid is obtained which is equidistant in the x,y-plane, FIG. 6a prior to and FIG. 6b after applying the filter. This process is also known as resampling.

In the above exemplary embodiment it was assumed so far, for the sake of simplicity, that the information from the image patches used for the disparity determination is weighted equally, regardless of where it is located in the respective image patches. However, non-uniform weighting using a weighting function W(x) is also possible and can be integrated in the signal model as shown in Equation (40), as an extension to Equation (6).

(40)

$$C_{YL,even}(x, \Delta_m, A_m, n, m) = \int_{-T/4}^{T/4} W(x) \cdot A_m \cdot \cos(m \cdot \omega \cdot (-x + \Delta_m)) \cdot c_{k,n} \cdot \cos(n \cdot \omega \cdot x) dx$$

$$C_{YL,odd}(x, \Delta_m, A_m, n, m) = \int_{-T/4}^{T/4} W(x) \cdot A_m \cdot \cos(m \cdot \omega \cdot (-x + \Delta_m)) \cdot s_{l,n} \cdot \sin(n \cdot \omega \cdot x) dx$$

$$C_{YR,even}(x, \Delta_m, A_m, n, m, \delta) = \int_{-T/4}^{T/4} W(x) \cdot A_m \cdot \cos(m \cdot \omega \cdot (-x + \Delta_m + \delta)) \cdot c_{k,n} \cdot \cos(n \cdot \omega \cdot x) dx$$

$$C_{YR,odd}(x, \Delta_m, A_m, n, m, \delta) = \int_{-T/4}^{T/4} W(x) \cdot A_m \cdot \cos(m \cdot \omega \cdot (-x + \Delta_m + \delta)) \cdot s_{l,n} \cdot \sin(n \cdot \omega \cdot x) dx$$

$$mit: \omega = \frac{2\pi}{T}$$

The weighting function can take any form or values, for example it is possible to use the function shown in equation (41), which is similar to a Gaussian filter. It weights signals in the center of the image patch more heavily than signals at the edge of the image patch, which means that the former will have a greater relative impact on the disparity determination than the latter. For uniform weighting, W(x) has a constant value of one, for example.

$$W(x) = \exp\left(-\frac{0.693 x^2}{\rho^2}\right) \quad (41)$$

With a suitable choice of the weighting function, the necessary convolution kernels can be determined according to the procedure already described, if necessary with numerical calculation of the integrals. For example, when equation (41) is used, the matrices AEV and AOD will change depending on the choice of the parameter p, but the further steps are similar. It should in particular be noted in this respect that the convolution kernels still include a weighted sum of a plurality of even and odd harmonic functions, but by using the weighting function they are furthermore determined in such a way that they also comprise the selected weighting function at the same time. Without being limited to specific exemplary embodiments, such as the special weighting according to Equation (41), it is furthermore contemplated according to one embodiment, that at least one, preferably all, convolution kernels include a weighting function, in particular a weighting function that is suitable to allow information from different parts of the image patches to be included to varying degrees into the correspondence analysis, in particular into the determination of the disparity.

Figure 17:
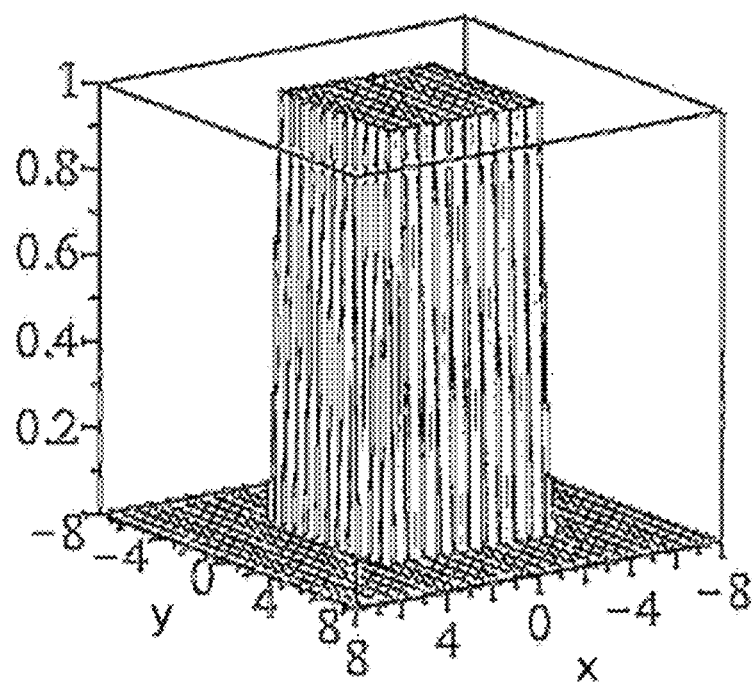
FIG. 17 shows weightings of the individual pixel values. Panel (a) shows a weighting of the pixel values using a box filter, and panel (b) shows a weighting using a Gaussian filter.
Figure 17:
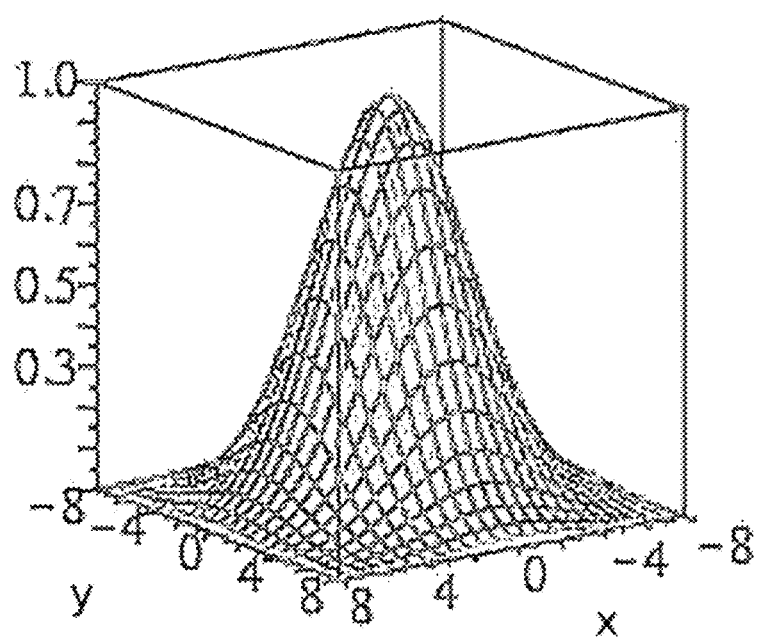

Weighting can also be performed when determining the signals from the data of the image patches. FIG. 17 illustrates a resulting weighting of the information of the image patches, with panel (a) showing a uniform weighting that has been cropped to an 8×8 image patch for better illustration, and panel (b) showing a weighting based on equation (41) with a full width at half maximum p of 3.5 pixels, both in the determination of the signals and in the further processing of the signals.

A Gaussian weighting function is of practical importance for increasing the 3D contrast, that is, in simple terms, to focus the measurement on parts of the image patches, for example the center. As a result of the weighting with, for example, the weighting function from panel (b) of FIG. 17, less or less strong information will be available for determining the disparity, but the information used will be closer to the desired measurement location in the example. This can be used when the signal-to-noise ratio is good, for example when objects are well lit and have texture and the camera images are well focused, and can then result in a more accurate disparity measurement for uneven object surfaces or close to object edges. The weighting function can therefore also be suitably selected on the basis of knowledge about object properties or capturing properties, for example through a suitable selection of the full width at half maximum, or the parameter ρ. The smaller ρ is, the more the measurement will be focused on a partial area. On the other hand, a uniform weighting function or a large value for the parameter p is advantageous in image patches with a less good signal-to-noise ratio, for example in fog.

A Gaussian weighting as described above represents one possible embodiment in which pixels located close to the centroid of the weighted image patch have a higher weight than image parts at the edges. More generally, according to yet another embodiment, it is therefore contemplated that at least one of the filter kernels comprises a weighting function which weighs parts of an image patch that are close to the centroid of this image patch more strongly with this weighting function than parts that are further away from this centroid. Here, the centroid can in particular again be the geometric center of the image patch. Also as described above, the weighting can be varied or selected based on the image properties. For this purpose, it is generally intended according to one embodiment that the computing device is configured to select a weighting function depending on image properties, in particular the signal-to-noise ratio or a jump in the depth information in the vicinity of or within the image patch, which jump has been determined by previous measurements or appears plausible. For example, a jump in the depth information can be plausible and can be defined for the image patch if such a jump has already been determined for a minimum number of neighboring image patches or pixels based on the course of the disparity. For example, the weighting may be changed when at least two adjacent pixels exhibit such a jump in the depth information.

If a weighting function was selected in such a way that the center of gravity of the weighting function in an image patch differs from the centroid of the image patch, then it is advantageous when determining the correspondence function $SSD(\delta_p)$ to determine the distance $\delta_p$ between reference image patches and search image patches on the basis of the centers of gravity of the weighting functions in these image patches. When calculating the center of gravity of the weighting function, the function values of the weighting function are included in the calculation of the center of mass according to the masses or local densities. In other words, the center of gravity of the weighting function corresponds to the weight centroid of the weighted image patch.

For weighting using a Gaussian distribution, the range around ρ=3 is of particular interest for image patches with a size of 8×8 pixels. Without being limited to the illustrated example, it is therefore generally intended according to a further embodiment that at least one of the convolution kernels comprises a weighting function whose function values have a full width at half maximum, which full width at half maximum is less than ⅔ of the width of the image patches, preferably less than half the width of the image patches. Here, the relevant width is that of the direction along which the weighting function varies. In the example of FIG. 17, this can be both the x-direction and the y-direction.

As already described, it is advantageous for the 3D data or the disparities determined as valid from the data to be low-pass filtered. In an alternative or additional embodiment of the invention, it has also proven to be advantageous to calculate an averaged correspondence function already before determining the disparity δ, namely by an optionally weighted averaging or low-pass-like filtering of the calculated function values of the correspondence function SSD ($\delta_p$) for the respective reference image patch with the correspondence functions of nearby reference image patches at the same points $\delta_p$. Therefore, according to one embodiment of the correspondence analyzer, it is generally contemplated for the computing device 3 to be configured to execute averaging for a reference image patch, in particular to calculate an arithmetic mean or weighted mean of the values of the correspondence function SSD($\delta_p$) of this reference image patch with the values of the correspondence functions SSD($\delta_p$) of a plurality of other, in particular neighboring reference image patches, and to further process this averaged correspondence function according to the present disclosure, in particular to calculate and output a subpixel-precise value of the disparity at the point $\delta_p$.

Equation (42) shows, as an exemplary embodiment, an averaged correspondence function $SSD_{Avg}$ that uses a 3×3 environment of reference image patches and includes them with uniform weighting. The further execution steps will then use the $SSD_{Avg}$ function instead of the SSD function.

$$SSD_{Avg}(x, y, \delta_p) = \sum_{d_x=-1}^{1} \sum_{d_y=-1}^{1} \left( \frac{SSD(x + d_x \cdot y = d_y \cdot \delta_p)}{9} \right) \quad (42)$$

Although such combinations of the correspondence functions of a plurality of reference image patches might slightly reduce the achievable 3D contrast on curved or non-planar surfaces, correspondence functions also contain at least partially decorrelated disturbances such as quantum noise or pixel artifacts, which are advantageously attenuated by this averaging or low-pass filtering in the linear part of the signal processing. Among other things it is the application of the filtering after the application of the convolution kernels for the group disparity and the calculation of the correspondence function what distinguishes this filtering from a low-pass filtering prior to a calculation of the SSD such as in the Gabor method. This filtering is in particular also performed prior to a sub-pixel interpolation by which the exact position of the disparity is determined, and thus differs from an output low-pass filter.

In addition, there are disturbances in $SSD_{var}$, the variant part of the correspondence function. These can be reduced particularly effectively by averaging a plurality of correspondence functions because they are still partially correlated at this point in the signal processing. This makes low-pass filtering particularly effective. This property no longer exists after the calculation of the disparity, since subpixel interpolation is typically non-linear, and it is also not present in this form prior to the calculation of the correspondence functions, so it represents a special property of this filtering. In a refinement, the low-pass filter is optimally configured such that the spatial frequency 4ω is only slightly reduced and the spatial frequency component above 4ω is strongly reduced.

Deviations from the disclosed advantageous embodiments typically result in more noise or otherwise lower quality of the disparity measurement. Examples of this include the already mentioned deviations of coefficients of the convolution kernels, a convolution of the signals of the reference image patch and of the signals of a plurality of search image patches with different convolution kernels, the use of a weighting function having a center of gravity that does not correspond to the desired measuring point within the image patches, or the use of convolution kernels which comprise even or odd functions whose coordinate origin does not lie at the position of the center of gravity of the weighting function in the image patch, or, in the case of uniform weighting, does not lie in the centroid of the image patch. Such deviations typically lead to falsifications of the disparity measurement. However, in combination with averaging or low-pass filtering of the correspondence function, deviations of this kind or of a similar type can be used constructively under certain circumstances. For example, different convolution kernels, different centers of gravity of the weighting function, or convolution kernels with different coordinate origins are used for different reference image patches. More generally, the coordinates origin with respect to which the functions of the convolution kernels are even and odd does not need be located at the center of the respective image patches, but may generally be off-center of the image patches, as in the embodiment described above. Here, it is advantageous to choose these deviations in such a way that the individual measurement errors of the disparity to be expected as a result statistically add up to zero, or when added up and weighted according to any optional weighting of the averaging of the correspondence function total zero. The noise of the correspondence function, in particular of $SSD_{var}$, depends, among other things, on the respective disparity, with which, if chosen appropriately, such disparities can be partially decorrelated. The arrangement and the signal model disclosed here are configured in such a way that $SSD_{var}$ typically substantially resembles odd functions near extrema of the correspondence function. Thus, the averaging of correspondence functions is particularly suitable for reducing noise due to statistical accumulation of errors.

As described above, smaller tolerances of the camera gain do not generally lead to noise, but larger contrast differences between the cameras, especially with different OTF, are not compensated. Since a real stereo camera generally has tolerances of the transfer functions of the cameras, the amplitudes of the convolution results of the signals of a reference image patch will not necessarily be equal to the amplitudes of the convolution results of the signals of a corresponding search image patch. The value of the correspondence function SSD at this point is then different from zero, which can lead to additional noise in the determined disparity. The vector of the amplitudes of the convolution results of the signals of an image patch can be estimated by the signal strength of the image patch. A normalization of these convolution results using the signal strength, i.e. for example a division of the convolution results by the signal strength, is therefore advantageous since this reduces the differences between the amplitudes.

Therefore, in one embodiment of the correspondence analyzer it is generally contemplated that the computing device is configured to normalize at least one, preferably all, convolution results of the signals of one, preferably all, image patches with a value which correlates with the signal strength of the respective image patch, in particular the signal strength of the signals of this image patch used for the correspondence analysis.

In the exemplary embodiment with digital images, the signal strength can be estimated using the second derivative of the comparison of an image with itself using the correspondence function. On the basis of Equations (30) and (29), the signal strength can thus be determined as the square root of ACFL or ACFR from Equation (35).

According to a further embodiment of the invention, the computing device is configured to normalize at least one, preferably all, of the features calculated from the image data of the left and right cameras with the respective signal strength at the corresponding point in the image of this camera, and in particular to then perform the further calculations with the so normalized features. This further calculation in particular also includes the determination of the one or more minima of the correspondence function. This increases the similarity of the signals, improves the signal-to-noise ratio, and the relative minimum of the SSD approaches the target value of 0. Approximate solutions can also be used instead of the square root. Furthermore, SSD" converges to 1 if the features have been normalized as discussed above and if there are no other disturbances. This property can also be used in a later confidence analysis.

LIST OF REFERENCE NUMERALS

| | |
|---|---|
| 1 | Correspondence analyzer |
| 2 | Stereo camera |
| 3 | Computing device |
| 4 | Object |
| 5 | Camera sensor |
| 6 | Memory |
| 8, 9 | Lens |
| 10 | Lens mount |
| 11, 12 | Eccentric element |
| 13 | Screw |
| 20, 21 | Camera |
| 22 | Capturing device |
| 25, 26 | Digital image |
| 30 | Adder |
| 32 | Delay unit |
| 34, 35 | Dual port RAM |
| 36, 37 | DSP |
| 98, 99 | Epipole |
| 101 | 3D point |
| 102 | Epipolar plane |
| 103, 106 | Pixel |
| 104, 105 | Image |
| 107 | Epipolar line |

The invention claimed is:

1. A correspondence analyzer for determining a disparity $\delta$, that is a shift between corresponding image elements in two digital individual images, comprising:
a computing device configured:
to select image patches from the two individual images in each case, the image patch of one of the individual images being chosen as a reference image patch, and a sequence of search image patches being selected in the other individual image; and
to generate a plurality of signals $YL_{signal,v}$ from the reference image patch and a plurality of signals $YR_{signal,v}$ from each of the search image patches; and
to perform a convolution of the plurality of signals $YL_{signal,v}$ of the reference image patch with even and odd convolution kernels stored in a memory, in a spatial window, wherein the even convolution kernels comprise a weighted sum of a plurality of even harmonic functions of different spatial frequencies and the odd convolution kernels comprise a weighted sum of a plurality of odd harmonic functions of different spatial frequencies; and
to perform a convolution of the signals $YR_{signal,v}$ for each of the search image patches with the convolution kernels stored in the memory, in the spatial window; and
to calculate the differences of the respective convolution results for each signal pair $YL_{signal,v}$ and $YR_{signal,v}$; and
to process the differences of the convolution results for each of the search image patches in a non-linear manner and to accumulate them to obtain a function value of a correspondence function $SSD(\delta_p)$ at the point $\delta_p$, or to calculate, from the differences in the convolution results, the first derivative $SSD(\delta_p)$ of the correspondence function SSD with respect to $\delta_p$ at the point $\delta_p$, and thus to obtain a function value of a correspondence function SSD or of its derivative at the point $\delta_p$, wherein & denotes the distance of the reference image from the search image; and
to determine local extrema of the correspondence function SSD or zero crossings of the derivative $SSD(\delta_p)$ of the correspondence function $SSD(\delta_p)$; and
to output the point $\delta_p$ of one of the local extrema or of one of the zero crossings as the disparity $\delta$; or
to calculate and output a subpixel-precise value of the disparity at the point $\delta_p$.

2. The correspondence analyzer of claim 1, wherein at least one of the following features applies to the convolution kernels stored in the memory:
the convolution kernels are selected in such a way that, in the signal model for each signal v in the spatial frequency range, the convolution operations of the $k_{max}$ even and $l_{max}$ odd functions each transfer sums with weighted signal components of a group of spatial frequencies having amplitudes $A_m$, so that in the correspondence function SSD two partial sums are obtained for each signal v and each spatial frequency with index m, the first one with terms characterized by squared amplitudes $A_m^2$ from the results of the convolution operations using the even functions, the second one with terms characterized by squared amplitudes $A_m^2$ from the results of the convolution operations using the odd functions, and such that the first partial sum and the second partial sum can be combined according to trigonometric Pythagoras such that the sum $SSD_{inv}(\delta)$ of the two partial sums is independent of the object phase $\Delta_m$; and
the convolution kernels are chosen in such a way that in the determination of the disparity, a local standard deviation of the measurements of the disparity of less than 0.2 pixels is achieved, even 0.1 pixels in the case of a shift of a planar object which has an intensity modulation along the direction of the epipolar line, including a spatial frequency in the spatial frequency range, or which has a corresponding texture, and with the shift of the object occurring at a constant distance Z from the camera and along the epipolar line.

3. The correspondence analyzer as claimed in claim 1, further comprising at least one of the following features:
the convolution kernels are selected in the spatial range in such a way that, in the signal model for each signal v in the spatial frequency range the convolution operations of the $k_{max}$ even and $l_{max}$ odd functions each transfer sums with weighted signal components of a group of spatial frequencies with amplitudes $A_m$, so that in the correspondence function SSD two terms are obtained for each signal v and each spatial frequency with index m, wherein the first term is a product of a squared amplitude $A_m^2$, a first constant, and a squared sine function, and the second term is a product of a squared amplitude $A_m^2$, a second constant, and a squared cosine function, and wherein the values of the first and second constants are equal or equal within a tolerance of +/−20%;
at least one, preferably all of the convolution kernels comprises a weighting function which is suitable to include information from different portions of the image patches to different extents in the correspondence analysis, including in the determination of the disparity;
at least one of the filter kernels comprises a weighting function which weighs parts of an image patch that are close to the centroid of this image patch being weighted using this weighting function stronger than parts that are further away from this centroid; and
the computing device is configured to select a weighting function on the basis of image properties, including on the signal-to-noise ratio or a jump in the depth information in the vicinity of or within the image patch, which jump has been determined by previous measurements or appears plausible.

4. The correspondence analyzer as claimed in claim 1, wherein the computing device is configured:
to generate a plurality $v_{max}$ of signals $YL_{signal,v}$ from the reference image patch by convolution operations of the data of the reference image patch approximately perpendicular to the epipolar line, and to generate a plurality $v_{max}$ of signals $YR_{signal,v}$ from each of the search image patches by convolution operations of the data of the respective search image patch approximately perpendicular to the epipolar line, wherein the convolution operations generating the signals and the convolution operations of the $k_{max}$ even and $l_{max}$ odd functions are selected in such a way in the signal model, that the latter convolution operations each transfer sums with weighted signal components of a plurality of spatial frequencies, which are denoted by different values of the index m below; and
for each signal, a first partial sum is obtained in the correspondence function SSD, whose terms are independent of the object phases $\Delta_m$, and a second partial sum is obtained, whose terms are dependent on the object phases $\Delta_m$, wherein:
when accumulating the first partial sums of each of the $v_{max}$ signals, a constructive accumulation is obtained in which the individual terms do not compensate each other; and
when accumulating the second partial sums of each of the $v_{max}$ signals, a statistical accumulation is obtained in which these noisy components at least partially compensate each other statistically.

5. The correspondence analyzer as claimed in claim 1, wherein:
the signal forms of the $k_{max}$ even convolution kernels are approximated by Fourier series with Fourier coefficients $c_{k,n}$, and the signal forms of the $l_{max}$ odd convolution kernels are approximated by Fourier series with Fourier coefficients $s_{l,n}$, where n is the index of the respective spatial frequency of the respective Fourier series, and wherein:
for each spatial frequency m transferred in this way and the corresponding profile vector weight gm, the Fourier coefficients $c_{k,n}$ and $s_{l,n}$ are solutions of the following non-linear equation system:

$$g_m = \sum_{k=1}^{k_{max}} \left( \sum_{n=1}^{n_{max}} c_{k,n} \cdot AEV_{n,m} \right)^2 = \sum_{l=1}^{l_{max}} \left( \sum_{n=1}^{n_{max}} s_{l,n} \cdot AOD_{n,m} \right)^2,$$

wherein, in the case of 4 values for each of the indices m and n, the coefficients $AEV_{n,m}$ and $AOD_{n,m}$ are determined by the following matrices or deviate by a factor of 0.8 to 1.2 from the values of each of these matrices:

$$AEV = \begin{bmatrix} \frac{1}{4} & \frac{1}{3\pi} & 0 & -\frac{1}{15\pi} \\ \frac{1}{3\pi} & \frac{1}{4} & \frac{3}{5\pi} & 0 \\ 0 & \frac{3}{5\pi} & \frac{1}{4} & \frac{3}{7\pi} \\ -\frac{1}{15\pi} & 0 & \frac{3}{5\pi} & \frac{1}{4} \end{bmatrix}_n$$

$$AOD = \begin{bmatrix} \frac{1}{4} & \frac{2}{3\pi} & 0 & -\frac{4}{15\pi} \\ \frac{2}{3\pi} & \frac{1}{4} & \frac{2}{5\pi} & 0 \\ 0 & \frac{2}{5\pi} & \frac{1}{4} & \frac{4}{7\pi} \\ -\frac{4}{15\pi} & 0 & \frac{4}{7\pi} & \frac{1}{4} \end{bmatrix}_n.$$

6. The correspondence analyzer as claimed in claim 1, wherein the first derivative of the correspondence function $SSD(\delta_p)$ is determined using the relationship:

$$SSD'(\delta_p) = \sum_{u=1}^{u_{max}} \sum_{v=1}^{v_{max}} ((FR_{u,v}(\delta_p) - FR_{u,v}(\delta_{p-1})) \cdot (FR_{u,v}(\delta_p) + FR_{u,v}(\delta_{p-1}) - 2 \cdot FL_{u,v})),$$

where $\delta_{p-1}$ is the disparity of the predecessor in the sequence of the search image patches to the search image patch of $\delta_p$, and $FL_{u,v}$ is the result of the convolution of the signal $YL_{signal,v}$ with the convolution kernel with index u from among the set of $u_{max}$ convolution kernels which are used for the convolution of the signals, and $FR_{u,v}(\delta)$ is the result of the convolution of the signal $YR_{signal,v}$ of a search image patch with disparity $\delta$ with the convolution kernel with index u.

7. The correspondence analyzer as claimed in claim 1, wherein the computing device is configured to determine a subpixel-precise value $\delta_{sub}$ of a group disparity in the neighborhood of a local extremum or a zero crossing of the first derivative of the correspondence function at the location of the search image patch having the disparity $\delta_p$ using one of the following relationships:

$$\begin{aligned}\delta_{sub}(\delta_p) &= \delta_p - \frac{1}{2} \cdot \frac{SSD'(\delta_p) + SSD'(\delta_{p+1})}{SSD''(\delta_p)} \\ &= \delta_p - \frac{1}{2} \cdot \frac{SSD'(\delta_p) + SSD'(\delta_{p+1})}{SSD'(\delta_{p+1}) - SSD'(\delta_p)} \\ &= \delta_p - \frac{1}{2} \cdot \frac{SSD(\delta_{p+1}) - SSD(\delta_{p-1})}{SSD(\delta_{p-1}) + SSD(\delta_{p+1}) - 2 \cdot SSD(\delta_p)}\end{aligned}$$

where $\delta_{p-1}$ is the disparity of the predecessor in the sequence of search image patches to the search image patch of op, and where $\delta_{p+1}$ is the disparity of the successor in the sequence of search image patches to the search image patch of $\delta_p$; and to output $\delta_{sub}$ as the disparity $\delta$.

8. The correspondence analyzer as claimed in claim 1, comprising a computing device which is configured:

to select image patches from each of the two individual images, wherein at least one image patch of one of the individual images is chosen as the reference image patch, and search image patches are selected in the other individual image; and to calculate a plurality of candidates for a disparity value from the image patches; wherein the computing device is furthermore configured to select information from the reference image patch and the search image patches, and, on the basis of said information, to select confidence vectors for possible disparity values, which are suitable for estimating whether the respective result indicates an actual correspondence of the respective search image patch with the reference image patch.

9. The correspondence analyzer as claimed in claim 1, wherein the computing device is configured to generate a list of candidates for the disparity value for a particular reference image patch; to select a confidence vector for each candidate; and, on the basis of said confidence vectors and/or other selection criteria, to select all or part of said candidates as valid, or to select that none of the candidates is considered valid for the particular reference patch.

10. The correspondence analyzer of claim 9, wherein the computing device is configured to select the values of at least one element of the confidence vector using functions which, at least for some classes of reference and search image patches, classify candidates as valid or as invalid with a higher probability than is possible when using the correspondence function alone.

11. The correspondence analyzer as claimed in claim 9, wherein the computing device is configured to select the values of elements of a confidence vector using one or more of the following features:

a relation or difference of $SSD(\delta_p)$ of the candidate at point $\delta_p$ relative to a threshold value derived from the extrema of the correspondence function of all candidates of the reference image patch;

gray value relations, including gray value differences between a part of the reference image patch and a part of the respective search image patch, or a feature derived from said gray value differences;

color relations, including color differences between a part of the reference image patch and a part of the respective search image patch, or a feature derived from said color differences;

relation of the signal strength in the reference image patch compared to the signal strength in the respective search image patch; and normalized cross-correlation coefficient between the data of a part of the reference image patch and the data of a part of the respective search image patch, approximately perpendicular to the epipolar line in each case; wherein:

these features are slightly low-pass filtered approximately along the epipolar line to avoid noise.

12. The correspondence analyzer as claimed in any of claim 10, wherein the computing device is configured to make available to a user of the correspondence analyzer the lists of candidates, or only the valid candidates, and together with the respective confidence vectors.

13. The correspondence analyzer as claimed in claim 1, wherein a plurality of differently parameterized correspondence functions and the convolution kernels thereof and the profile vector $g_m$ corresponding to each one thereof are stored in the correspondence analyzer or are determined at runtime;

wherein the correspondence analyzer is further configured to select part of said plurality of correspondence functions and convolution kernels thereof on the basis of the available classes of individual images or image patches or on the basis of the classes of individual images or image patches that are advantageous for further processing.

14. The correspondence analyzer of claim 13, wherein the parameters of at least one correspondence function and the convolution kernels thereof are selected such that the weighting coefficient of the respective corresponding profile vector $g_m$ for the highest spatial frequency is smaller than at least one of the other weighting coefficients of this profile vector.

15. The correspondence analyzer as claimed claim 1, wherein the class or a profile vector on the basis of which a plurality of correspondence functions and convolution kernels thereof are selected, is selected on the basis of the power spectrum of the data of the individual images or image patches and taking into account the optical transfer function.

16. The correspondence analyzer as claimed claim 1, wherein the correspondence analysis is performed using two or more differently parameterized correspondence functions and convolution kernels, wherein the computing device combines the two or more obtained results or selects partial results from these results, on the basis of the determined confidence vectors.

17. The correspondence analyzer as claimed in claim 1, wherein the computing device is configured to use disparity values that have been determined or estimated by a correspondence analysis using a first correspondence function for predicting the result or for controlling a correspondence analysis using a second correspondence function, wherein, with suitably selected parameters or convolution functions, the second correspondence function transfers higher-frequency signal components from the image patches than the first correspondence function.

18. The correspondence analyzer as claimed in claim 1, wherein the computing device is configured to filter at least one of the following variables using a low-pass filter:

the calculated disparity values;
confidence values; and
disparity values weighted by confidence values.

19. The correspondence analyzer as claimed in claim 1, wherein $k_{max}$ is equal to 2 and the even convolution kernels contain functions $f_{even,1}$ and $f_{even,2}$ as given below, and wherein $l_{max}$ is equal to 2 and the odd convolution kernels contain functions $f_{odd,1}$ and $f_{odd,2}$ as given below, wherein $\text{off}_{even,1}$ and $\text{off}_{even,2}$ are selected such that the even convolution kernels are approximately mean-free, and wherein at least one of the coefficients 3.4954, 0.7818, 4.9652, 1.8416, 4.0476, 0.2559, 6.0228, or 0.0332 can also be larger or smaller by up to 10%:

$$f_{even,1}(x) = 3.4954 \cos\left(\frac{\pi x}{8}\right) + 0.7818 \cos\left(\frac{\pi x}{4}\right) + \text{off}_{even,1}$$

$$f_{even,2}(x) = 4.9652 \cos\left(\frac{3\pi x}{8}\right) + 1.8416 \cos\left(\frac{\pi x}{2}\right) + \text{off}_{even,2}$$

$$f_{odd,1}(x) = 4.0476 \sin\left(\frac{\pi x}{8}\right) - 0.2559 \sin\left(\frac{\pi x}{4}\right)$$

$$f_{odd,2}(x) = 6.0228 \sin\left(\frac{3\pi x}{8}\right) - 0.0332 \sin\left(\frac{\pi x}{2}\right)$$

20. The correspondence analyzer as claimed in claim 1, wherein the computing device is configured to execute averaging for a reference image patch, including to calculate an arithmetic mean or weighted mean of the values of the correspondence function SSD of this reference image patch with the values of the correspondence functions SSD of a plurality of other, including neighboring, reference image patches, and to further process this averaged correspondence function including to calculate and output a subpixel-precise value of the disparity at a point $\delta_p$.

21. The correspondence analyzer as claimed in claim 1, wherein the computing device is configured to normalize at least one convolution result of the signals of one image patch with a value which correlates with the signal strength of the respective image patch, or the signal strength of the signals of this image patch used for the correspondence analysis.

22. A stereo camera comprising two cameras, each one comprising a camera sensor and a lens, wherein the optical centers of the lenses with the camera sensors are spaced apart from each other by a base width B, and wherein the stereo camera comprises a correspondence analyzer according to claim 1.

23. The stereo camera of claim 22, wherein one of the lenses is held in an adjustable eccentric, so that a coplanarity error can be corrected by rotating the lens in the eccentric in front of a test image and the coplanarity of the optical axes of the lenses can be adjusted.

24. The stereo camera as claimed in claim 22, wherein the stereo camera is configured to additionally evaluate the disparity of corresponding image patches in a direction approximately perpendicular to the epipolar line during runtime for correcting coplanarity alignment errors, and to correct the average deviation of this disparity from zero, i.e. which comprises a deviation from ideal epipolar geometry, by an opposite shift of one of the images approximately perpendicular to the epipolar line by a correction of the rectification parameters.

25. The stereo camera as claimed in claim 22, wherein the computing device of the correspondence analyzer is configured to normalize at least one of the features calculated from the image data of the left and right cameras with the respective signal strength of this camera.

26. A method for determining the disparity of corresponding image elements in two digital individual images which have been rectified to the stereo normal case, including using a correspondence analyzer according to claim 1, wherein for determining the disparity $\delta$, which comprises a shift between corresponding image elements in two digital individual images, a computing device is used:
    to select respective image patches from the two individual images, the image patch of one of the individual images being chosen as a reference image patch, and a sequence of search image patches being selected in the other individual image; and
    to generate a plurality $v_{max}$ of signals $YL_{signal,v}$ from the reference image patch and a plurality $v_{max}$ of signals $YR_{signal,v}$ from each of the search image patches; and
    to perform a convolution of the plurality of signals $YL_{signal,v}$ of the reference image patch with even and odd convolution kernels stored in a memory, in a spatial window, wherein the even convolution kernels comprise a weighted sum of a plurality of even harmonic functions of different spatial frequencies and the odd convolution kernels comprise a weighted sum of a plurality of odd harmonic functions of different spatial frequencies; and
    to perform a convolution of the signals $YR_{signal,v}$ for each of the search image patches with the convolution kernels stored in the memory, in the spatial window; and
    to calculate the differences of the respective convolution results for each signal pair $YL_{signal,v}$ and $YR_{signal,v}$; and
    to process the differences of the convolution results for each of the search image patches in a non-linear manner and to accumulate them to obtain a function value of a correspondence function $SSD(\delta_p)$ at the point $\delta_p$, or to calculate, from the differences in the convolution results, the first derivative $SSD'(\delta_p)$ of the correspondence function SSD with respect to $\delta_p$ at the point $\delta_p$, and thus to calculate a function value of a correspondence function SSD or of its derivative at the point $\delta_p$, wherein & denotes the distance of the reference image from the search image; and
    to determine local extrema of the correspondence function SSD or zero crossings of the derivative $SSD(\delta_p)$ of the correspondence function SSD; and
    to output the point op of one of the local extrema or of one of the zero crossings as the disparity $\delta$; or
    to calculate and output a subpixel-precise value of the disparity at the point $\delta_p$.

* * * * *